United States Patent [19]

Nonaka et al.

[11] Patent Number: 5,337,116
[45] Date of Patent: Aug. 9, 1994

[54] LIGHT PROJECTION TYPE MEASUREMENT APPARATUS EFFECTIVELY UTILIZING A POST OF A ONE-CHIP MICROCOMPUTER

[75] Inventors: Osamu Nonaka, Sagamihara; Takeshi Kindaichi, Nagano; Kazunori Mizokami, Tokyo, all of Japan

[73] Assignee: Olympus Optical Co., Ltd., Tokyo, Japan

[21] Appl. No.: 996,719

[22] Filed: Dec. 24, 1992

[30] Foreign Application Priority Data

| Dec. 26, 1991 | [JP] | Japan | 3-345166 |
| Feb. 18, 1992 | [JP] | Japan | 4-030630 |
| Oct. 22, 1992 | [JP] | Japan | 4-284739 |
| Oct. 22, 1992 | [JP] | Japan | 4-284740 |

[51] Int. Cl.⁵ .................. G03B 13/36; G01C 3/08
[52] U.S. Cl. .................. 354/403; 356/1
[58] Field of Search .................. 354/403; 356/1, 4; 250/201.4, 201.6; 358/227

[56] References Cited

U.S. PATENT DOCUMENTS

| 4,464,038 | 8/1984 | Nanba | 354/403 |
| 4,477,168 | 10/1984 | Hosoe | 354/403 |
| 4,533,241 | 8/1985 | Masunaga et al. | 354/403 X |
| 4,855,585 | 8/1989 | Nonaka | 354/403 X |
| 5,051,766 | 9/1991 | Nonaka et al. | 354/403 X |
| 5,136,148 | 8/1992 | Nonaka | 354/403 X |
| 5,157,435 | 10/1992 | Min | 354/403 |
| 5,184,168 | 2/1993 | Nonaka | 354/403 X |
| 5,204,714 | 4/1993 | Nonaka et al. | 354/403 |
| 5,235,377 | 8/1993 | Ide et al. | 354/403 |

FOREIGN PATENT DOCUMENTS 1-222235 9/1989 Japan.
2-212808 8/1990 Japan.

Primary Examiner—W. B. Perkey
Attorney, Agent, or Firm—Frishauf, Holtz, Goodman & Woodward

[57] ABSTRACT

A distance measurement apparatus for use in a camera having a CPU. The apparatus has no analog distance-measuring IC and can yet perform active distance measuring. It comprises an infrared-emitting diode (IRED), a light-receiving element and an integration circuit, both connected to the ports of the CPU. In operation, the IRED emits an infrared beam toward an object. The light-receiving element receives the beam reflected form the object and stationary light and converts the beam and the light into an electric signal. The integration circuit integrates the electric signal. The CPU measures a first period of time lapsing from the time when the the integration circuit is initialized to the time when the output of the integration circuit increases over a predetermined value. The CPU also measures a second period of time lapsing from the time when the the integration circuit is initialized to the time when the output of the integration circuit increases over the predetermined value while the IRED is emitting no infrared beam. From the first and second periods of time, thus measured, the CPU determines the distance at which the object is located, not influenced by from the stationary light at all.

71 Claims, 31 Drawing Sheets

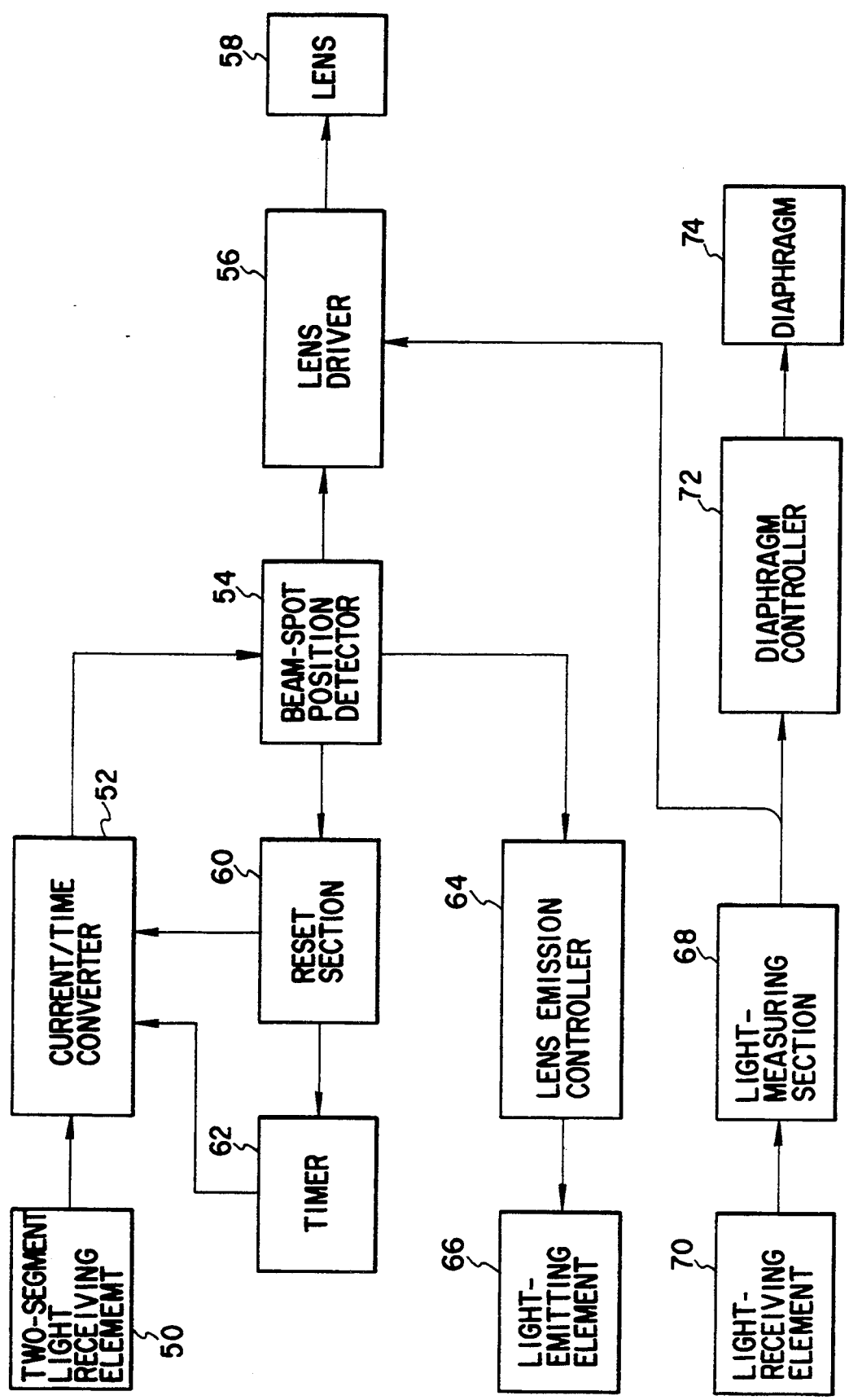
F I G. 4

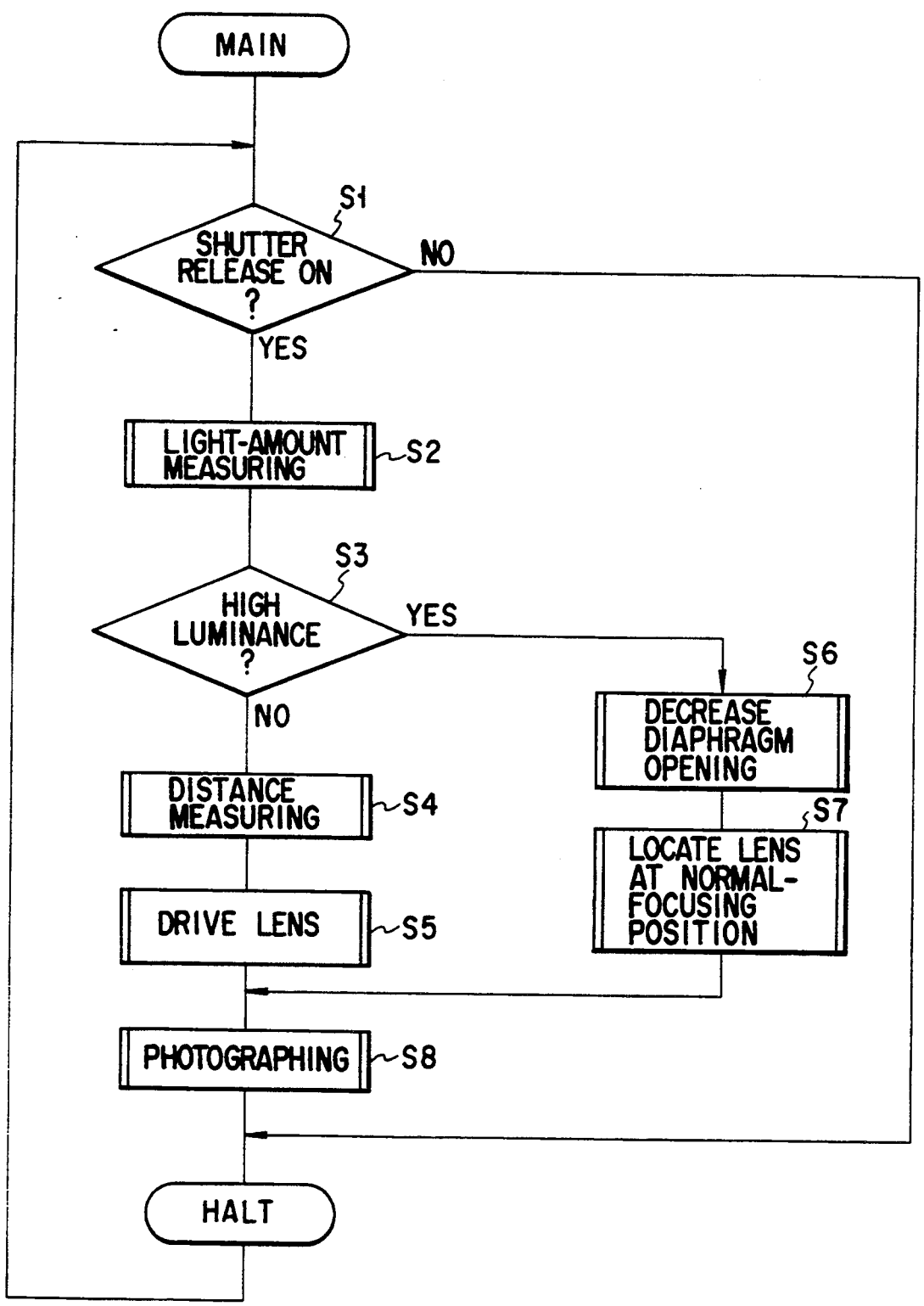
F I G. 6

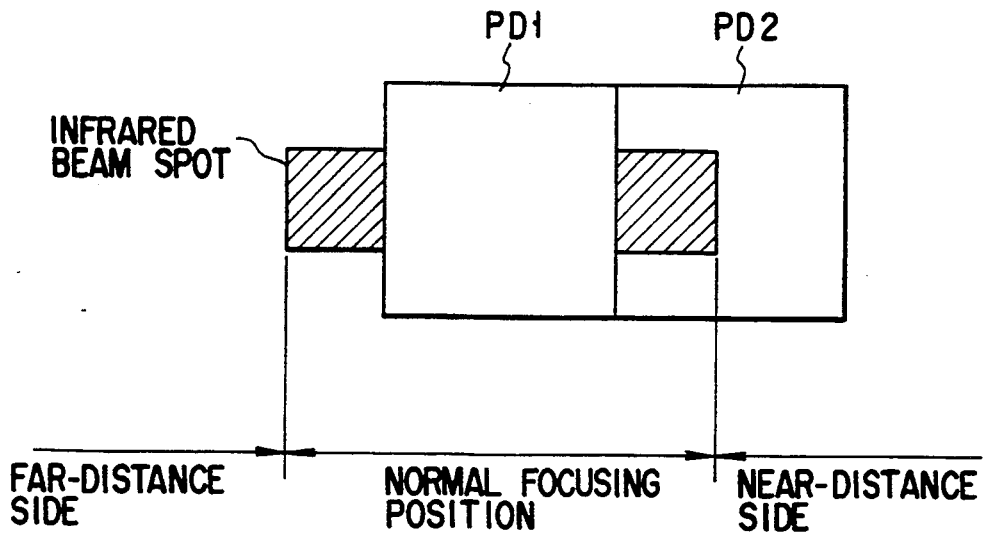
F I G. 9
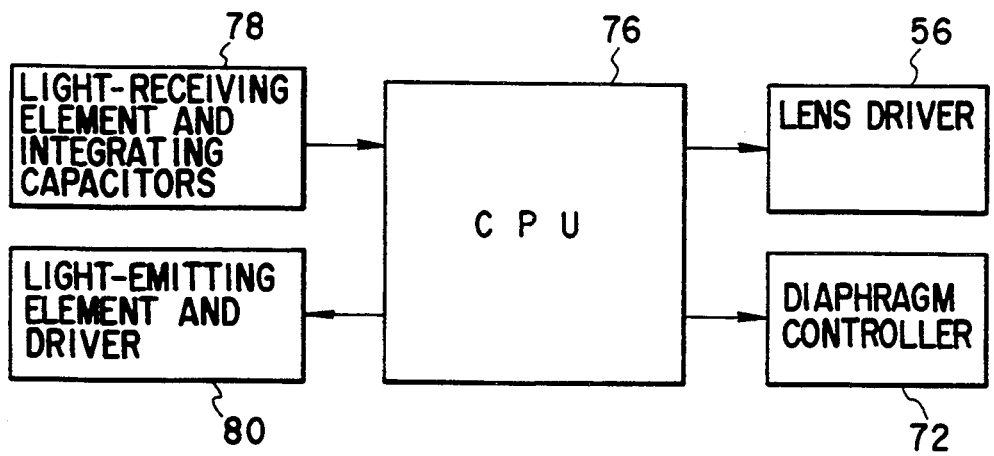
F I G. 10

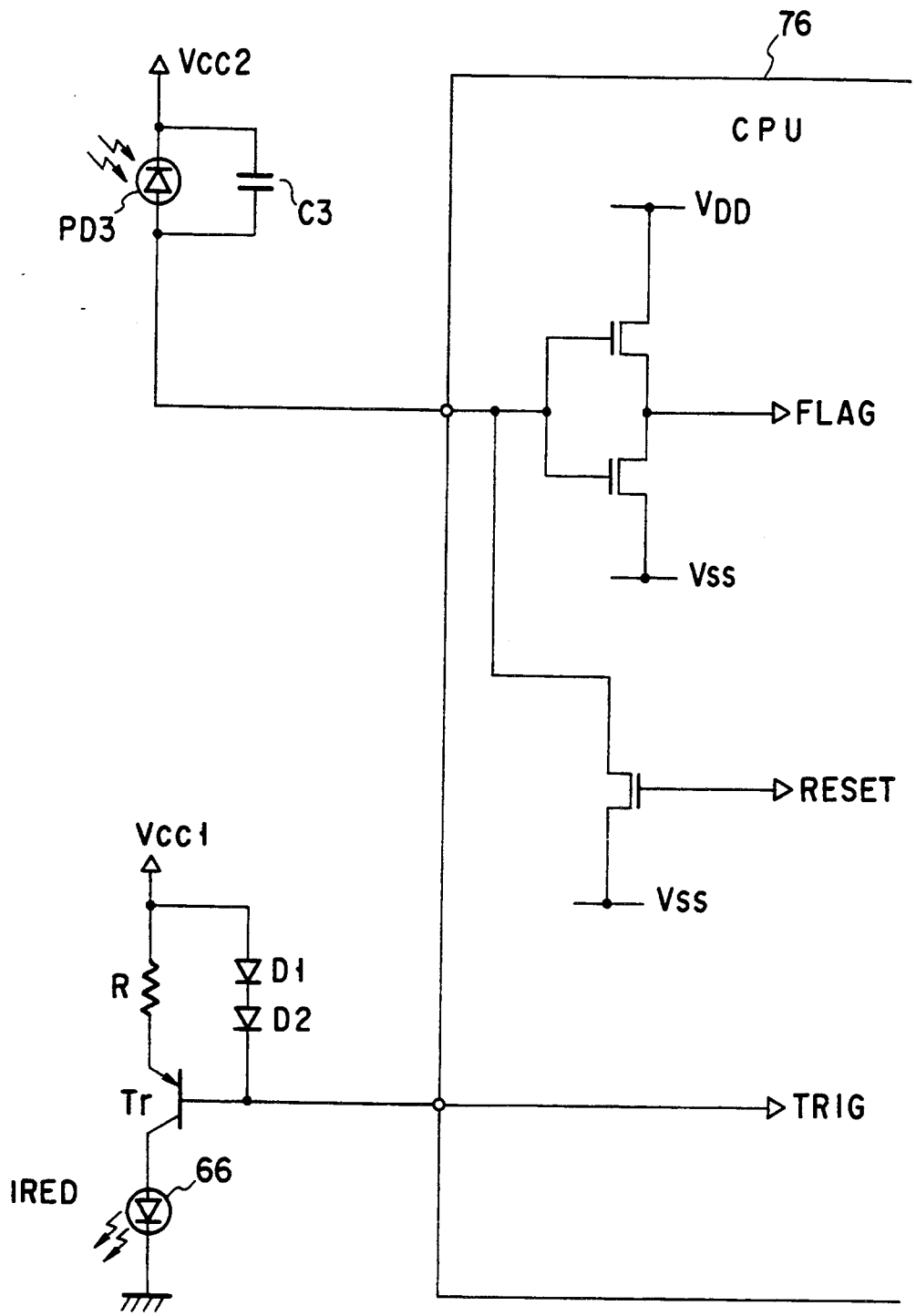
F I G. 11

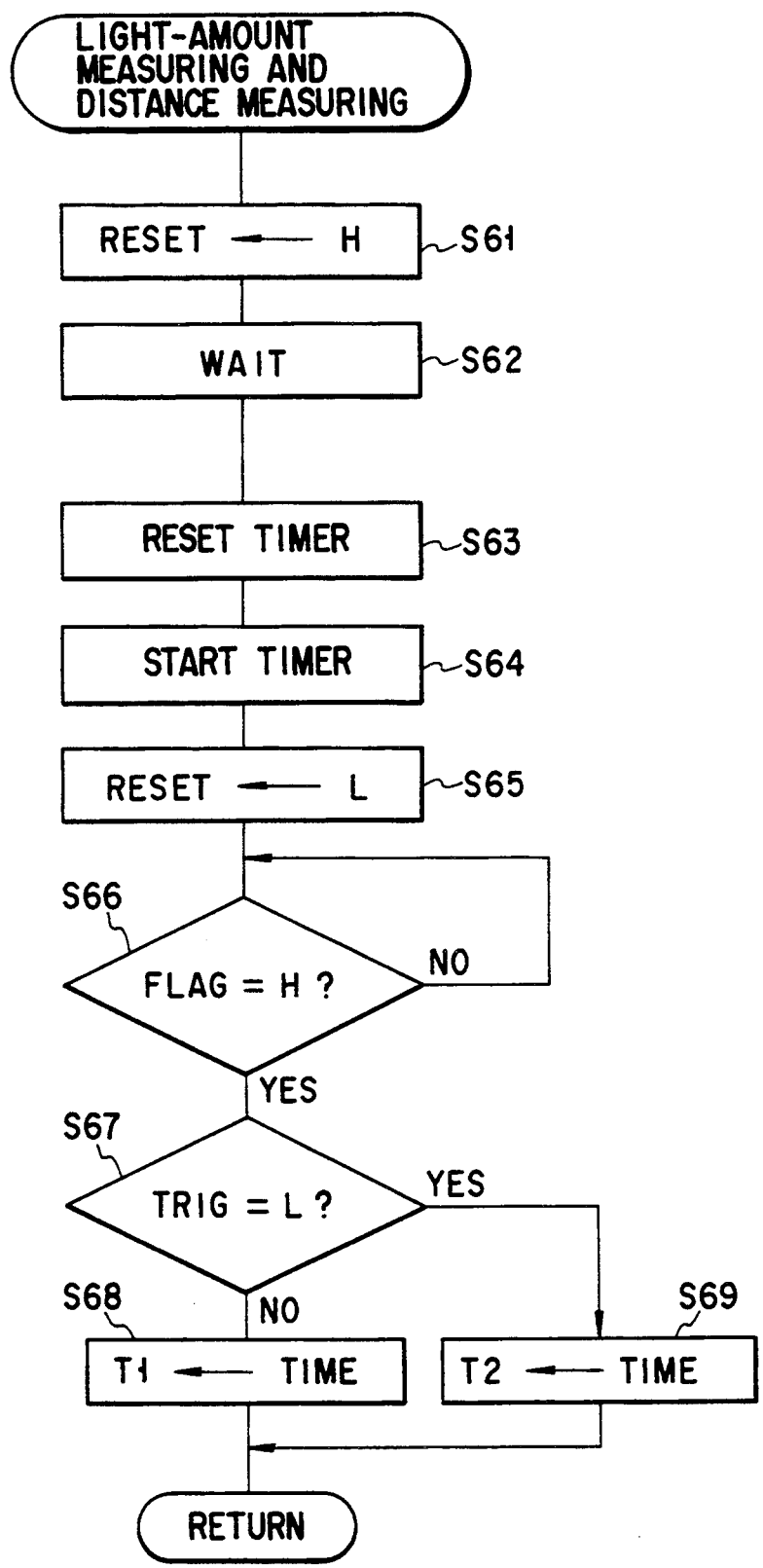
F I G. 13

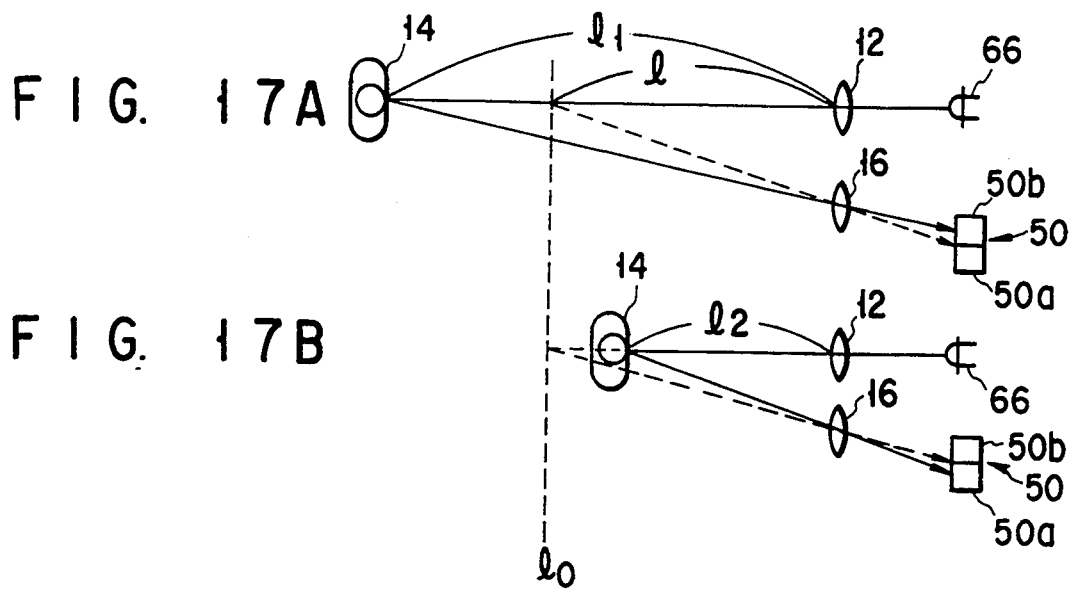
FIG. 17A
FIG. 17B
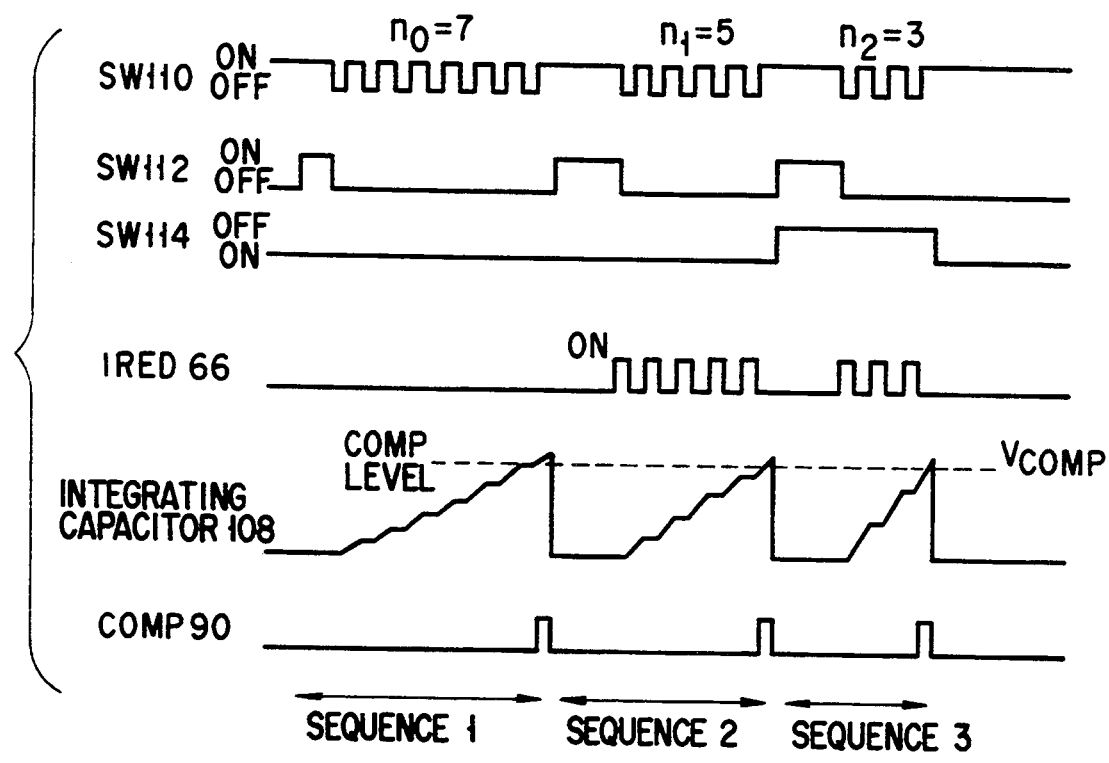
FIG. 18

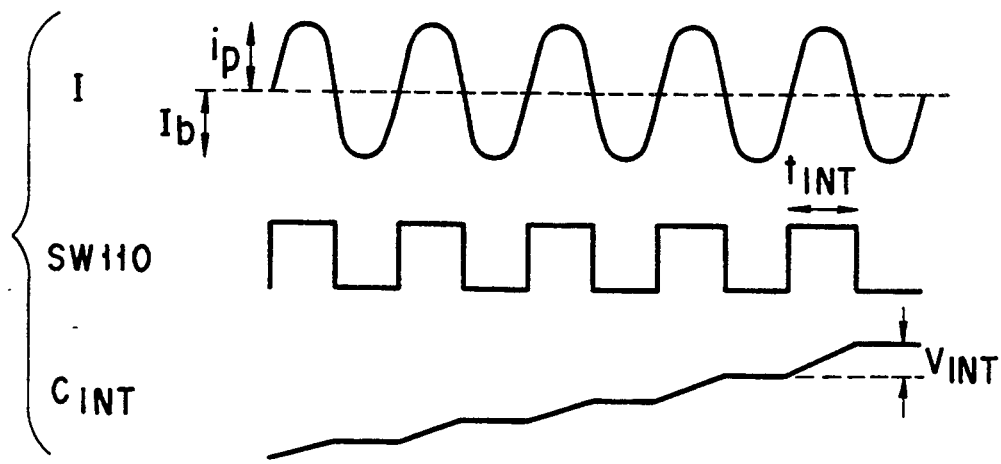
F I G. 21
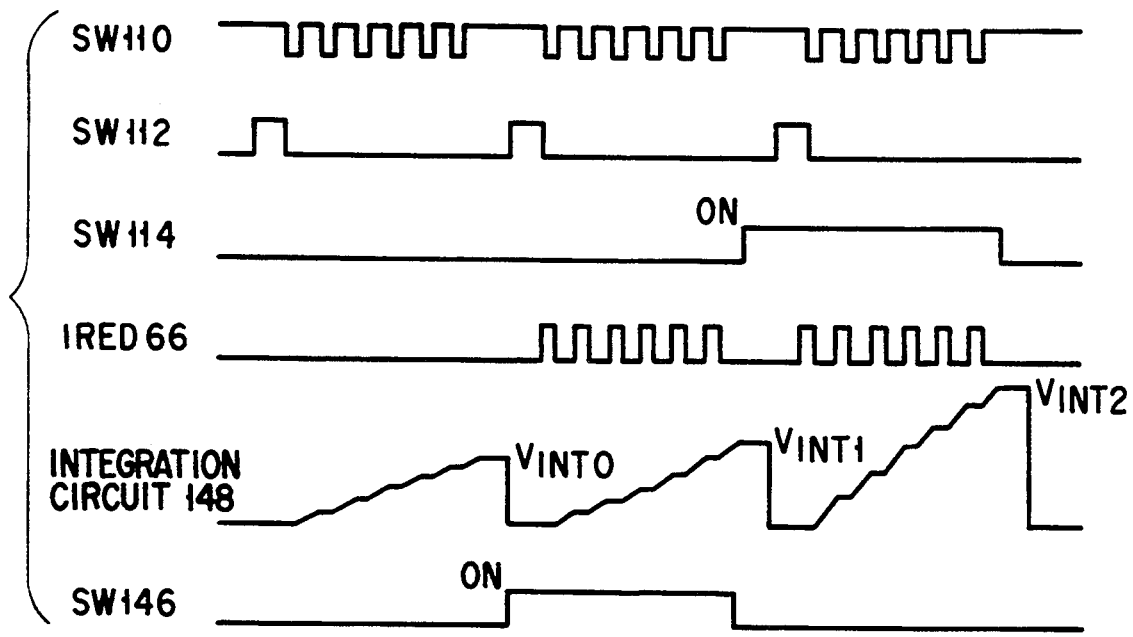
F I G. 22

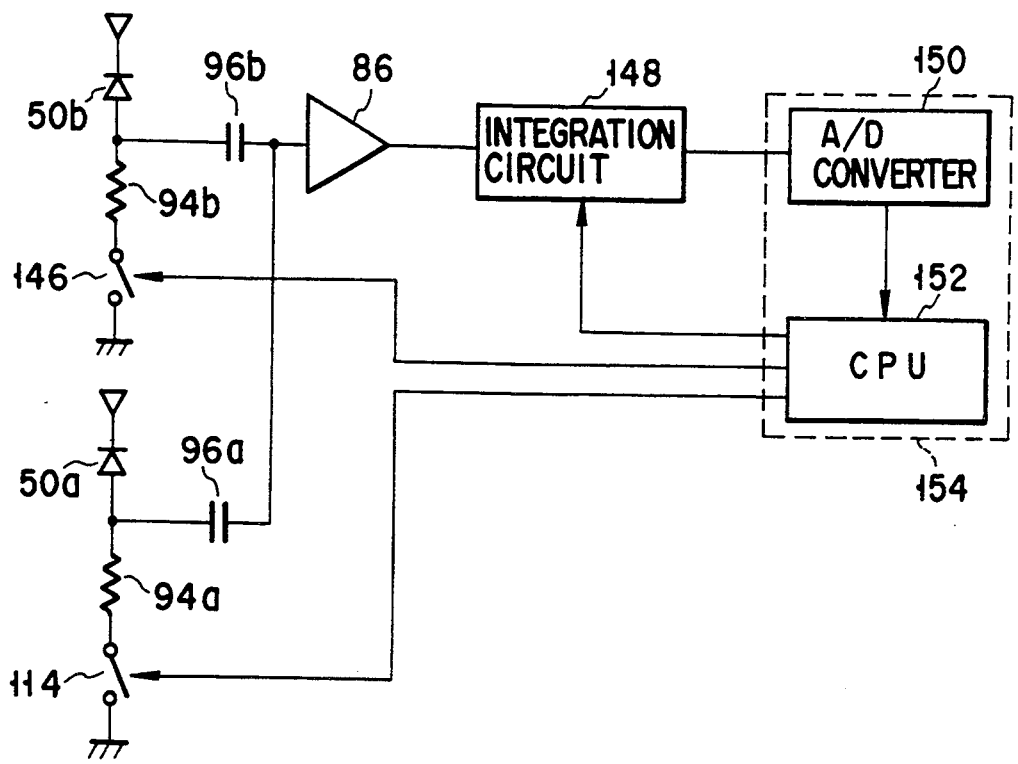
F I G. 23
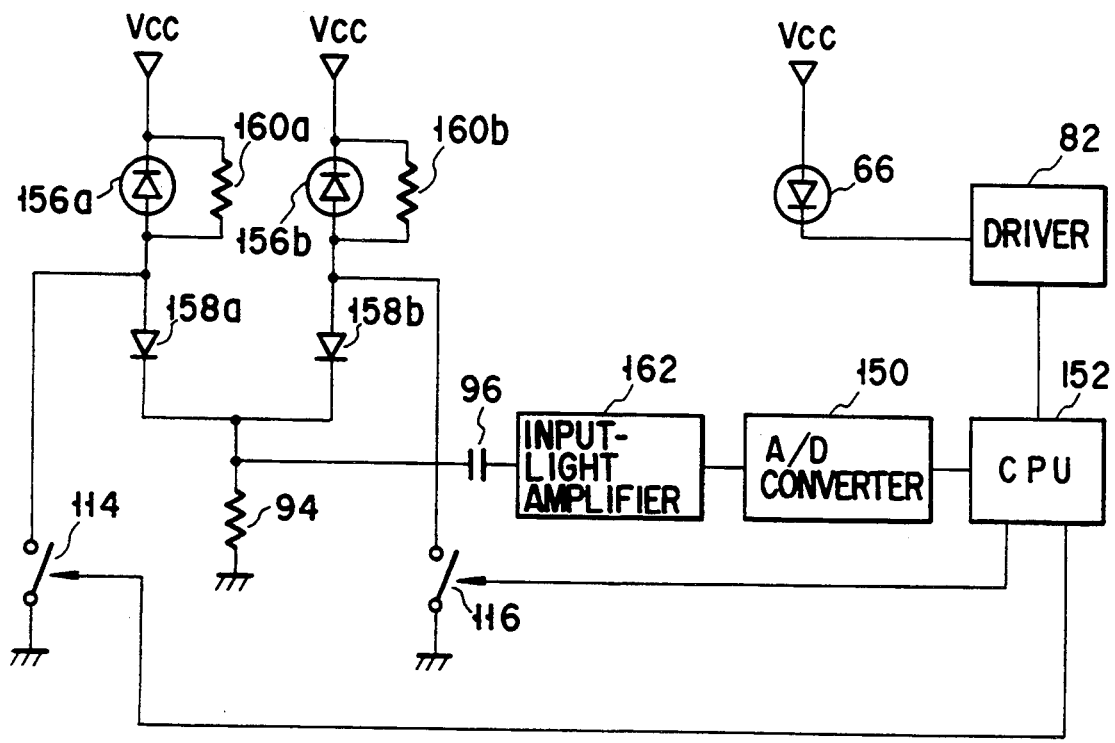
F I G. 24

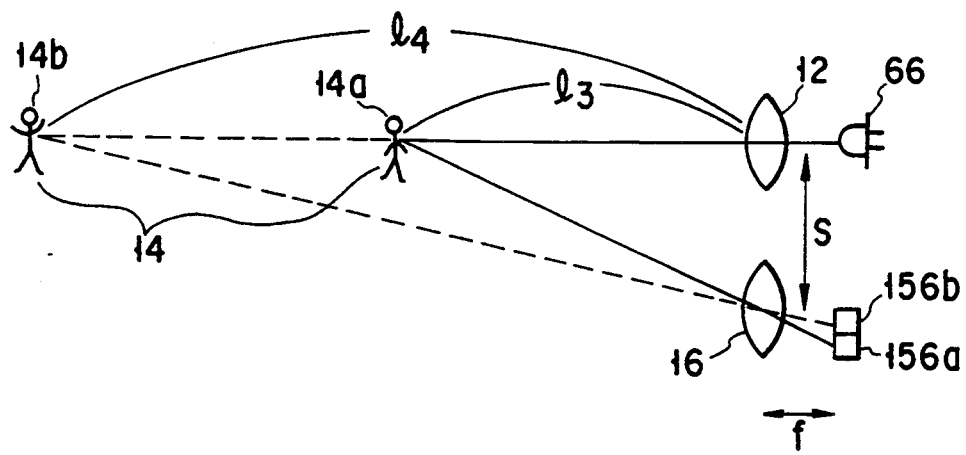
F I G. 25
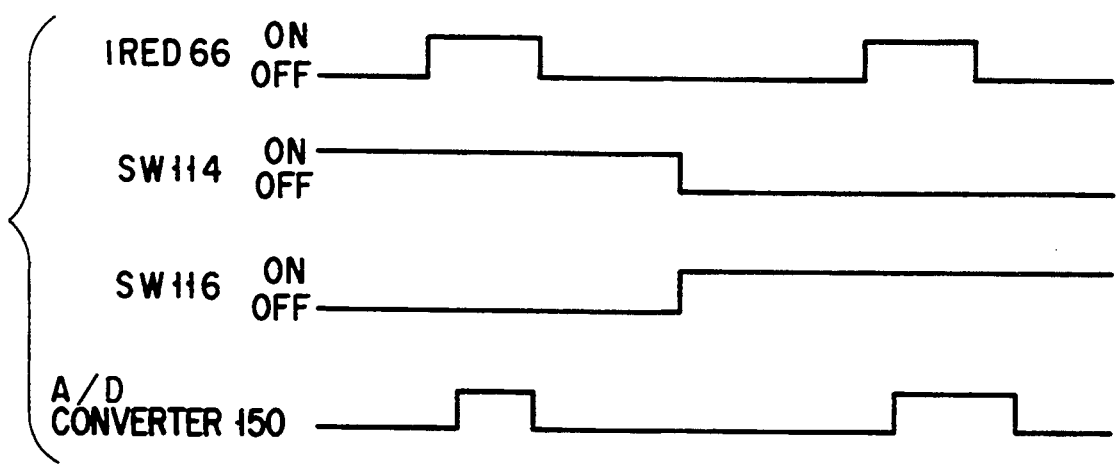
F I G. 26

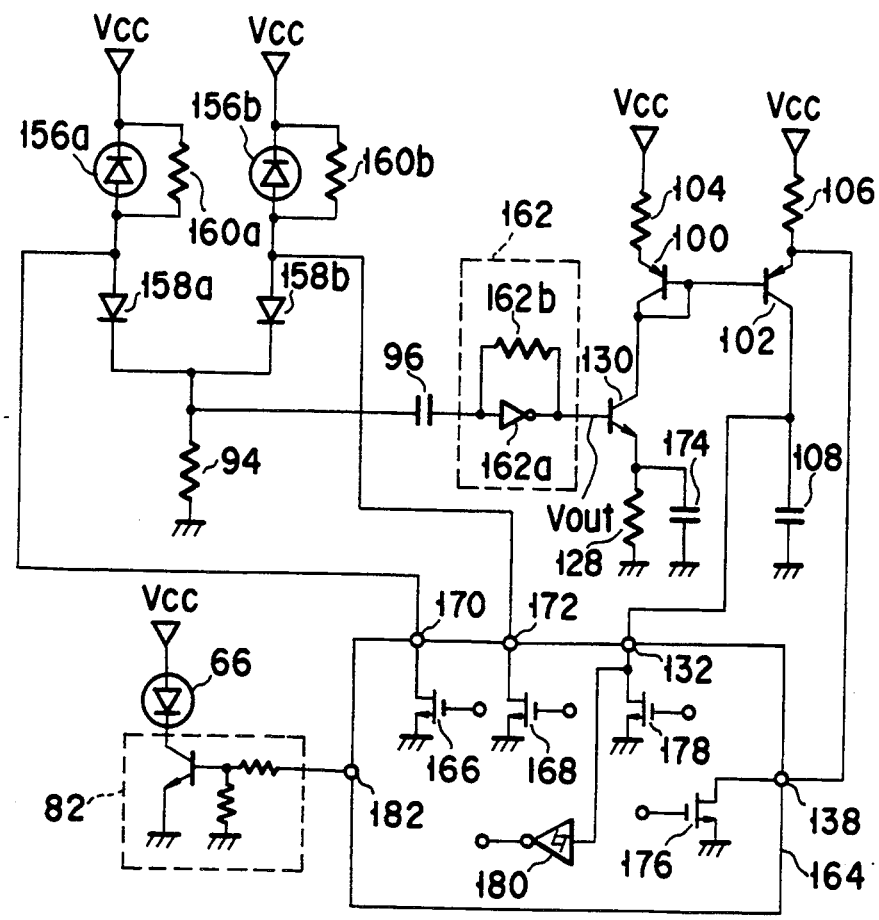
F I G. 27

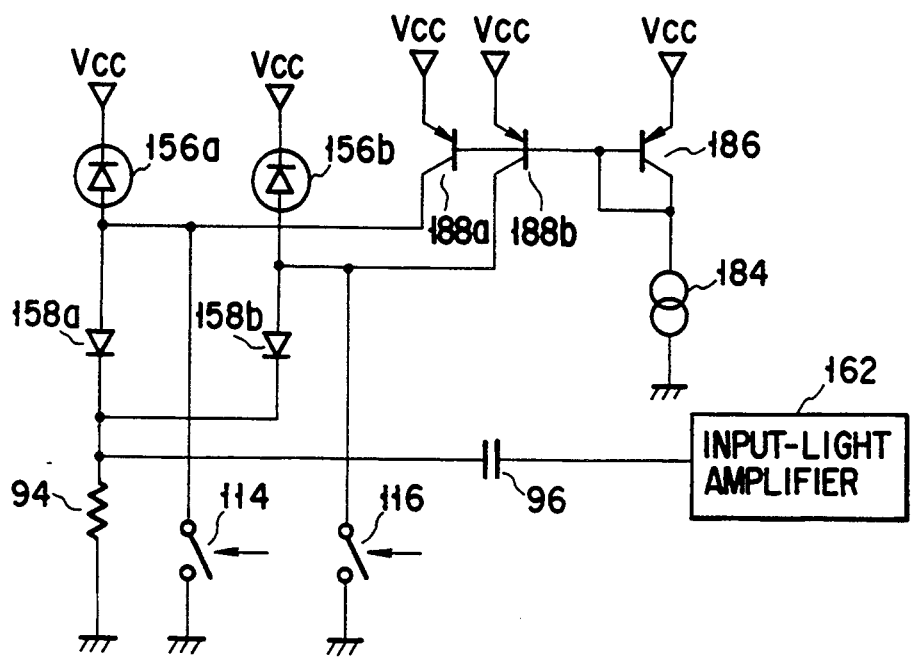
F I G. 30
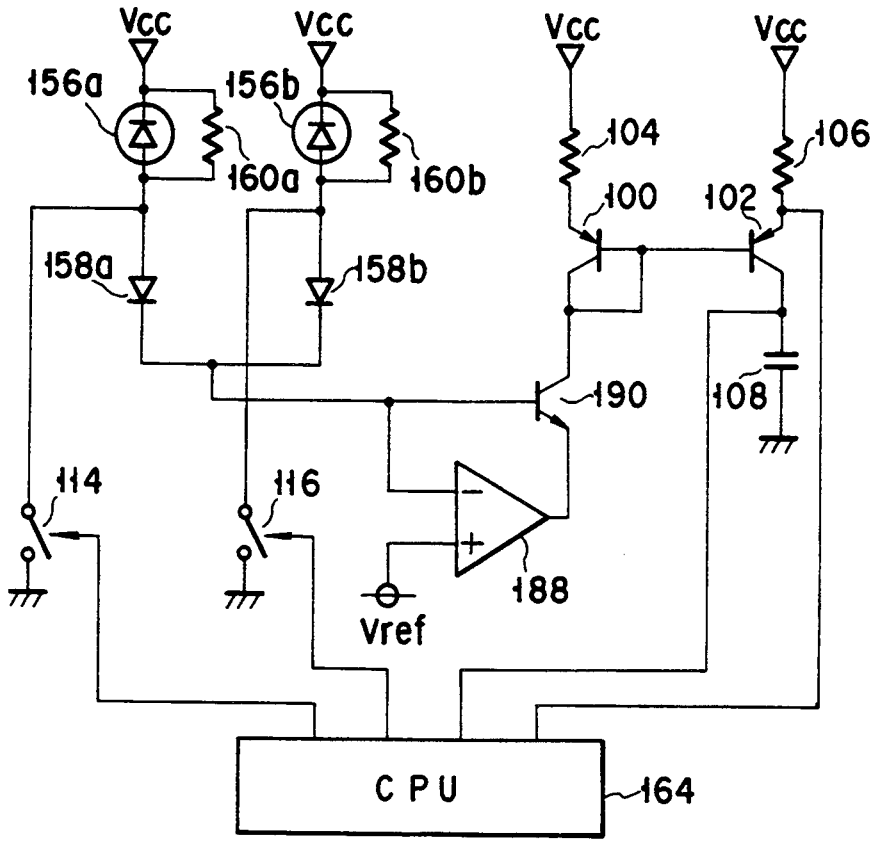
F I G. 31

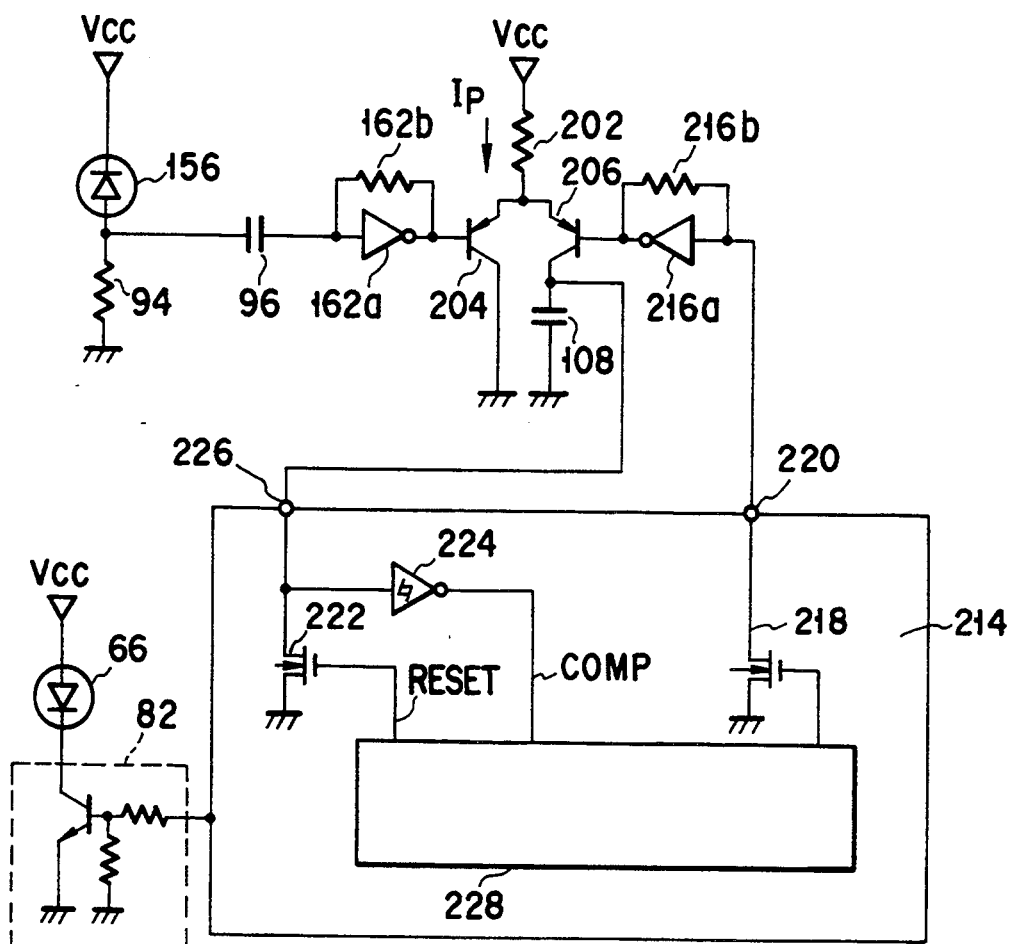
F I G. 36
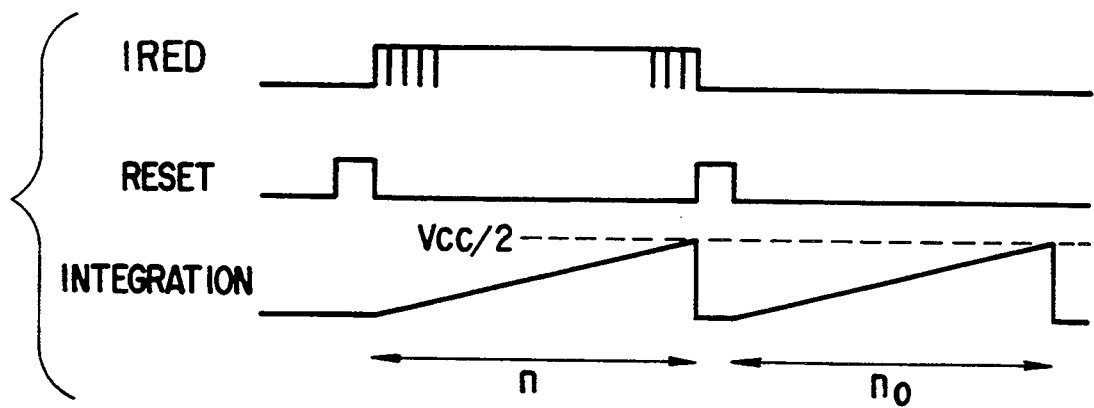
F I G. 37

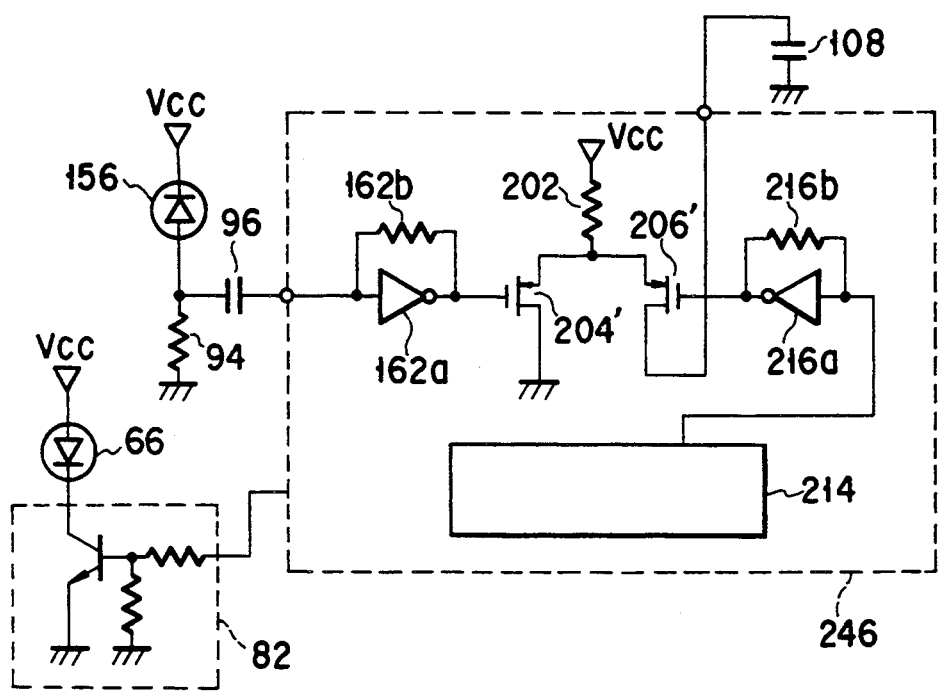
F I G. 46

LIGHT PROJECTION TYPE MEASUREMENT APPARATUS EFFECTIVELY UTILIZING A POST OF A ONE-CHIP MICROCOMPUTER

BACKGROUND OF THE INVENTION

1. Field of the Invention

The present invention relates to a distance measurement apparatus and, more particularly, to a distance measurement apparatus which performs active distance measurement without using an analog IC designed for distance measurement.

2. Description of the Related Art

Automatic camera operations, such as automatic exposure control and automatic film winding, have been developed. Recently, so-called "automatic focusing (AF)" has developed in which the lens of a camera is automatically moved to focus the image of an object on the film.

AF devices can be roughly classified into two types. The first is generally known as "passive type" which utilizes the data representing the luminance distribution of an object. The second is generally known as "active type" which projects a distance-measuring light beam to an object and measures the distance between the camera and the object from the light reflected from the object. The active AF device has a simple structure and comprises inexpensive components, and find its use in so-called compact cameras.

FIG. 1 is a block diagram of a conventional active AF device. As FIG. 1 shows, the active AF device comprises a sequence controller 2, an AF IC 4, a lens-driving unit 6, a driver 8, an infrared-emitting diode (IRED) 10, a light-projecting lens 12, a light-receiving lens 16, a light-receiving element 18.

The sequence controller 2 is designed to control the sequence of operations to be performed in the camera incorporating the AF device. More specifically, it receives the data which has been output by the AF IC 4 and which represents the distance l between the light-projecting lens 12 and an object 14, and controls the lens-driving unit 6 in accordance with the data output by the AF IC 4. Controlled by the sequence controller 2, the unit 6 operates the driver 8, which in turn energizes the IRED 10. The IRED 10, thus energized, emits an infrared beam, which is projected toward the object 14 through the light-projecting lens 12 and is reflected by the object 14. The reflected beam, or signal beam, is applied to the light-receiving element 18 through the light-receiving lens 16.

The longer the distance l, the smaller is the angle between the perpendicular to the surface of the element 18 and the path in which the signal beam travels to the element 18. Hence, the distance l can be determined from the position of the beam spot formed on the surface of the light-receiving element 18. The element 18 is a two-segment light-receiving element or an optical position sensing device (PSD). Whenever a signal beam is applied to the light-receiving element 18, forming a beam spot thereon, the element 18 outputs two signal currents $I_A$ and $I_B$ which vary in accordance with the position of the beam spot.

The signal currents $I_A$ and $I_B$ each consist of two components. The first component corresponds to the signal beam applied from the object 14. The second component, generally known as "stationary-light component," corresponds to the light superposed on the signal beam (e.g., the sunlight or part of the illumination light applied to the object 14). Unless the stationary-light component is removed from each signal current, the distance l can not be accurately calculated from the signal currents $I_A$ and $I_B$.

The AF IC 4 comprises stationary-light removing circuits 20a and 20b for removing the stationary-light components from the signal currents $I_A$ and $I_B$, respectively. The circuits 20a and 20b are preamplifiers which amplify only the photocurrents which the element 18 has generated from the signal beam. The AF IC 4 further comprises preamplifiers 22a and 22b, logarithmic compression circuits 24a and 24b, and a differential operating circuit 26. The preamplifiers 22a and 22b amplify the photocurrents which the element 18 has generated from the light superposed on the signal beam. The logarithmic compression circuits 24a and 24b perform logarithmic compression on the outputs of the preamplifiers 22a and 22b, respectively. The differential operating circuit 26 finds the difference between the outputs of the logarithmic compression circuits 24a and 24b.

Logarithmic compression and differential operation, both known in the art, are performed on the signal currents $I_A$ and $I_B$ in the AF IC 4. The ratio of the signal current $I_A$ to the signal current $I_B$ is thereby supplied from the AF IC 4 to the sequence controller 2. In accordance with the current ratio, $I_A/I_B$, the controller 2 controls the lens-driving unit 6, thereby focusing the image of the object 14 on the film.

It is the recent trend that the sequence controller incorporated in an active AF device is a central processing unit (CPU) which comprises a one-chip microcomputer. This is because CPUs have become inexpensive enough to be built as active AF devices designed for use in low-price cameras.

A CPU has many input-output ports and performs various functions. It can control external components, detect the operating conditions thereof, and perform arithmetic operations on the data representing the conditions detected—in accordance with the programs built in it.

SUMMARY OF THE INVENTION

Accordingly it is an object of this invention to provide a distance measurement apparatus which is far more simple than one incorporating a conventional AF IC and which is inexpensive enough to be used in low-price cameras.

Another object of the invention is to provide a distance measurement apparatus which comprises a CPU and a light-receiving element and an integration circuit, both connected to the CPU, and utilizes all functions of the CPU, and which is simple in structure, not using an AF IC, is so inexpensive as can be built in low-price cameras, and can yet perform automatic focusing, serving to take clear-cut photographs.

Still another object of the present invention is to provide a distance measurement apparatus which has a simple circuit configuration and which can yet accomplish a high-precision automatic focusing.

In a first aspect of the invention, there is provided a distance measurement apparatus comprising: light-projecting means for projecting light toward an object; first light-receiving means for receiving light reflected from the object and converting the light into a first electric signal; second light-receiving means located adjacent to the first light-receiving means, for receiving light reflected from the object and converting the light into a second electric signal; first integration means connected to the first light-receiving means; second integration means connected to the second light-receiving means; first integration reset terminal and first inverter terminal of a microcomputer, both connected to the first integration means; second integration reset terminal and second inverter terminal of the microcomputer, both connected to the second integration means; time-measuring means incorporated in the microcomputer, for measuring a period of time lapsing from a time when the first or second integration means is reset by a signal supplied from the first or second integration reset terminal to a time when a first inverter incorporated in the microcomputer and connected to the first inverter terminal or a second inverter incorporated in the microcomputer and connected to the second inverter inverts an input signal; memory means for storing a first measured period of time lapsing until the first inverter inverts an input signal while the light-projecting means is projecting no light, a second measured period of time lapsing until the second inverter inverts an input signal while the light-projecting means is projecting no light, a third measured period of time lapsing until the first inverter inverts an input signal while the light-projecting means is projecting light, and a fourth measured period of time lapsing until the second inverter inverts an input signal while the light-projecting means is projecting light; and means for eliminating influence of background light in accordance with a difference between the first and third measured periods of time and a difference between the second and fourth measured periods of time.

In a second aspect of the invention, there is provided a distance measurement apparatus comprising: light-projecting means for projecting light toward an object; light-receiving means for receiving light reflected from the object and inverting the light into an electric signal; an integration circuit for integrating a signal produced from the electric signal; and a microcomputer connected to the integration circuit and comprising a light projection control section for controlling the light-projecting means, an integration reset section for resetting the integration circuit, a detection section for detecting that an output of the integration circuit has reached a predetermined value, time-measuring means for measuring a period of time a lapsing from a time when the reset section resets the integration circuit to a time when the output of the integration circuit reaches the predetermined value, and an operation section for calculating a distance at which the object is located, from the period of time measured by the time measuring means.

In a third aspect of the invention, there is provided a distance measurement apparatus comprising: light-projecting means for repeatedly projecting a light beam toward an object; first light-receiving means for receiving a light beam reflected from the object and converting the light beam into a first electric signal; second light-receiving means located adjacent to the first light-receiving means, for receiving a light beam reflected from the object and converting the light beam into a second electric signal; first switch means connected to the first light-receiving means, for outputting the first electric signal when turned on; amplification means connected to the first and second light-receiving means, for AC-amplifying the first electric signal and the second electric signal; integration means connected to the amplification means, for integrating a signal generated from the first electric signal or the second electric signal, the integration means having reset means for initializing an integration output and second switch means for initiating integration in synchronism with light beam projection performed by the light-projecting means; detection means for detecting that an output of the integration means has reached a predetermined value; and distance-determining means for determining the distance from a difference between a first integration period and a second integration period, the first period of time being one lapsing until the detection means detects that the output of the integration means has reached the predetermined value, while the light-projecting means is projecting no light beam, and the second period of time being one lapsing until the detection means detects that the output of the integration means has reached the predetermined value, while the light-projecting means is projecting a light beam, whereby the distance is calculated from data free of a DC component, by using the difference between the first integration period and the second integration period.

In a fourth aspect of the invention, there is provided a distance measurement apparatus comprising: light-projecting means for repeatedly projecting a light beam toward an object; a plurality of light-receiving means for receiving light beams reflected from the object and converting the light beams into electric signals; switch means connected to at least one of the light-receiving means, for switching electric signals output by the light-receiving means; amplification means connected to the light-receiving means, for AC-amplifying signals produced from the electric signals; integration means connected to the amplification means, for integrating signals amplified by the amplification means; and distance-determining means for determining a distance at which the object is located, from an output which the integration means has generated by integrating outputs produced by the light-receiving means and selected by the switch means.

In a fifth aspect of the invention, there is provided a distance measurement apparatus comprising: light-projecting means for projecting a light beam toward the object; light-receiving means comprising at least two photoelectric elements for receiving a light beam reflected from the object; light reception control means for controlling at least one of the photoelectric elements; amplification means for amplifying a signal output from the light-receiving means; and integration means for integrating a signal output from the photoelectric means or a signal corresponding to the electric signal; and a microcomputer for controlling the light-projecting means, the light reception control means, and the integration means, thereby to monitor integration being performed by the integration means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a block diagram showing a distance measurement apparatus according to a second embodiment of the present invention;

FIG. 6 is a flow chart explaining the operation of the apparatus shown in FIGS. 4 and 5;

FIG. 9 is a diagram showing the positional relation between the two photodiodes shown in FIG. 5 and the beam spot formed on the light-receiving surface of the apparatus, and also representing the position of the lens with respect to the beam spot;

FIG. 10 is a block diagram showing a distance measurement apparatus according to a third embodiment of the present invention;

FIG. 11 is a circuit diagram of the apparatus shown in FIG. 10;

FIG. 13 is a flow chart illustrating the light-measuring subroutine and the distance-measuring subroutine, both performed in the apparatus of FIG. 10;

FIGS. 17A and 17B are diagrams, each showing the positional relation between an object and a two-segment light-receiving element;

FIG. 18 is a timing chart for explaining the operation of the apparatus shown in FIG. 16;

FIG. 21 is a timing chart explaining the operation of the sixth embodiment;

FIG. 22 is a timing chart explaining the operation of a distance measurement apparatus according to a seventh embodiment of the invention;

FIG. 23 is a block diagram showing a distance measurement apparatus according to the seventh embodiment;

FIG. 24 is a circuit-block diagram illustrating a distance measurement apparatus according to an eighth embodiment of this invention;

FIG. 25 is a diagram for explaining the principle of trigonometric distance measuring, and representing the positional relation between the IRED and the photodiodes;

FIG. 26 is a timing chart explaining the operation of the eighth embodiment;

FIG. 27 is a circuit diagram showing a distance measurement apparatus according to a ninth embodiment of this invention;

FIG. 30 is a circuit diagram showing a distance measurement apparatus according to a tenth embodiment of this invention;

FIG. 31 is a circuit diagram showing a distance measurement apparatus according to an eleventh embodiment of this invention;

FIG. 36 is a circuit diagram showing a distance measurement apparatus according to a fifteenth embodiment of the present invention;

FIG. 37 is a timing chart explaining how integration is performed in the apparatus of FIG. 36;

FIG. 46 is a circuit diagram showing a distance measurement apparatus according to a twentieth embodiment of this invention.

DETAILED DESCRIPTION OF THE PREFERRED EMBODIMENTS

Embodiments of the present invention will now be described with reference to the accompanying drawings.

Figure 1:
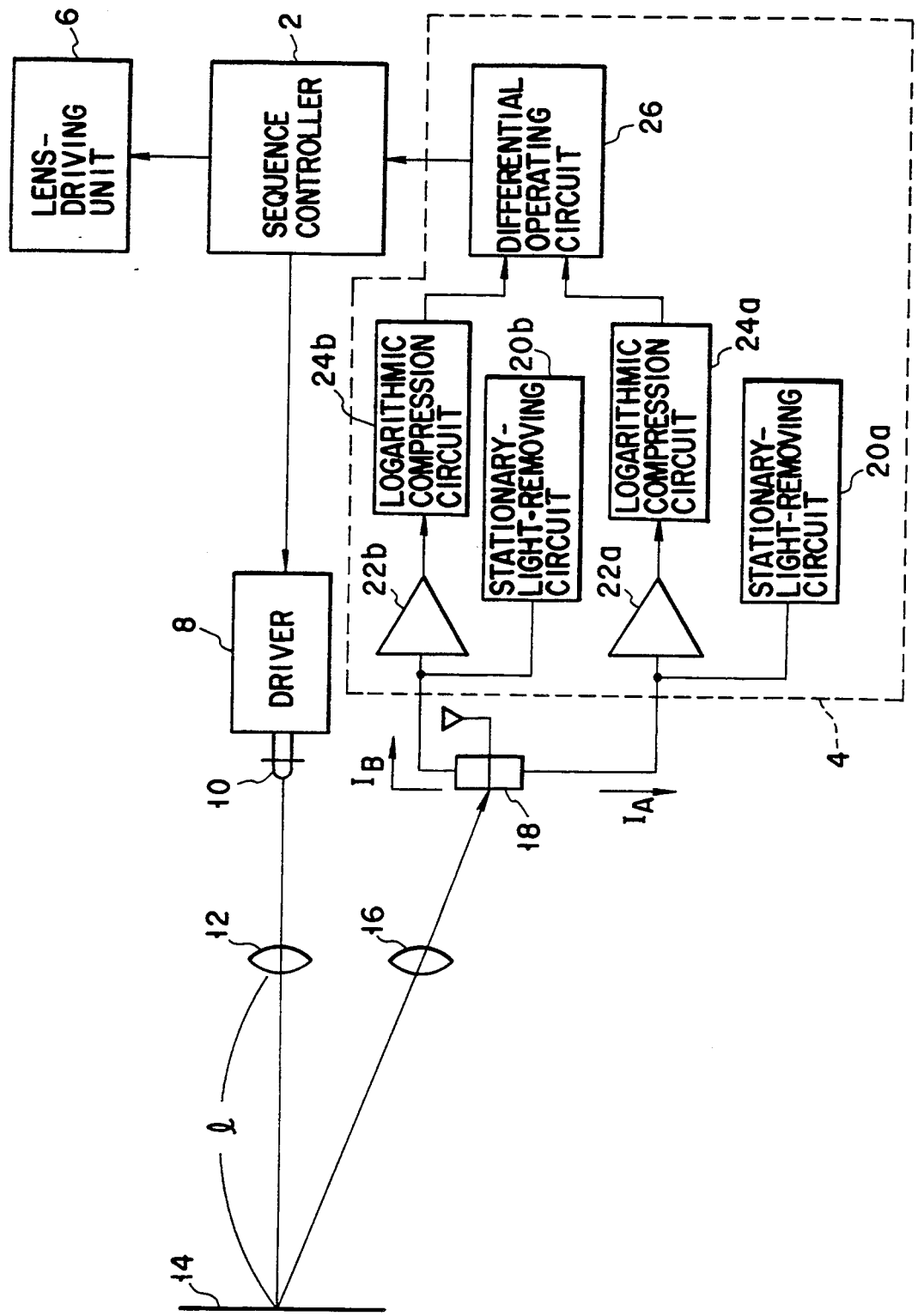
FIG. 1 is a block diagram showing a conventional active AF device.
Figure 2:
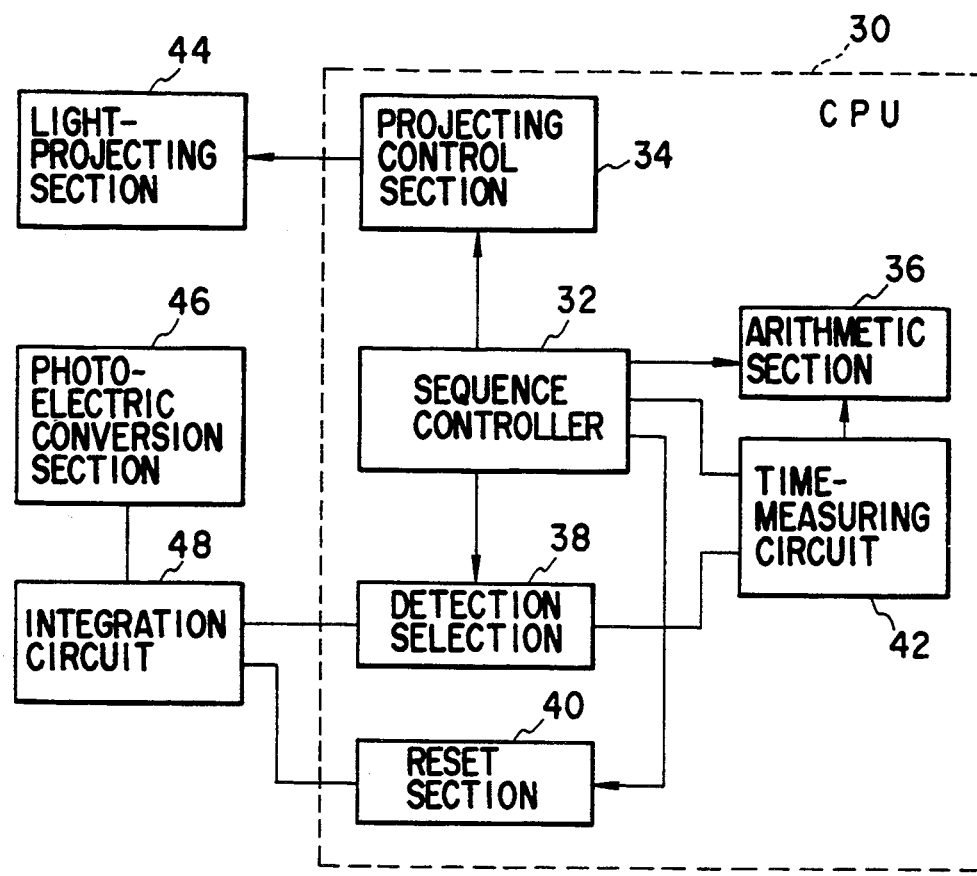
FIG. 2 is a block diagram showing a distance measurement apparatus according to a first embodiment of the invention, and explaining the concept of the active automatic focusing (AF) performed by the apparatus.

FIG. 2 is a block diagram showing a distance measurement apparatus according to a first embodiment of the invention, and explaining the concept of the active automatic focusing (AF) performed by the apparatus. As is shown in the figure, the apparatus comprises a CPU 30, a light-projecting section 44, a photoelectric conversion section 46, and an integration circuit 45. The CPU 30 includes a sequence controller 32, a projection control section 34, an arithmetic section 36, a detection section 38, a reset section 40, and a time-measuring circuit 42. The sequence controller 32 controls the projection control section 34, the arithmetic section 36, the detection section 38, and the reset section 40. The time-measuring circuit 42 measures time and supplies time data to the sequence controller 32. The projection control section 34 controls the light-projecting section 44, so that the section 44 projects a light beam toward an object of photography. The photoelectric conversion section 46, functions as light-receiving means, receives a light beam reflected from the object and converts it into an electric signal. The electric signal is input to the integration circuit 48. The circuit 48 integrates the stationary-light components (later described) of the electric signal, in accordance with the outputs of the detection section 38 and the reset section 40. The light-projecting section 44 and the photoelectric conversion section 46 are of the same types as those incorporated in the conventional AF device shown in FIG. 1.

The distance measurement apparatus of FIG. 2 has no stationary-light removing circuits. Nor does it have a current ratio calculator which performs logarithmic compression and differential operation on signal currents to obtain a signal-current ratio. It is the CPU 30 and the integration circuit 48 that accomplish both logarithmic compression and differential operation.

It will now be explained how the apparatus of FIG. 1 operates. Stationary-light components are removed by the following specific method. First, while applying no light beam to the object, the integration circuit 48 integrates the output voltage of the photoelectric conversion section 46 until the integrated voltage reaches a predetermined value. Next, while applying a light beam, the integration circuit 48 integrates the output voltage of the section 46 until the integrated voltage reaches the predetermined value. The time the circuit 48 requires to integrate the voltage to said value is shorter than the time it needs to spend to integrate the voltage to the same value while no light beam is being applied to the object. Hence, the difference between these time periods is the voltage which corresponds to the amount of light reflected from the object.

Figure 3:
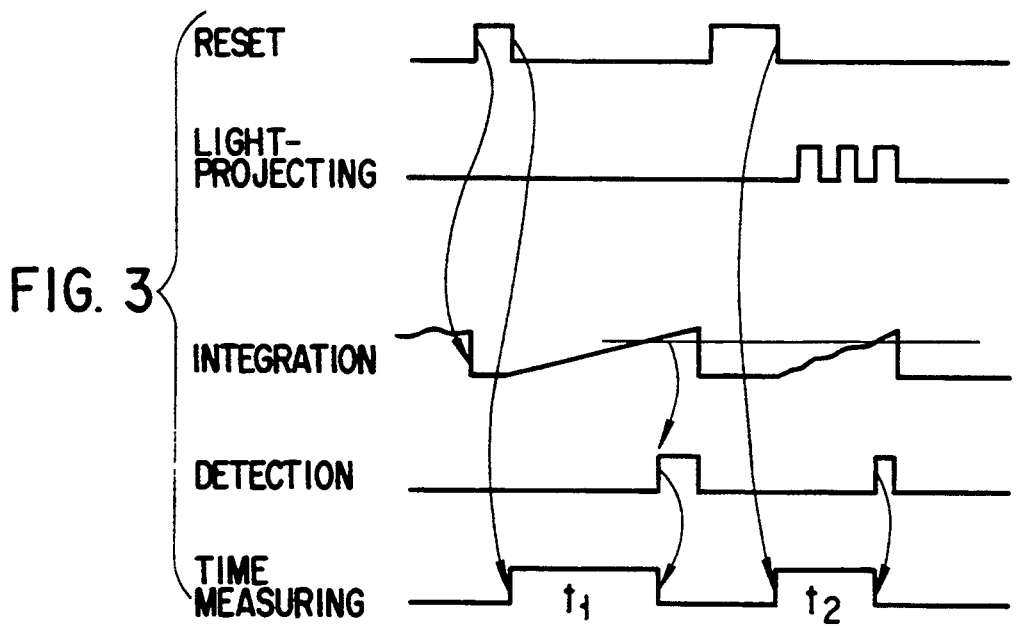
FIG. 3 is a timing chart explaining the operation of the apparatus shown in FIG. 2.

The method of removing the stationary-light components will be described, in greater detail, with reference to the timing chart of FIG. 3.

First, while applying no light beams to the object, the reset section 40 initializes the integration circuit 48. More precisely, the circuit 48 starts integrating the output voltage (i.e., the stationary-light component) of the photoelectric conversion section 46 at the trailing edge of a reset pulse output by the section 40. Also, at the trailing edge of the reset pulse, the time-measuring circuit 42 (e.g., a timer) starts measuring time. The detection section 38 detects whether or not the voltage output by the section 48 reached the predetermine value. Upon detecting the voltage reaching the predetermined value, the section 38 outputs a detection pulse, which is supplied to the time-measuring circuit 42. The circuit 42 stops measuring time at the leading edge of the detection pulse. Hence, the time period $t_1$ between the time the integration circuit 48 is completely reset and the time the detection circuit 38 detects the voltage of the predetermined value.

Then, the projection control section 34 drives the light-projecting section 44, such that the section 44 emits light beams sequentially to the object. While the light beams are being emitted to the object, the same operations as described in the preceding paragraph are performed in sequence. The time-measuring circuit 42 thereby measures the time period $t_2$ between the time the integration circuit 48 is completely reset and the time the detection circuit 38 detects the voltage of the predetermined value.

The time-measuring circuit 42 supplies data items representing the time periods $t_1$ and $t_2$ to the arithmetic section 36. Obviously, the period $t_1$ is longer than the period $t_2$—that is, $t_1 > t_2$. The section 36 performs subtraction of $t_1 - t_2$, thereby removing the stationary-light components from the signal voltage which corresponds to the amount of light reaching the photoelectric conversion section 46. As a result, the amount of a signal light beam which the section 46 (i.e., a light-receiving element) receives is calculated.

In the CPU 30, the sequence controller 32 controls the sequence of operations. The arithmetic operations the section 36 performs are among the functions of a one-chip microcomputer. The detection section 38 has an input port provided with a Schmitt trigger, and the reset section 40 has an input-output port. The sections 38 and 40 can therefore be built in a one-chip microcomputer, as well. Hence, all components of the CPU 30, which are shown in FIG. 2, can be incorporated in a one-chip microcomputer.

The CPU 30, the photoelectric conversion section 46, and the integration circuit 48 may have two input ports and two output ports each. If so, the CPU 30 can perform digital division on the two voltages output by the section 46 and integrated by the the circuit 48. In this case, the CPU 30 and the integration circuit 48 cooperate to perform the function of the IC 4 used in the conventional active AF device (FIG. 1).

Figure 5:
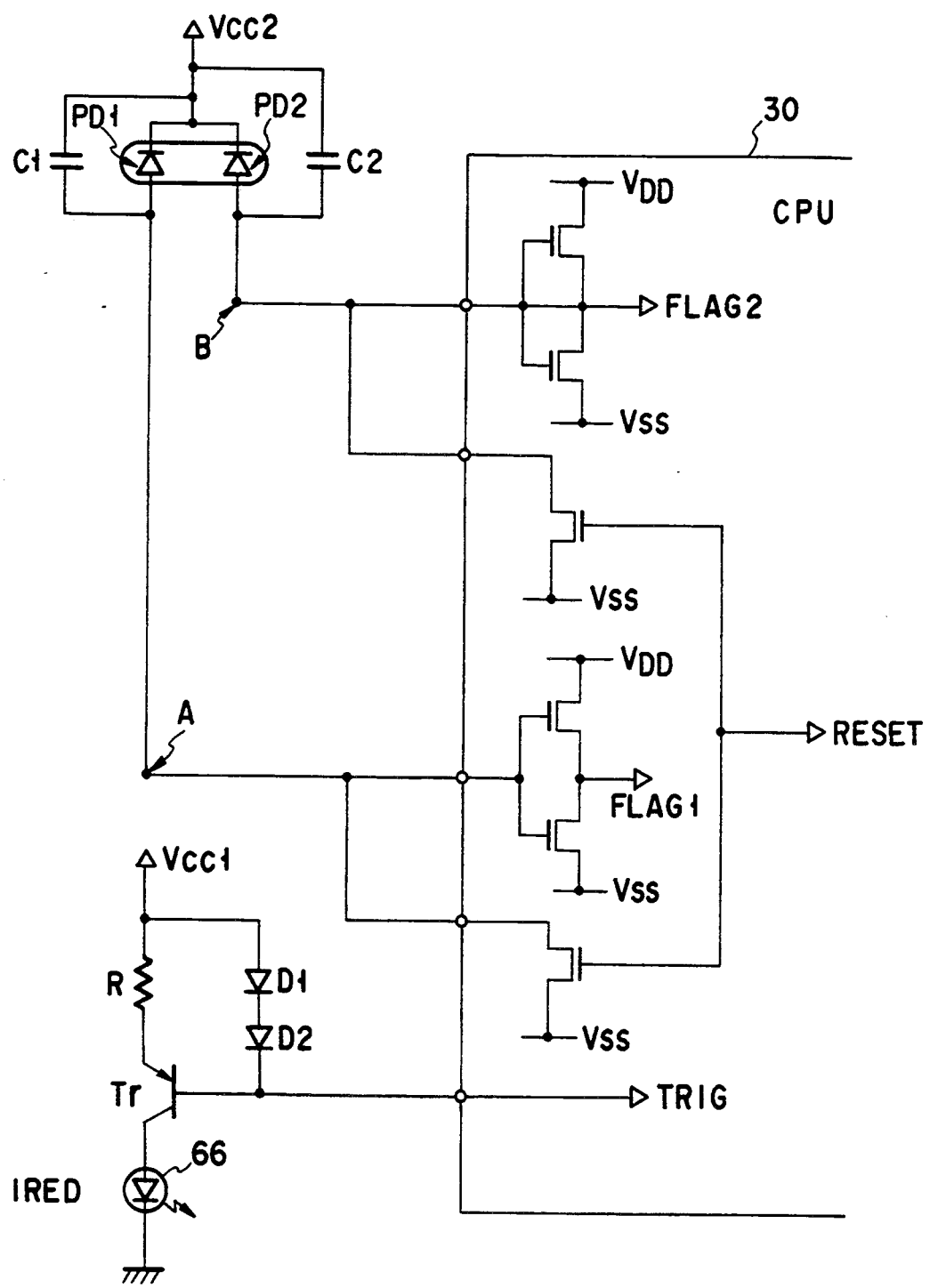
FIG. 5 is a circuit diagram of the apparatus shown in FIG. 4.

A distance measurement apparatus according to a second embodiment of the invention will be described with reference to FIGS. 4 and 5. FIGS. 4 and 5 are a block diagram and circuit diagram of the apparatus, respectively.

The distance measurement scheme of this apparatus will be first described. As FIG. 5 shows, two photodiodes PD1 and PD2 are connected in parallel to integrating capacitors C1 and C2, respectively. The capacitors C1 and C2 are connected to a CPU 30. When a reset signal is set at a high level (hereinafter referred to as "H level"), points A and B are set at the ground potential GND, whereby the integration capacitors C1 and C2 are charged. Upon completion of the charging in the capacitors C1 and C2, the reset signal is set at a low level (hereinafter referred to as "L level"). Due to the photocurrents generated by the photodiodes PD1 and PD2, the integrating capacitors C1 and C2 are discharged. As a result, the potentials at the points A and B gradually increase.

When the potentials at the points A and B fall to ½ $V_{DD}$, signals FLAG1 and FLAG2 rise from the L level to the H level. The reset signal is thereby set at the L level, discharging the integrating capacitors C1 and C2. At the start of this discharging, the timer 62 incorporated in the apparatus (FIG. 4) starts measuring time. The timer 62 keeps measuring time until the levels of the signals FLAG1 and FLAG2 rise to the H level. This time measuring is performed twice for each photodiode, first while an IRED 66 is applying no infrared beam to an object, and then while the IRED 66 is applying an infrared beam to the object. (In this embodiment, the time measuring is effected four times in all since two photodiodes are used in the embodiment, i.e., diodes PD1 and PD2.)

The four periods of time, thus measured, are compared with one another, thereby detecting the position which the center of the beam spot formed by the infrared beam reaching the distance measurement apparatus assumes with respect to the surface of the light-receiving element. Hence, so-called "three-step automatic focusing" can be accomplished.

As is shown in FIG. 4, the distance measurement apparatus comprises a two-segment light-receiving element 50, a current/time converter 52, a beam-spot position detector 54, a lens driver 56, a lens 58, a reset section 60, a timer 62, a light emission controller 64, a light-emitting element 66, a light-measuring section 68, a light-receiving element 70, a diaphragm controller 72, and a diaphragm 74.

The two-segment light-receiving element 50 comprises the photodiodes PD1 and PD2. When the element 50 receives an infrared beam, the photodiodes PD1 and PD2 generates photocurrents. The photocurrents are supplied to the current/time converter 52. The converter 52 performs the above-described time measuring four times, measuring four periods of time, and generates four signals representing the periods of time. The four signals are input to the beam-spot position detector 54. From these signals the detector 54 determines the position of the beam spot formed on the light-receiving surface of the element 50 and generate data representing this position. The data is supplied to the lens driver 56, to the current/time converter 52 via the reset section 60 and the timer 62, and to the light-emission controller 64. The lens driver 56 drives the lens 58 in accordance with the beam-spot position data output by the detector 54. The light-emission controller 64 controls the light-emitting element 66, or an IRED, in accordance with the beam-spot position data supplied from the beam-spot position detector 54.

The light-receiving element 70 receives the light reflected from an object, producing a signal proportional to the amount of light received. The signal is supplied to the light-measuring section 68. From this signal the section 68 determines the luminance of the object. The section 68 generates a luminance signal, which is input to the diaphragm controller 72. In accordance with the luminance signal the controller 72 controls the diaphragm 74.

The reset section 60 charges the integrating capacitors C1 and C2 (FIG. 5). The IRED 66 keeps on emitting an infrared beam once it is turned on. Alternatively, it may emits an infrared beam intermittently, each time for a predetermined time, under the control of the timer 62 and the light-emission controller 64.

Of the components shown in FIG. 4, the converter 52, the detector 54, the reset section 60, the timer 62, the controller 64, and the light-measuring section 68 are incorporated in the CPU 30 (FIG. 5). The other components, i.e., the element 50, the lens driver 56, the lens 58, the IRED 66, the light-receiving element 70, and the diaphragm 74, are provided outside the CPU 30.

Figure 7:
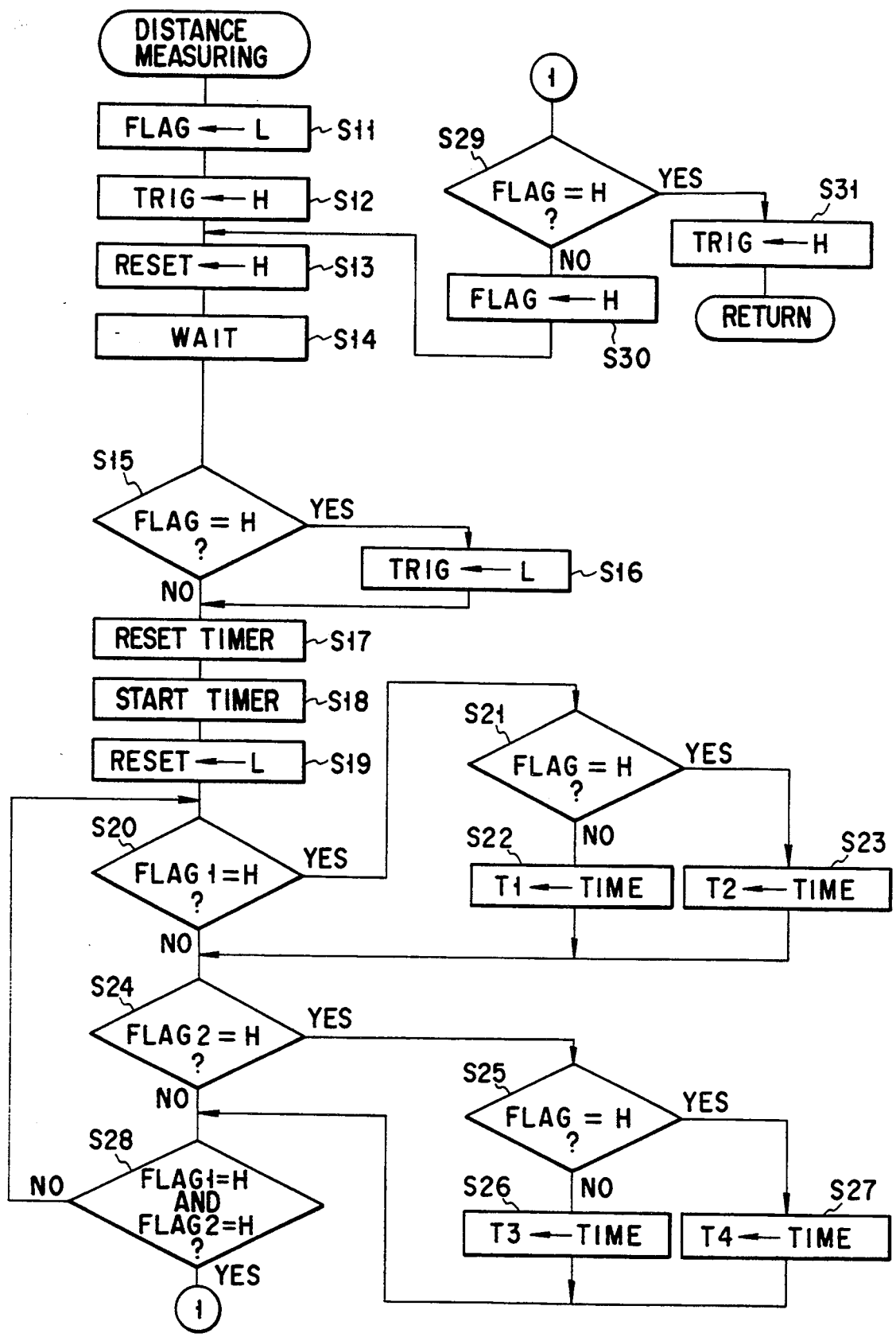
FIG. 7 is a flow chart representing the distance-measuring subroutine effected in the apparatus of FIGS. 4 and 5.

The operation of the apparatus shown in FIGS. 4 and 5 will be explained, with reference to the flow charts of FIG. 6 through FIG. 8.

The main routine illustrated in FIG. 6 will be described first.

In step S1 it is determined whether or not the shutter release of the camera incorporating the distance measurement apparatus has been turned on. If Yes, the operation goes to step S2, in which the light-measuring subroutine is executed. If No in step S1, the apparatus is set to a halt mode.

After the light-measuring subroutine is executed in step S2, the operation advances to step S3. In step S3 it is determined whether or not the luminance of the object is greater than a predetermined value. If No in step S3, the operation goes to step S4, in which the distance-measuring subroutine is executed. Then, in step S5, the lens driver 56 drives the lens 58 in accordance with the distance between the lens 58 and the object. If Yes in step S3, the operation goes to step S6, in which the diaphragm controller 72 decreases the the opening of the diaphragm 74. In step S7, a photographing lens is moved to a normal focusing position. This is one measure taken in the case where the power supplied to the IRED 66 is so inadequate that the object looks blurred in the background light.

After the subroutine has been executed in step S5 or step S7, the operation goes to step S8. In step S8, the photographing subroutine is executed. Then, the apparatus is set to a halt mode.

The distance-measuring subroutine, described above, will now be explained with reference to FIG. 7.

First, in step S11, a signal FLAG is set at the L level. The signal FLAG does not drive the IRED 66 when it is at the L level. Hence, the IRED 66 remains to emit an infrared beam in step S11. In step S12, a signal TRIG is set at the H level. The signal TRIG drives the IRED 66 when it is at the L level. Therefore, the light-emitting element 66 remains to emit an infrared beam in step S12.

Next, in step S13, the reset signal output by the reset section 60 is set at the H level, whereby the integrating capacitors C1 and C2 are charged. In step S14, the capacitors C1 and C2 are continuously charged until they are fully charged. Then, in step S15 it is determined whether or not the signal FLAG is at the H level. If Yes, the operation advances to step S16, in which the signal TRIG is set at the L level. In other words, it is determined that the IRED 66 should be driven to emit an infrared beam.

Thereafter, in step S17, the timer 62 is reset. In step S18, the timer 62 is started. Almost at the same time, the output signal of the reset section 60 is reset at the L level in step S19. Hence, the integrating capacitors C1 and C2 start accumulating currents.

Then, the timer 62 measures time T1 and time T2 which are required to discharge the photodiode PD1 when only the background light is applied to the photodiode PD1 and when both the background light and the reflected infrared beam are applied to the photodiode PD1, respectively. Similarly, the timer 62 measures time T3 and time T4 which are required to discharge the photodiode PD2 when only the background light is applied to the photodiode PD2 is measured and when both the background light and the reflected infrared beam are applied to the photodiode PD2, respectively. More specifically, the timer 62 measures periods of time which elapse while the potentials at points A and B (FIG. 5) are increasing from GND to $\frac{1}{2} V_{DD}$, that is, while the signals FLAG1 and FLAG2 are rising from the L level to the H level. The operation then returns to the main routine.

In step S20, it is determined whether the signal FLAG1 is at the H level or not. If Yes, the operation goes to step S21. In step S21 it is determined whether a signal FLAG is at the H level or not. The signal FLAG is at the H level while the IRED 66 is emitting an infrared beam, and is at the L level while the IRED 66 is emitting no beam at all. If No in step S21, the operation advances to step S22, in which time T1 measured by the timer 62 is input to the current/time converter 52. If Yes in step S21, the operation goes to step S23, in which times T2 measured by the timer 26 is input to the converter 52. The converter 52 converts time T1 and time T2 into variables T1 and T2, respectively.

If No in step S20, that is, if the signal FLAG1 is not at the H level, the operation goes to step S24. In step S24, it is determined whether the signal FLAG2 is at the H level or not. If Yes, the operation advances to step S25, in which it is determined whether the signal FLAG is at the H level. If No in step S25, the operation advances to step S26, in which time T3 measured by the timer 62 is input to the current/time converter 52. If Yes in step S25, the operation goes to step S27, in which time T4 measured by the timer 62 is input to the converter 52. The converter 52 converts time T3 and times T4 into variables T3 and T4, respectively.

If No in step S24, that is, if the signal FLAG2 is not at the H level, the operation goes to step S28. In step S28 it is determined whether signals FLAG1 and FLAG2 are both at the H level, that is, whether or not the four periods of time, T1, T2, T3, and T4, have been measured. If No in step S28, the operation returns to step S20. If Yes in step S28, the operation advances to step S29. In step S29 it is determined again whether the signal FLAG is at the H level. If No in step S29, the operation goes to step S30 in which the signal FLAG is set at the H level immediately before the subroutine is executed for the second time. If Yes in step S29, the operation goes to step S31, in which the IRED 66 is turned off, ceasing to emit the infrared beam.

The subroutine of driving the lens 58 (FIG. 4) will now be explained, with reference to FIGS. 8 and 9.

As FIG. 9 shows, the lens 58 is moved to a near-distance side when an infrared beam is applied to the photodiode PD2, to a normal focusing position when a portion of the beam, however small it is, is applied to the photodiode PD1, and to a far-distance side when the beam is applied to neither the photodiode PD1 nor the photodiode PD2.

Figure 8:
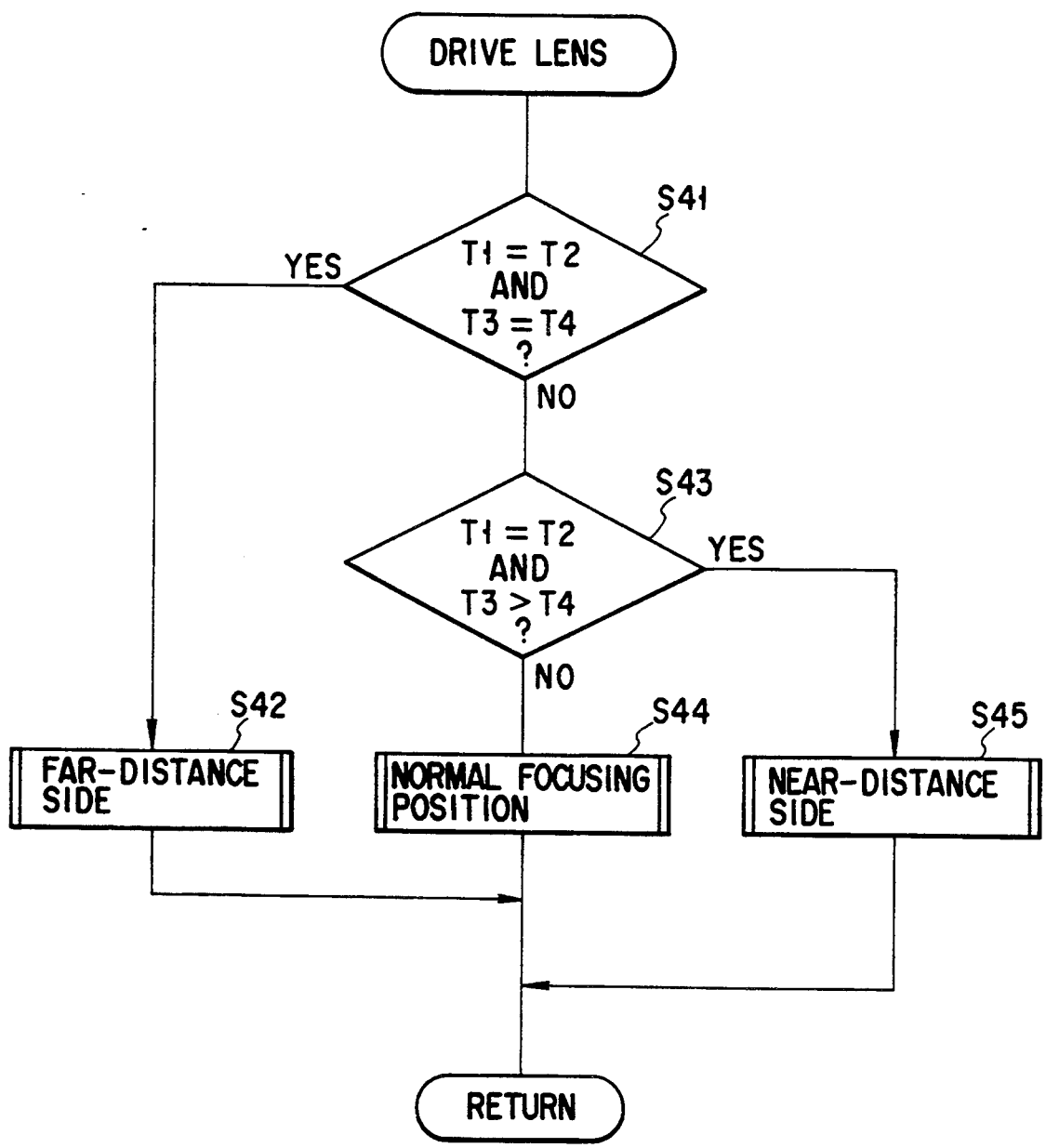
FIG. 8 is a flow chart illustrating the lens-driving subroutine performed in the distance measurement apparatus of FIGS. 4 and 5.

Referring to the flow chart of FIG. 8, in step S41 it is determined, from the variables obtained in the distance-measuring subroutine, whether or not T1=T2 and T3=T4, that is, whether or not the object is at so far a distance that neither the photodiode PD 1 nor the photodiode PD2 receives the infrared beam reflected from the object. If Yes, the operation goes to step S42, in which the lens 58 is moved toward the far-distance side.

If No in step S41, that is, if T1 and T3 are not equal to T2 and T4, respectively, the operation goes to step S43. In step S43 it is determined whether or not T1=T2 and T3>T4, that is, whether the object is at so near a distance that the photodiode PD1 receives no infrared beam and the photodiode PD2 receives the infrared beam reflected from the object and is thereby discharged fast. If Yes in step S43, the operation goes to step S45, in which the lens 58 is moved toward the near-distance side.

If No in step S43, that is, if T1 is not equal to T2 and T3 is not greater than T4, the operation goes to step S44. In step S44, the lens 58 is moved toward the normal focusing position.

As has been described above, the second embodiment of the invention (FIGS. 4 and 5) does not perform automatic focusing when the object has high luminance. Rather, the lens 58 is located at the normal focusing position, and the opening of the diaphragm 74 is decreased. In other words, automatic exposure (AE) is effected when the object has so high a luminance that the background light absorbs the infrared beam which is relatively weak because of the insufficient power supplied to the IRED 66. Problems which may result from the absorption of the infrared beam into the background light are thereby prevented.

When the object is illuminated with undulating light such as one emitted from a fluorescent lamp, the outputs of the photodiodes PD1 and PD2 may alternate. This does not matter since the photodiodes PD1 and PD2 are used, exclusively for detecting where the beam spot is located on the surface of the light-receiving element 50. It suffices to find a difference between time T1 and time T2 and a difference between time T3 and time T4, with a relatively low accuracy. In other words, if the differences fall within a predetermined range, time T1 and time T2 are regarded as equal, and so are time T3 and time T4.

The distance measurement apparatus according to the second embodiment of the invention comprises a small number of components, such as the CPU 30 and a few other components. Therefore, it can serve to provide a low-price AF system.

A third embodiment of the present invention will be described, with reference to FIGS. 10 to 14. The third embodiment differs from the second embodiment in that only one light-receiving element, not two, is used to achieve both automatic focusing (AF) and automatic exposure (AE). In the following description of this embodiment, the components which perform the same functions and achieve the same effects as those of the second embodiment will be identified by the same reference numerals and symbols, and will not be described in detail.

FIG. 10 is a block diagram schematically showing the third embodiment. As is evident from FIG. 10, this distance measurement apparatus comprises a CPU 76, a lens driver 56, a diaphragm controller 72, a first unit 78 including a light-receiving element and an integrating capacitor, and a second unit 80 including a light-emitting element (i.e., an IRED) and a driver. The output of the first unit 78 is input to the CPU 76. The CPU 76 processes the output of the first unit 78, thereby to control the lens driver 56, the diaphragm controller 72, and the second unit 80.

FIG. 11 is a circuit diagram of the apparatus shown in FIG. 10. As FIG. 11 shows, a parallel circuit comprised of a photodiode PD3 and an integrating capacitor C3 is connected to the CPU 76. Also connected to the CPU 76 is an IRED 66. Except these features, the third embodiment is identical in structure to the second embodiment of FIG. 5.

Figure 12:
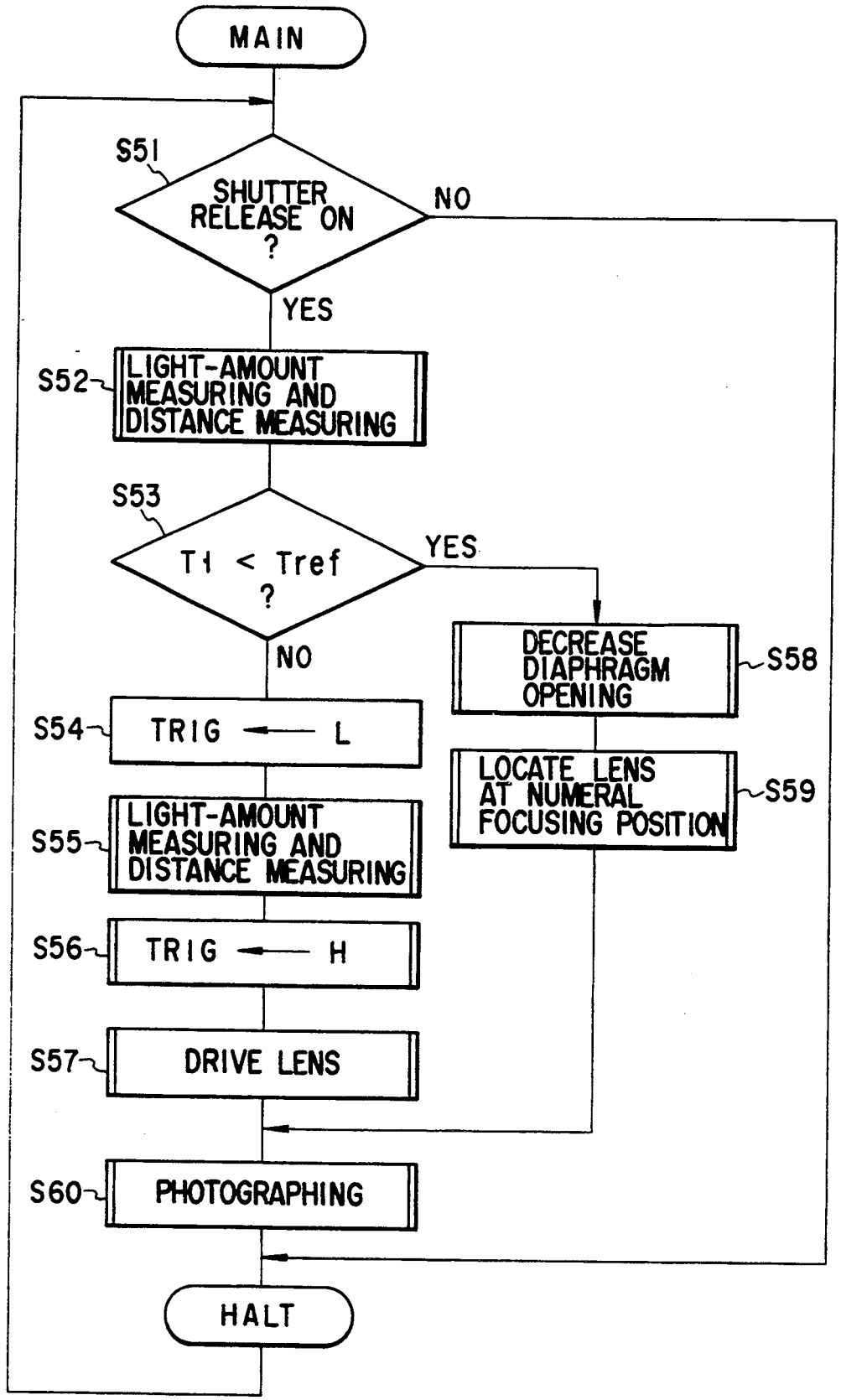
FIG. 12 is flow chart explaining the operation of the apparatus shown in FIG. 10.
Figure 14:
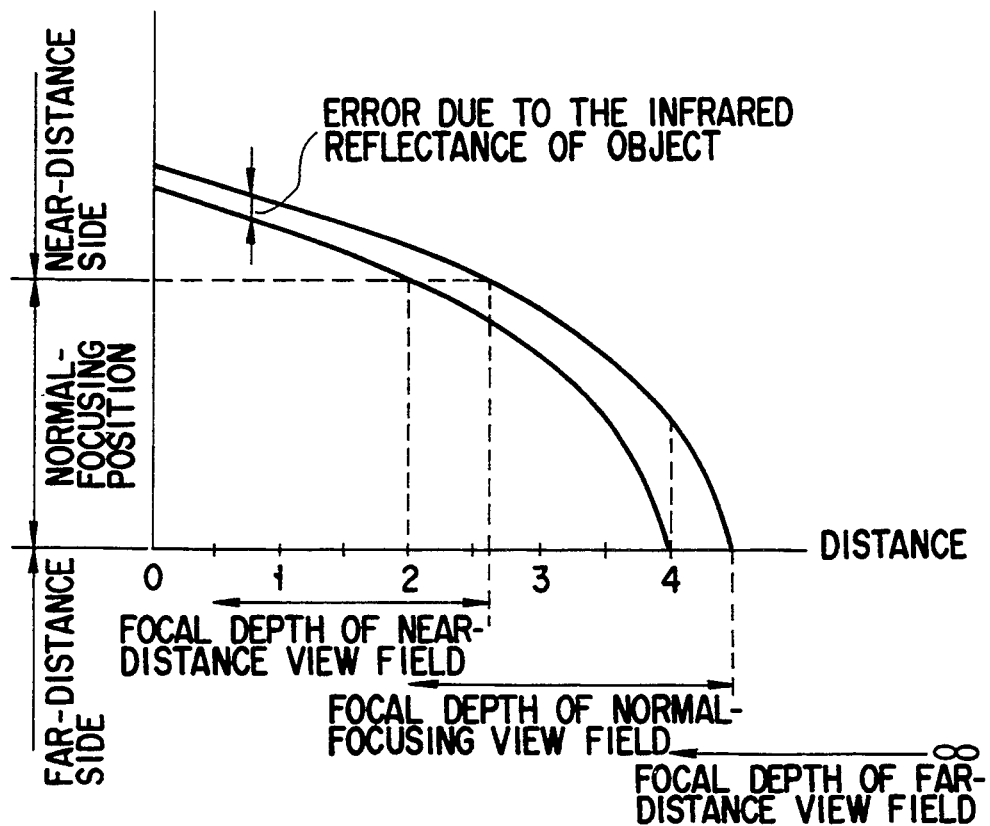
FIG. 14 is a graph representing the relationship between the position of the lens and the focal depth of an object.

The operation of the third embodiment will be explained, with reference to the flow chart of FIG. 12.

First, in step S51, it is determined whether or not the shutter release of the camera having the distance measurement apparatus has been turned on. If Yes, the operation goes to step S52, in which the light-measuring subroutine and the distance-measuring subroutine are executed. If No in step S51, the distance measurement apparatus is set to a halt mode.

In step S52, time T1 is measured since a signal TRIG is at the H level so that the IRED 66 emits no infrared beam toward an object. Time T1 is checked against the time-luminance table stored in the CPU 76, whereby the luminance of the object is determined, thus achieving the light measuring.

Next, in step S53 it is determined whether or not T1<Tref, that is, whether or not the luminance of the object is so high that the infrared beam reflected by the object is absorbed in the illumination light reflected from the object. If No, that is, if the illumination light reflected is intense enough to absorb the infrared beam, the operation advances to step S54. In step S54, the signal TRIG is falls to the L level. As a result, the IRED 66 is driven, emitting an infrared beam toward the object. Then, in step s55, light-measuring subroutine and the distance-measuring subroutine are carried out again, measuring time T2. In the next step, i.e., step S56, the signal TRIG rises to the H level, whereby the IRED 66 is turned off. There after, in step S57, the lens-driving subroutine is executed.

If Yes in step S53, that is, if the illumination light reflected is not intense enough to absorb the infrared beam, the operation advances to step S58. In step S58, the opening of the diaphragm is decreased. Then, in step S59, the lens is moved to the normal focusing position.

The operation goes from step 57 or step S59 to step S60, in which the subroutine of photographing the object is carried out. Then the distance measurement apparatus is set to the halt mode. Thereafter the operation returns to step S51.

FIG. 13 is a flow chart illustrating the light-measuring subroutine and the distance-measuring subroutine, both performed in the apparatus of FIG. 10. In these subroutines, the time required for discharging the integrating capacitor, which is incorporated in the first unit 78, is measured.

Referring to FIG. 13, the reset signal is set at the H level in step S61, starting the charging of the integrating capacitor. In step S62, time elapses until the capacitor is thoroughly charged. In step S63, when the capacitor is fully charged, the timer is reset. In step S64, the timer is started. Virtually at the same time, the reset signal is set at the L level in step S65, whereby the charging of the integrating capacitor is started.

Then, in step S66, it is determined whether a signal FLAG is at the H level or not. If Yes, the operation goes to step S67, in which it is determined whether the signal TRIG is at the L level. If No in step S67, the operation goes to step S68. If Yes in step S67, the operation goes to step S69. The converter converts time T1 and time T2 into variables T1 and T2, respectively. The variable T1 represents the time required for discharging the integrating capacitor when only the background light is applied to the light-receiving element incorporated in the first unit 78, and will be used to measure the light reflected from the object and the distance between the lens and the object. The variable T2 represents the time required for discharging the capacitor when both the background light and the infrared beam are applied to the light-receiving element. It should be noted that, as in the second embodiment, the IRED incorporated in the second unit 80 may either continuously or intermittently emit an infrared beam once it is turned on.

As has been indicated, the lens is moved in step S57. In this regard, it should be noted that the difference between the variables T1 and T2 represents the intensity of the infrared beam applied to the light-receiving element. The farther the object is located from the lens, the less the intensity of the infrared beam reaching the light-receiving element, as can be understood from FIG. 14 which also represents the relationship between the position of the lens and the focal depth of the object. The CPU 76 has a table showing the relation of FIG. 14, which is utilized to accomplish three-step automatic focusing. Thus, the third embodiment measures the distance between the object and the lens from the amount of the light which reaches the light-receiving element incorporated in the first unit 78. In this respect the third embodiment differs from the second embodiment which measures the distance from the position which the beam spot assumes on the surface of the light-receiving element 50.

Like the second embodiment, the third embodiment has the problem that the output of the photodiode PD1 may alternate when the object is illuminated with undulating light such as one emitted from a fluorescent lamp. This does not matter since the three distances over which the lens is moved for near-distance focusing, normal focusing position, and far-distance focusing, respectively, are overlapped.

Like the second embodiment, the second embodiment of the invention comprises a small number of components, such as the CPU 76 and a few other components, and can therefore serve to provide a low-price AF system.

As can be understood from the above, the present invention can provide a distance measurement apparatus which is simple, having only a CPU, a light-receiving element, and an integration circuit and not having an AF IC, i.e., one of the indispensable components of the conventional distance measurement apparatus. Moreover, present invention can provide a distance measurement apparatus which is more simple, having only a CPU, a light-emitting section, and a light-receiving section.

Figure 15:
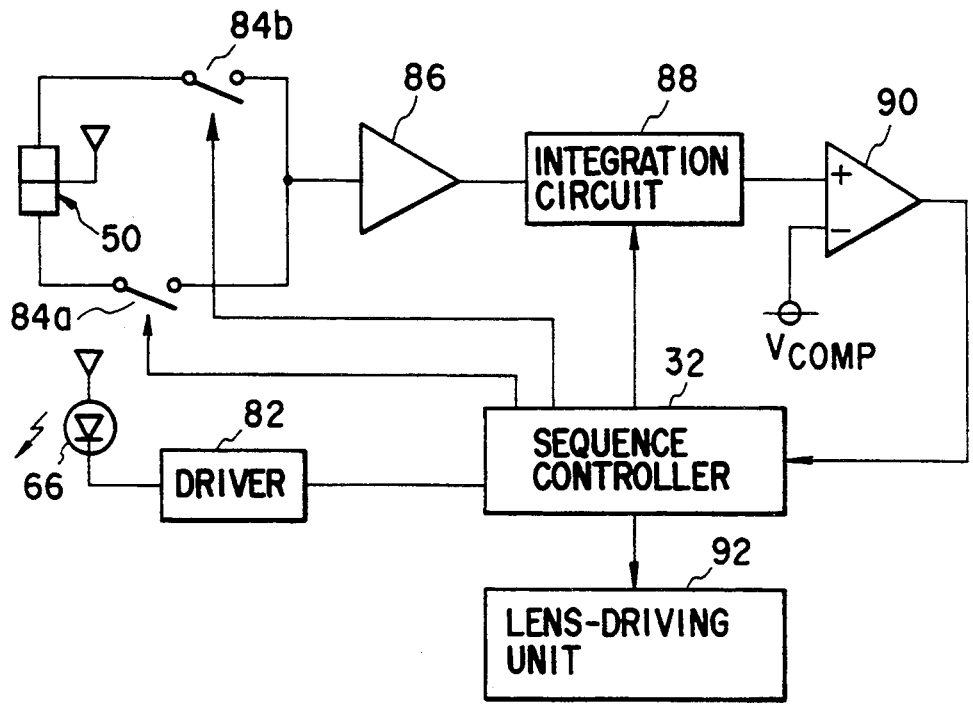
FIG. 15 is a block diagram schematically showing a distance measurement apparatus according to a fourth embodiment of this invention.

FIG. 15 is a block diagram schematically showing a distance measurement apparatus according to a fourth embodiment of this invention. This apparatus comprises a sequence controller 32, a light-receiving element 50, an IRED 66, a driver 82, switches 84a and 84b, a preamplifier 86, an integration circuit 88, a comparator 90, and a lens-driving unit 92.

The sequence controller 32 is a digital circuit which can control some other component of the apparatus, compare digital values, and determine various facts. The controller 32 controls the driver 82, whereby the IRED 66 emits an infrared beam at a desired time. The infrared beam is reflected by an object and applied to the light-receiving element 50. The element 50 has two photodiodes and produces two signals upon receipt of the infrared beam reflected from the object. These signals are supplied via the switches 84a and 84b to the preamplifier 86. The preamplifier 86 amplifies the signals and supplies them to the integration circuit 88. The circuit 88 integrates the signals at a predetermined frequency and generates a signal, which is supplied to the first input terminal of the comparator 90. The integration time lapses until the output signal of the circuit 88 reaches a predetermined value $V_{COMP}$ is measured, and the integrated voltage of either signal input to the circuit 88 is converted to a digital value. The comparator 90 compares the output signal of the integration circuit 88 with the predetermined value $V_{COMP}$ supplied to its second input terminal, finding the difference between the signal and the value $V_{COMP}$. The comparator 90 outputs a signal representing the difference, which is supplied to the sequence controller 32. The controller 32 controls the lens-driving unit 92 in accordance with the signal output by the comparator 90.

The integration circuit 88 performs A/D conversion on the signal input to it. In addition, since the circuit 88 processes the same signal many times, thus canceling noise, it outputs a signal which represents the distance between the object and the lens more accurately than otherwise. The time spent to integrate the light applied to the element 50 while the element 66 is emitting no infrared beam is compared with the time spent to integrate the light applied to the element 50 while the element 66 is emitting an infrared beam. Therefore, no measures need to be taken to remove stationary light. Further, since only one preamplifier is required, and the amounts of light applied to the photodiodes of the element 50 are compared by comparing the time required to integrate the output of the first photodiode with the time required to integrate the output of the second photodiode, the fourth embodiment is simple, serving to provide a simple automatic focusing system.

Figure 16:
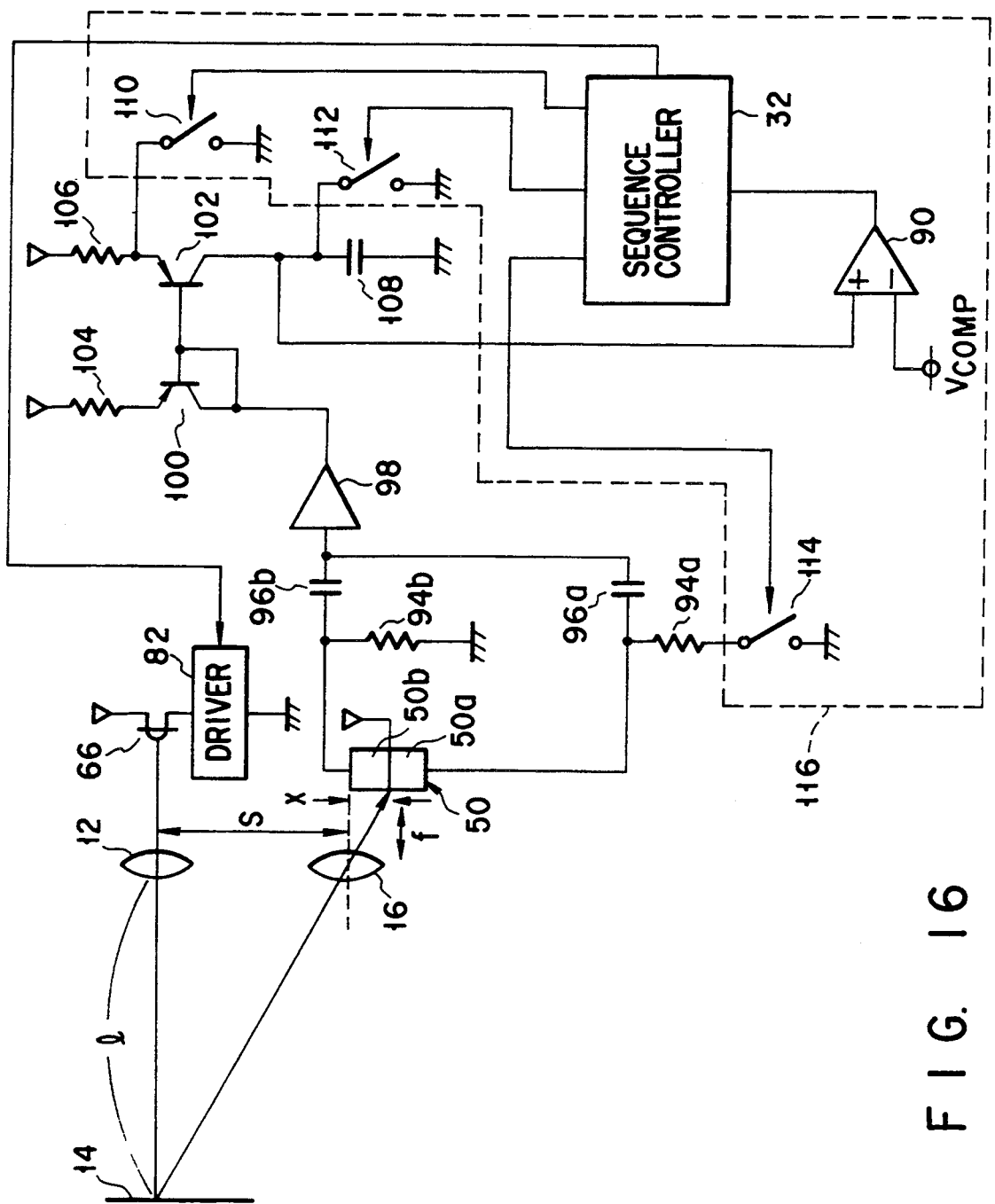
FIG. 16 is a block-circuit diagram showing the apparatus according to a fifth embodiment of this invention.

FIG. 16 is a block-circuit diagram showing the apparatus shown in FIG. 15. FIGS. 17A and 17B are diagrams, each showing the positional relation between an object and a two-segment light-receiving element 50. With reference to FIG. 16 and FIGS. 17A and 17B, the fifth embodiment will be described in more detail.

As can be understood from FIG. 16, the sequence controller 32, designed to control the operation sequence of the apparatus, drives the driver 82. The driver 82 turns on the IRED 66, which emits an infrared beam. The beam is applied through a light-projecting lens 12 toward an object 14 and reflected by the object 14. The infrared beam is then applied through a light-receiving lens 16 to the light-receiving element 50, forming a beam spot on the light-receiving surface of the element 50.

As is evident from FIG. 16, the light-receiving element 50 comprises two photodiodes 50a and 50b, and the lenses 12 and 16 are spaced apart by a distance S. The distance x from the optical axis of the lens 16, at which the beam spot is located, is determined by the following equation:

$$x = S \cdot f / l$$

where f is the focal distance of the light-receiving lens 16 and l is the distance between the light-projecting lens 12 and the object 14.

Assume that the boundary between the photodiodes 50a and 50b is positioned at the center of the beam spot which is formed when the object 14 is at a predetermined distance $l_0$ from the the light-projecting lens 12. Then, it is possible to determined whether the distance l between the lens 12 and the object 14 is shorter or longer than the predetermined distance $l_0$, merely by detecting which photodiode, 50a or 50b, receives more light than the other.

This process of determining the distance will be explained, with reference to FIGS. 17A and 17B.

If the object 14 is located at a distance $l_1$ longer than $l_0$ as is illustrated in FIG. 17A, the photodiode 50b receives more light than the photodiode 50a. Conversely, if the object 14 is located at a distance $l_2$ shorter than $l_0$ as is illustrated in FIG. 17B, the photodiode 50a receives more light than the photodiode 50b.

The beam spot is located partly on the photodiode 50a and partly on the photodiode 50b. The distance between the lens 12 and the object 14 can, therefore, be accurately measured by by calculating the ratio of the light amount applied to the photodiode 50a to the light amount applied to the photodiode 50b. This technical point is disclosed in, for example, Published Unexamined Japanese Patent Applications 57-104809 and 58-35410. The distance-measuring method disclosed in these publications involves the use of analog circuits of the types shown in FIG. 2, such as a logarithmic compression circuit and a differential operation circuit.

The fifth embodiment of the invention (FIG. 16) is simpler since the sequence controller 32 performs various AF IC functions, such as amplification, removal of stationary light, and calculation of a light-amount ratio. Hence, the distance measuring apparatus of FIG. 16 can serve to provide a simple, low-cost automatic focusing system.

Referring back to FIG. 16, the signals output by the photodiodes 50a and 50b of the light-receiving element 50 are input to the preamplifier 98 through biasing resistors 94a and 94b and coupling capacitors 96a and 96b. The preamplifier 98 is designed to output a signal current which is a sum of the DC-biased, amplified AC components of the currents generated by the photodiodes 50a and 50b.

As is shown in FIG. 16, PNP transistors 100 and 102 and resistors 104 and 106 connected to the emitters of the transistors 100 and 102, respectively, constitute a current-mirror circuit. The current-mirror circuit supplies the output of the preamplifier 98 to an integrating capacitor 108. A switch 110 is coupled to the emitter of the PNP transistor 102, for determining the time at which the capacitor 108 is to integrate the output of the preamplifier 98. To be more precise, the capacitor 108 integrates the output of the preamplifier 98 when the switch 110 is off, and integrates the output when the switch 112 is on. A reset switch 112 is connected in parallel to the integrating capacitor 108. The switch 112 initializes the capacitor 108 when it is on, and resets the capacitor 108 when it is off.

As has been described, the comparator 90 detects whether or not the output of the integrating capacitor has reached the predetermined value $V_{COMP}$. The output of the comparator 90, i.e., the integrated voltage, is converted into a digital value by the sequence controller 32 and will be used to determine the distance l. The sequence controller 32 controls not only the switches 110 and 112, but also a switch 114 which is connected to the biasing resistor 94a. The components 32, 90, 102, 108, 110, 112, and 114 can be replaced by a one-chip microcomputer (CPU) or the like.

It will now be described how the sequence controller 32 performs A/D conversion.

First, the sequence controller 32 turns the switch 112 on, thus initializing the integrating capacitor 108, and turns the switch 112 off, thereby resetting the capacitor 108. Thereafter, when the IRED 66 emits an infrared beam, the controller 32 turns the switch 110 off. The current-mirror circuit comprised of the components 100, 102, 104, and 106 supplies both the signal current and the bias current to the integrating capacitor 108.

When the output of the integrating capacitor 108 increases over the predetermined value $V_{COMP}$, the output of comparator 90 is inverted. Nevertheless, since it is detected how many times the switch 110 has been repeatedly turned off between the resetting of the capacitor 108 and the inversion of the comparator 90, the sequence controller 32 can convert the voltage the capacitor 108 integrates each time, into a digital value. Obviously, the less the voltage integrated each time, the more frequently the switch 110 needs to be turned off. In other words, the greater the voltage integrated each time, the less times does the capacitor 108 only need to integrate the output current of the preamplifier 98.

The fifth embodiment is characterized in three aspects. The first characterizing feature is that only one preamplifier 98 processes, in time-sharing fashion, the output of the signal output by the two-segment light receiving element 50. First, the switch 114 is off, and the output of the photodiode 50a is not biased. Hence, only the output of the photodiode 50b is input to the preamplifier 98 through the biasing resistor 94b and the coupling capacitor 96b.

The second characterizing feature of the fourth embodiment resides in that the coupling capacitors 96a and 96b remove the stationary-light components from the signals output by the photodiodes 50a and 50b, and that the bias-current component constantly flowing through the integration circuit 88 is removed in accordance with the difference between the voltage integrated while the IRED 66 is emitting no infrared beam and the voltage integrated while the IRED 66 is emitting an infrared beam.

The third characterizing feature of the fourth embodiment is that the integrating capacitor 108 repeatedly integrates the output current of the preamplifier 98 in synchronism with the emission of the infrared beam at the IRED 66, merely by turning on and off the switches 112 and 114 under the control of the sequence controller 32. In this regard, it should be noted that in the first, second and third embodiments, the output of the light-receiving element is integrated, without being modified, and the stationary-light component is removed from the output signal of the light-receiving element based on the difference between the voltage integrated while the IRED is emitting no infrared beam and the voltage integrated while the IRED is emitting an infrared beam. Inevitably, the current-integrating speed varies, depending on the luminance of the object. Further, in the first to third embodiments, the integrated voltage corresponding to the infrared beam reaching the light-receiving element is no more than one hundredth of the integrated voltage corresponding to the stationary light. Therefore, the first to third embodiments need some further improvements. These very improvements are accomplished by the fifth embodiment shown in FIG. 16, wherein the capacitor 108 removes the stationary-light component, the preamplifier 98 is used, and biasing resistor 94a renders the integration speed substantially constant.

It will now be described how the fifth embodiment operates with reference to the timing chart of FIG. 18.

First, the output of the light-receiving element 50 is integrated after the switch 112 is turned on, initializing the integrating capacitor 108, until the output of the comparator 90 rises to the H level, while the IRED 66 is emitting no infrared beams for the period SEQUENCE 1. During this period, the sequence controller 32 counts the number $n_0$ of times ($n_0=7$) the capacitor 108 integrates the output of the preamplifier 98 until its output reaches the predetermined value $V_{COMP}$.

Then, during the period SEQUENCE 2, the switch 114 remains off, the IRED 66 keeps emitting an infrared beam, and the capacitor 108 integrates the output signal of the preamplifier 98. Every time the capacitor 108 integrates the output of the preamplifier 98, the integrated voltage increases by only the value corresponding to the intensity of the beam reaching the light-receiving element 50. Hence, the output of the integrating capacitor 108 increases faster to the predetermined value $V_{COMP}$ the moment when the capacitor 108 finishes integrating the output of the preamplifier 98 for the fifth time ($n_1=5$).

Thereafter, during the period SEQUENCE 3, the switch 114 remains on, and the output of photodiode 50a, as well as that of the photodiode 50b, are input to the preamplifier 98. Hence, the output of the integrating capacitor 108 increases still faster to the predetermined value $V_{COMP}$ the moment when the capacitor 108 finishes integrating the output of the preamplifier 98 for the third time ($n_2=3$).

Figure 19:
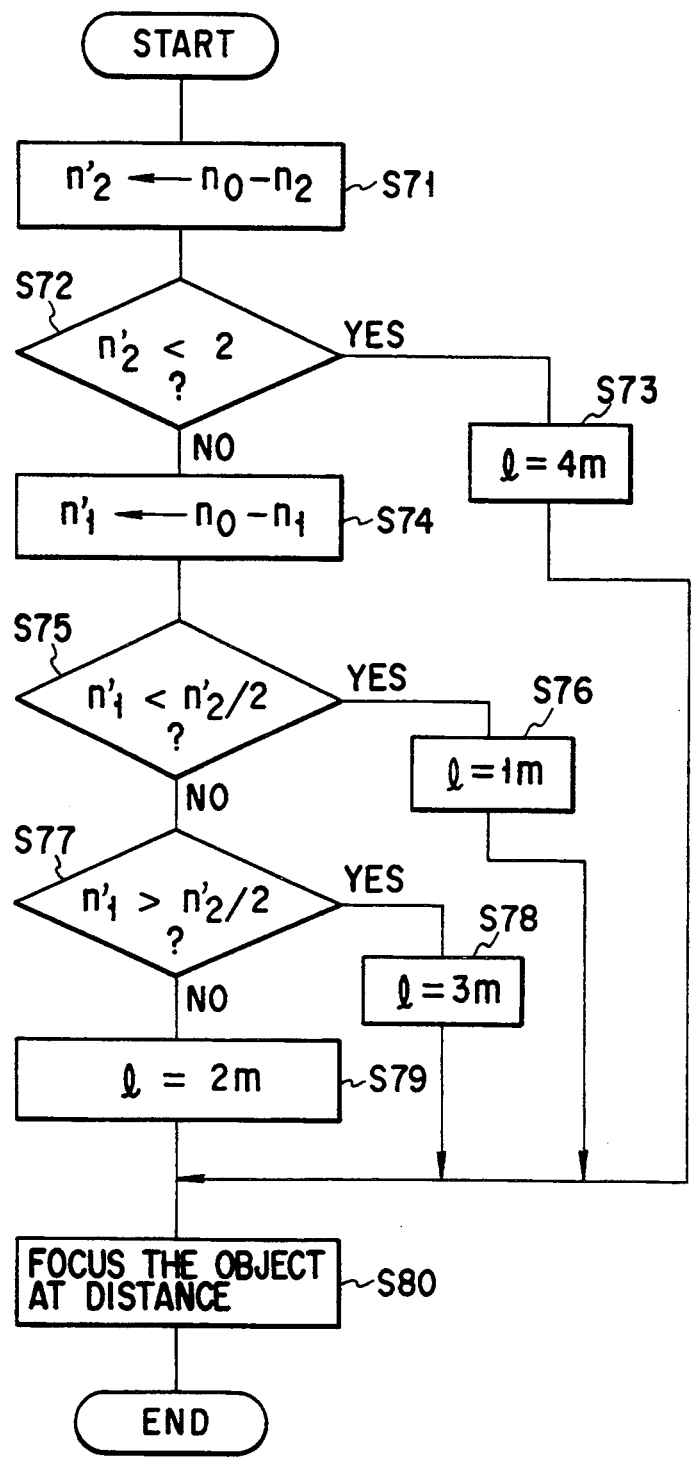
FIG. 19 is a flow chart explaining the operation of the apparatus shown in FIG. 16.

The distance l is calculated from the number of integrations performed, i.e., $n_0$ and $n_2$, as will be explained with reference to the flow chart of FIG. 19.

In step S71, the total amount $n'_2$ of light applied to the photodiodes 50a and 50b is determined from the difference between $n_0$ and $n_2$. The longer the distance l, the less the total light amount $n'_2$. Thus, if the distance l is extremely long, there is virtually no difference between $n_0$ and $n_2$. In step S72 it is determined whether $n'_2$ is less than 2 or not. If Yes, the operation branches to step S73, in which the distance l is determined to be 4 meters.

If No in step S72, the operation goes to step S74, in which the difference $n'_1$ is determined between $n_0$ and $n_1$. The difference $n'_1$ depends on the amount of the light applied to the photodiode 50b. In step S75 it is determined whether $n'_1$ is less than $n'_2/2$ or not.

If Yes in step S75, that is, if $n'_1$ is less than $n'_2/2$, the operation goes to step S76. In step S76, the distance l is determined to be 1 meter because the distance l is considered shorter than the predetermined distance $l_0$. If No in step S74, that is, if $n'_1$ is equal to or greater than $n'_2/2$, the operation goes to step S77, in which it is determined whether $n'_1$ is greater than $n'_2/2$ or not. If Yes in step S77, the operation goes to step S78. In step S78, the distance l is determined to be 3 meters because the distance l is considered longer than the predetermined distance $l_0$.

If No in step S77, that is, if $n'_1$ is equal to $n'_2$, the operation advances to step S79, in which the distance l is determined to be 2 meters. Next, in step S80, the lens of the camera is moved to focus the image of the object 14 on the photographic film.

The fourth embodiment is further characterized in that the integrating capacitor 108 can easily be reset and switched under the control of an open-drain output terminal, and also in that the comparator 90 can be replaced by an input terminal having a Schmitt trigger function, provided the integrating capacitor 108 is one appropriated for this objective. Hence, the components 32, 90, 102, 108, 110, 112, and 114—all shown in FIG. 16—can be replaced by a one-chip microcomputer (CPU) or the like.

Figure 20:
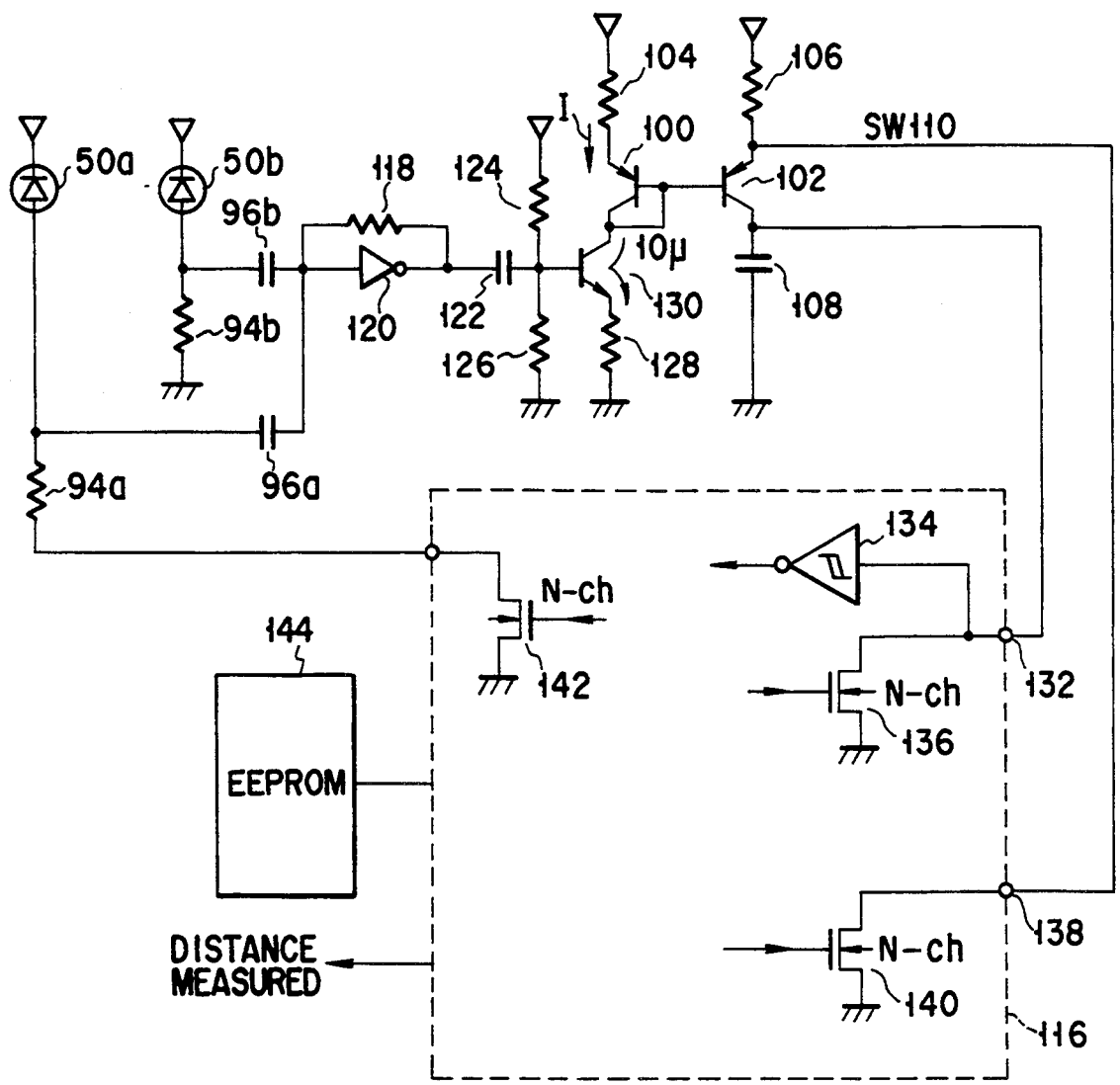
FIG. 20 is a circuit diagram showing a distance measurement apparatus according to a sixth embodiment o the present invention.

FIG. 20 shows a distance measurement apparatus according to a sixth embodiment of this invention, which comprises a CPU 116 and a preamplifier section.

The preamplifier section will be described first. As is evident from FIG. 20, a resistor 118 and a CMOS inverter 120 constitute a linear amplifier of the known type. The output of the linear amplifier is input via a coupling capacitor 122 to the base of a self-biasing amplifier which comprises resistors 124, 126, and 128 and a transistor 130. The self-biasing amplifier has a bias point of about 10 μA. When a signal is input to the self-biasing amplifier, a bias current $I_b$ superposed with a signal current $i_p$ flows through the transistor 130.

The CPU 116 comprises an input-output port 132, a Schmitt-trigger discriminator 134, an NMOS transistor 136, an open-drain output port 138, and NMOS transistors 140 and 142.

The port 132 has a Schmitt trigger and is connected to the Schmitt-trigger discriminator 134 and the NMOS transistor 136. When the output of the NMOS transistor 136 falls to the L level, an integrating capacitor 108 is reset. Needless to say, the discriminator 134 functions exactly the same way as the comparator 90 (FIG. 16) which has the threshold voltage of ½ $V_{CC}$. The NMOS transistor 140 is connected to the open-drain output port 138. When the output of the NMOS transistor 140 falls to the L level, the emitter potential of a transistor 102 falls below the base potential, whereby any current stops flowing through the transistor 102.

As is shown in FIG. 20, the fifth embodiment further comprises an EEPROM 144 which is connected to the CPU 116.

Assume that a switch 110 (FIG. 20) is repeatedly turned on and off as is indicated in the flow chart of FIG. 21, a current nearly equal to $i_p + I_b$ flows into the integrating capacitor 108. The current $V_{INT}$ the capacitor 108 integrates each time is:

$$V_{INT} = \frac{(i_p + I_b) \times t_{INT}}{C_{INT}} \quad (1)$$

where $t_{INT}$ is the time the capacitor 108 requires to integrate the current $V_{INT}$, and $C_{INT}$ is the capacitance of the integrating capacitor 108.

The current $V_{INT0}$, which the capacitor 108 integrates each time while an IRED (not shown) is emitting no infrared beam and while no signal current $i_p$ flows, has the following value:

$$V_{INT} = \frac{I_b \times t_{INT}}{C_{INT}} \quad (2)$$

The threshold of the discriminator 134 is:

$$V_{COMP} = \frac{I_b \times t_{INT}}{C_{INT}} = \frac{(i_p + I_b) \times t_{INT}''}{C_{INT}} \quad (3)$$

where $t_{INT}'$ (=$nT_{INT}$) is the time the capacitor 108 requires to integrate the current $V_{INT}$ while the IRED is emitting no infrared beam, and $t_{INT}''$ (=$mt_{INT}$) is the time capacitor 108 requires to integrate the current $V_{INT}$ while the IRED is emitting an infrared beam.

Therefore, to find the amount of light applied to a light-receiving element 50, it suffices to calculate the current $i_p$ by using the following equation (4):

$$i_p = \frac{I_b(t_{INT}' - t_{INT}'')}{t_{INT}'} \quad (4)$$

The CPU 116 performs this calculation, using $t_{INT}'$ and $t_{INT}''$ both already obtained and $I_b$ already known. If $I_b$ differs from the value designed for the self-biasing amplifier, due to the characteristics of the components of the self-biasing amplifier, the data representing the difference between $I_b$ and the design value is stored in the EEPROM 144.

The operation described above is carried out while the NMOS transistor 142 is off, thereby to detect the amount of the light applied to the photodiode 50b of the light-receiving element 50.

Then, the operation is repeated while the NMOS transistor 142 is held on, thereby detecting the amount of the light applied to the photodiode 50a and also the amount of the light applied to the photodiode 50b. From the ratio between these amounts of light, the distance at which the object is located can be determined.

The photodiode 50a, resistor 94a, and the NMOS transistor 142 can be dispensed with, in which case the distance at which the object is located is determined from the intensity of the light applied to the photodiode 50b. The signal current $i_p$ is given as:

$$i_p = r \cdot k \cdot l^2 \quad (5)$$

where l is the distance, r is the intensity of the object, and k is a constant of proportion.

$$l = \sqrt{\frac{r \cdot k}{i_p}} \quad (6)$$

It follows that the distance l can be determined only if appropriate values are set for the intensity r and the constant k.

According to the present invention, the CPU 116 having the input-output port 132 can be replaced by a CPU incorporating an A/D converter. A sixth embodiment of the invention, which has a CPU with a built-in A/D converter, will be described with reference to FIGS. 22 and 23. FIG. 22 is a timing chart explaining the operation of the sixth embodiment, and FIG. 23 is a block diagram schematically showing the sixth embodiment.

As FIG. 23 shows, not only a switch 114 is connected to a photodiode 50a by a resistor 94a, but also a switch 146 is connected to a photodiode 50b by a resistor 94b. The output of a preamplifier 86 is supplied to a CPU 152 through an integration circuit 148 and an A/D converter 150. Both the A/D converter and the CPU 152 are incorporated in a one-chip microcomputer 154.

The distance measurement apparatus of FIG. 23 is characterized in that the circuit 148 repeats integration a fixed number of times (not a variable number of times to attain a constant integrated voltage), the A/D converter 150 converts the integrated voltage into a digital value, and the digital value is input to the CPU 152.

From the equations (1) and (2), $V_{INT}$ is:

$$V_{INT} = \frac{(i_p + I_b)V_{INT0}}{I_b} \quad (7)$$

Hence:

$$i_p = \frac{V_{INT}}{V_{INTO}} I_b - I_b \quad (8)$$

The amount of light, or $i_p$, can therefore be obtained from the integrated voltage $V_{INT}$.

Since the switch 146 is provided for the photodiode 50b as well, the amounts of light applied to the photodiodes 50a and 50b can be found by substituting $V_{INT1}$ and $V_{INT2}$, both shown in FIG. 22, for $V_{INT}$ in the equation (8). Instead of performing the distance measurement illustrated in the flow chart of FIG. 19, the ratio of $n'_1$ to $n'_2$ is calculated by the CPU 152, thereby determining the distance 1.

In the apparatus of FIG. 23, the photodiodes 50a and 50b are spaced far apart from each other. Otherwise, the charge generated by a first photodiode will inevitably be superposed on the output of the second photodiode when the first photodiode remains exposed to light. Thus, the light-receiving element 50 cannot be a low-price, monolithic two-segment element which has high productivity and small characteristic deviation. The resistors 94a and 94b may be short-circuited, thereby effecting no voltage conversion to prevent the output photocurrent of the photodiode not used from being amplified. If so, however, the capacitor 96b connected to the input of the preamplifier 86 will inevitably smooth the input signal. After all, it will be impossible to fully amplify the photocurrent output by the photodiode not short-circuited to a resistor.

A distance measurement apparatus according to a seventh embodiment of the invention, which incorporates a monolithic two-segment light receiving element, will be described with reference to FIGS. 24, 25, and 26.

FIG. 24 is a circuit-block diagram of the eight embodiment. As is shown in this figure, the apparatus comprises an IRED 66, a driver 82, photodiodes 156a and 156b, diodes 158a and 158b, bias resistors 160a and 160b, a current-voltage converting resistor 94, switches 114 and 116, and a capacitor 96 for a high-pass filter.

The photodiodes 156a and 156b are arranged in the form of an array, for receiving an infrared beam reflected from an object and converting the beam into photocurrents. The diodes 158a and 158b are connected in series to the photodiodes 156a and 156b, respectively, and have their cathodes connected to each other. The bias resistors 160a and 160b are connected in parallel to the photodiodes 156a and 156b, respectively. The current-voltage converting resistor 94 is connected to the cathode node of the diodes 158a and 158b, for converting the bias currents supplied by the bias resistors 160a and 160b into a bias voltage. The switch 114 is connected between the anode of the diode 158a and the ground, and the switch 116 between the anode of the diode 158b and the ground. The capacitor 96 is connected to the cathode node of the diodes 158a and 158b, for filtering out the stationary-light component from the output currents of the diodes 158a and 158b.

The apparatus of FIG. 24 further comprises an A/D converter 150, a CPU 152, and an input-light amplifier 162. The amplifier 162 amplifies a signal output by the capacitor 96. The A/D converter 150 converts the output of the amplifier 162 into digital data, which is input to the CPU 152. The CPU 152 controls the driver 82 so that the IRED 66 is driven to emit an infrared beam, turns on and off the switches 114 and 116, and controls other components (not shown) of the apparatus.

The IRED 66 and the photodiodes 156a and 156b are located as is shown in FIG. 25 in order to achieve trigonometric distance-measuring. The infrared beam emitted by the IRED 66 is converged by a light-projecting lens 12 onto an object 14 and is reflected by the object. The beam, thus reflected, is converged by a light-receiving lens 16 and applied to the photodiodes 156a and 156b. The lens 16 is located such that its optical axis is spaced from that of the lens 12 by a distance S. The array of the photodiodes 156a and 156b is located at a distance f from the light-receiving lens 16.

The photodiodes 156a and 156b are located such that an infrared beam reflected by an object 14a at distance l₃ is applied onto the photodiode 156a only, and an infrared beam reflected by an object 14b at distance l₄ is applied onto the photodiode 156b only. Hence, the distance between the lens 12 and an object 14 can be measured from the amount of light each photodiode receives.

As indicated above, the diodes 158a and 158b are connected in series to the photodiodes 156a and 156b, respectively, and the switches 114 and 116 connected to the anodes of the diodes 158a and 158b, respectively, are turned on and off. Hence, as the switches 114 and 116 are turned on and off, the photodiodes are changed over. More specifically, when the switches 114 and 116 are turned on and off, respectively, the photocurrent generated by the photodiode 156a cannot flow into the current-voltage converting resistor 94. In this case, only the photocurrent generated by the photodiode 156b is processed by the amplifier 162, the A/D converter 150, and the CPU 152. Conversely, when the switches 114 and 116 are turned off and on, respectively, the photocurrent generated by the photodiode 156b cannot flow into the current-voltage converting resistor 94. In this case, only the photocurrent generated by the photodiode 156a is processed by the amplifier 162, the A/D converter 150, and the CPU 152. In this regard, it should be noted that the diodes 158a and 158b are designed not to influence the amplification of the signal output from the photodiode connected to the switch 114 or 116 which is off while the other is on.

Generally, a diode has a parasitic capacitor. When no bias current is supplied to it for changing the parasitic capacitor, it has poor response to a signal current. In the seventh embodiment, to improve the response of the diodes 158a and 158b, the bias resistors 160a and 160b are connected in parallel to the photodiodes 156a and 156b, respectively, and bias currents are thereby supplied to the diodes 158a and 158b via the resistors 160a and 160b at all times.

The operation of the eighth embodiment (FIG. 24) will be explained, with reference to the timing chart of FIG. 26.

The switches 114 and 116 are changed over under the control of the CPU 152. Then, the driver 82 drives the IRED 66, which emits an infrared beam toward the object 14. To be more precise, the switch 114 is turned on, and the switch 116 is turned off. The photodiode 156b generates a photocurrent from the infrared beam reflected from the object 14 and reaching the photodiode 156b. The input-light amplifier 162 amplifies the photocurrent. Then, the switch 114 is turned off, the switch 116 is turned on, whereby the input-light amplifier 162 amplifies the photocurrent which the photodiode 156a generates from the infrared beam reflected from the object 14 and reaching the photodiode 156a.

Then, the A/D converter 150 converts the photocurrent into digital data in synchronism with the emission of the infrared beam, as is illustrated in FIG. 26. The digital data is input to the CPU 152. From the digital data the CPU 152 determines which photocurrent has the greater magnitude, the photocurrent generated by the photodiode 156a or the photocurrent generated by the photodiode 156b. In accordance with the difference between the photocurrents, the CPU 152 determines the distance between the lens 12 and the object 14. In the case illustrated in FIG. 26, the CPU 152 detects that the photodiode 156a generates more current than the photodiode 156b and, hence, determines that the object 14 is located at a relatively short distance from the light-projecting lens 12.

As described above, the diodes 158a and 158b are connected in series to the photodiodes 156a and 156b, respectively, and the photodiodes 156a and 156b, both used as sensor elements, are changed over so that one input-light amplifier 162 and one A/D converter 150 are used to process the outputs of both photodiodes 156a and 156b. Thus, the apparatus comprises the least possible number of components, and can therefore be manufactured at reduced cost. Further, since the bias resistors 160a and 160b are connected in parallel to the photodiodes 156a and 156b, and bias currents are always supplied to the diodes 158a and 158b through the resistors 160a and 160b, the diodes 158a and 158b have good response to the photocurrents, though they have a parasitic capacitor each.

Another distance measurement apparatus, which is a ninth embodiment of the invention, will now be described with reference to FIG. 27.

As can be understood from FIG. 27, the ninth embodiment is identical to the eighth embodiment with regard to the section comprised of an AC-coupling capacitor 96, photodiodes 156a and 156b, diodes 158a and 158b, bias resistors 160a and 160b.

Like the eighth embodiment (FIG. 24), the ninth embodiment comprises a driver 82, a current-voltage converting resistor 94, an input-light amplifier 162, and a CPU 164. The CPU 164 has five output ports 132, 138, 170, 172 and 182 and one Schmitt trigger 180. Of the output ports, the ports 170 and 172, both being open-drain type, are formed of FET 166 and FET 168, respectively. They are connected to the anodes of the diodes 158a and 158b, respectively, for performing the same function as the switches 114 and 116 incorporated in the eighth embodiment.

The input-light amplifier 162 is a linear amplifier of the known type which comprises a CMOS inverter 162a and a feedback resistor 162b. The amplifier 162 amplifies the photocurrent (i.e., AC current) generated in the resistor 94, about 100 times.

The ninth embodiment further comprises PNP transistors 100 and 102, emitter resistors 104 and 106, an integrating capacitor 108, an emitter resistor 128, a voltage-current converting transistor 130, and a capacitor 174. The NPN transistor 130 has bias point determined by the emitter resistor 128. Since its emitter is connected to the capacitor 174 which is grounded, the transistor 130 functions as an emitter-grounded amplifier, converting the AC current output by the amplifier 162 into a collector current.

The PNP transistors 100 and 102 have virtually identical characteristics, and constitute a current-mirror circuit of the known type. They are connected to a power supply $V_{CC}$ by the emitter resistors 104 and 106, respectively. They serve to supply the collector current of the transistor 130 to the integrating capacitor 108.

The collector current is a signal which alternates in magnitude like an AC current. Hence, its amplitude will be nil if it is integrated continuously. Thus, synchronous integration must be performed on the collector current by means of timing control. The emitter of the PNP transistor 102 is connected to the output port 138 of the CPU 164. The CPU 164 controls the emitter potential of the PNP transistor 102, thereby controlling the collector current of the transistor 130 which is flowing through the PNP transistor 102. Since the output port 138, which is of open-drain type connected to the drain of an FET 176, the integrating capacitor 108 starts integrating the input voltage when the FET 176 is turned off. When the output of the FET 176 is set at the L level, the transistor 102 is turned off, whereby the capacitor 108 stops integrating the input voltage.

The positive terminal of the integrating capacitor 108 is connected to the output port 132 of the CPU 164, so that its negative terminal may be connected to or disconnected from the ground. When the negative terminal connected to the ground, the integrated charge is dissipates into the ground. The output port 132 is an open-drain type one connected to the drain of an FET 178. It functions as input port for the Schmitt trigger 180. The Schmitt trigger 180 determines whether or not the voltage integrated by the capacitor 108 has increased over a threshold value of $V_{CC}/2$. Thus, the integration circuit, or the current-mirror circuit, can perform, in effect, the function of the A/C converter 150 incorporated in the eighth embodiment (FIG. 24).

The output port 182 of the CPU 167 is connected by the driver 82 to the IRED 66. A timing signal is supplied to the driver 82. In response to the timing signal the driver drives the IRED 66, which emits an infrared beam. Every time the timing signal is supplied from the output port 182, a signal is supplied from the output port 138 to the emitter of the transistor 102, controlling the emitter potential of the transistor 102. The CPU 164 can thereby determine how many times the IRED 66 emits an infrared beam and how many times the capacitor 108 integrates the input voltage until the output voltage of the integrating capacitor 108 increases over the threshold value $V_{CC}/2$. Namely, the photocurrent signal (i.e., an analog value) is converted to a digital value which is the number of times the capacitor 108 repeats integration. This determination is achieved by converting until its output voltage becomes greater than $V_{CC}/2$.

Figure 28:
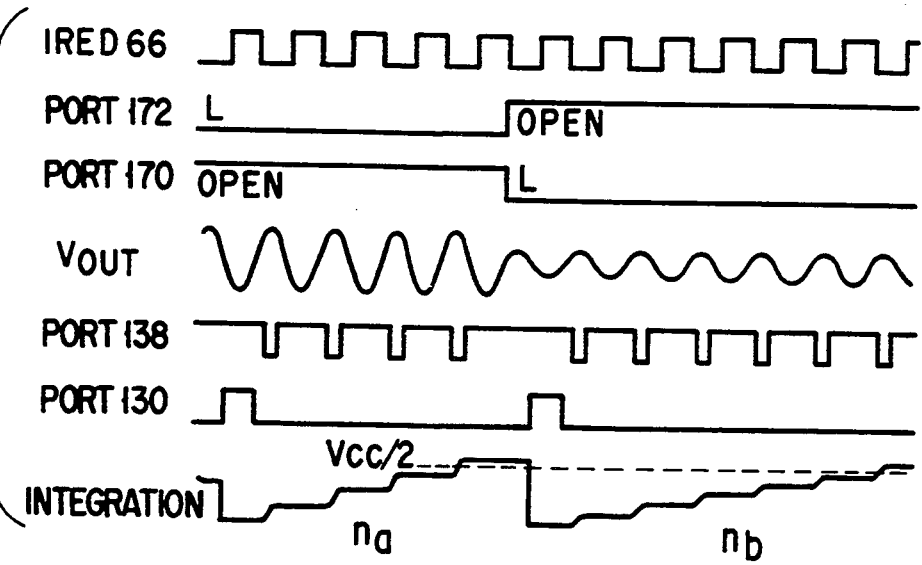
FIG. 28 is a timing chart explaining the integration performed in the ninth embodiment.

The voltage integration performed in the ninth embodiment will now be explained, with reference to the timing chart of FIG. 28.

The IRED 66 intermittently emits an infrared beam at duty ratio of 50%. First, the output port 170 is opened, and the output port 172 is set at the L level. Then, the photocurrent signal produced by the photodiode 156a flows through the diode 158a. The resistor 94 converts the signal into a voltage. The voltage is applied via the AC-coupling capacitor 96 to the input-light amplifier 162 and is amplified thereby. The output voltage of the amplifier 162 is applied to the transistor 130, which converts the voltage into a current. Thereafter, a current equal to the collector current of the transistor 130 is supplied to the integration capacitor 108 by means of the current-mirror circuit constituted by the transistors 100 and 102. The capacitor 130 integrates this current. Prior to the current-integration, a reset signal is supplied to the capacitor 108, thereby initializing the integrating capacitor 108.

Next, the output port 172 is opened, and the output port 170 is set at the L level. The photocurrent signal is amplified by the input-light amplifier 162 and subsequently integrated by the integrating capacitor 108. Meanwhile, a control signal synchronous with the emission of an infrared beam is supplied from the output port 138 to the transistor 106. At this time, the output voltage $V_{OUT}$ of the amplifier 162 is integrated by the integrating capacitor 108. The voltage $V_{OUT}$ is integrated the moment the photocurrent signal (i.e., an AC signal) is at its peak. Hence, as can be seen in FIG. 28, the higher the voltage $V_{OUT}$ (that is, the greater the photocurrent), the greater the voltage integrated by the capacitor 108. The number of times the capacitor 108 repeats voltage integration until the integrated voltage increases over the threshold value of $V_{CC}/2$ depends on the magnitude of the photocurrent signal; the greater the magnitude, the less the number of times of the voltage integration.

Figure 29:
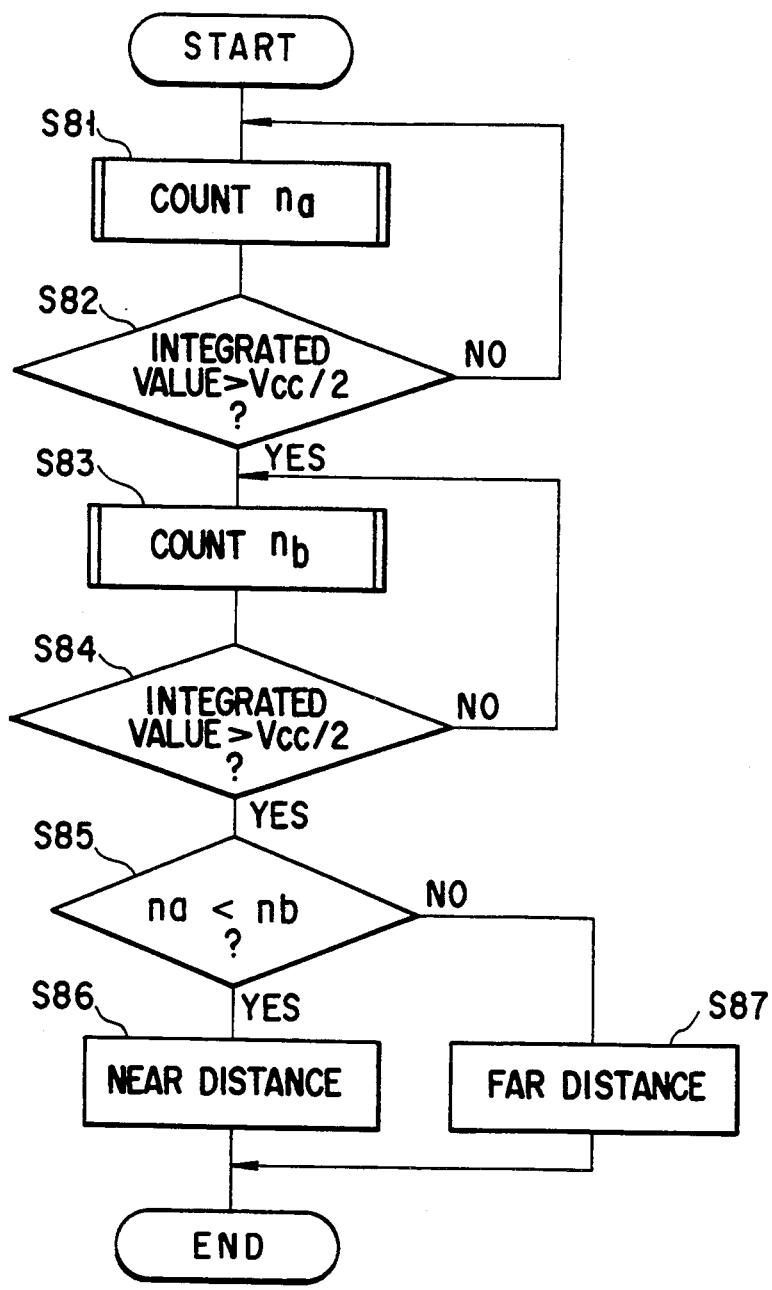
FIG. 29 is a flow chart explaining the detection effected in the ninth embodiment.

With reference to the flow chart of FIG. 29, it will now be explained how the eighth embodiment (FIG. 27) measures the distance at which an object of photography is located.

The IRED 66 emits an infrared beam intermittently. The beam is reflected by the object and applied, partly to the photodiode 156a and partly to the photodiode 156b. In step S81, the number $n_a$ of times the capacitor 108 integrates the photocurrent signal output by the photodiode 156a is counted. In step S82, it is determined whether or not its output voltage has increased over $V_{CC}/2$. If No, step S81 is repeated. If Yes, the operation goes to step S83. In step S83, the number $n_b$ of times the capacitor 108 integrates the photocurrent signal output by the photodiode 156b is counted. In step S84, it is determined whether or not its output voltage has increased over $V_{CC}/2$. If No, step S83 is repeated. If Yes, the operation goes to step S85.

In step S85, it is determined whether $n_a$ is less than $n_b$. If Yes, the operation goes to step S86, in which it is determined that the object is at a relatively short distance. If No in step S85, that is $n_a$ is not less than $n_b$, the operation advances to step S87, in which it is determined that the object is at a relatively long distance. If $n_a < n_b$ as is illustrated in FIG. 28, the object is detected to be present at a relatively short distance from the distance measurement apparatus.

From the above it would be apparent that the ninth embodiment attains the same advantages as the eighth embodiment shown in FIG. 24.

In the eighth and ninth embodiments, the CPU 164 controls the voltage integration and determines whether or not the integrated voltage is greater than the threshold value $V_{CC}/2$. The functions of the CPU 164 are not limited to these. Rather, the CPU 164 can control a lens-driving unit in accordance with the distance measured, thereby to accomplish automatic focusing.

FIG. 30 shows a section of a distance measurement apparatus according to a tenth embodiment of this invention. The tenth embodiment is identical to the eighth and ninth embodiments, except for the section illustrated in FIG. 30, which is connected to the input of an input-light amplifier 162.

As FIG. 30 clearly shows, a constant current source 184 is connected to the collector of a PNP transistor 186. PNP transistors 188a and 188b, the bases of which are common to that of the transistor 186, constitute a current-mirror circuit. The collectors of the transistors 188a and 188b are connected to the anodes of diodes 158a and 158b, respectively. Hence, bias currents can be supplied, not influencing each other, to the diodes 158a and 158b which are used to extract a photocurrent signal.

In the tenth embodiment (FIG. 30), the bias currents supplied to the diodes 158a and 158b can be constant since these currents do not influence each other. Further, the tenth embodiment requires no components equivalent to the bias resistors 160a and 160b used in the eighth and ninth embodiments.

FIG. 31 illustrates a main section of a distance measurement apparatus according to an eleventh embodiment of the present invention. This embodiment is characterized in that the photocurrent signals produced by photodiodes 156a and 156b are directly amplified, not converted into voltages and then amplified as is practiced in the eighth to tenth embodiments.

More specifically, as shown in FIG. 31, an operational amplifier 188 is utilized in place of the light-receiving amplifier 162. As switches 114 and 116 are alternately turned on and off, the photocurrent signals output by photodiodes 156a and 156b are alternately input to the operational amplifier 188 and a current-amplifying transistor 190. The amplifier 188 operates such that the photocurrent signal produced by the photodiode 156a or 156b is supplied, at a low input impedance, to the base of the transistor 190. The transistor 190 amplifies the signal with an amplification factor of $\beta$. The photocurrent signal so amplified is supplied to an integrating capacitor 108 through the current-mirror circuit constituted by transistors 100 and 102. The capacitor 108 integrates the photocurrent signal, just as in the tenth embodiment (FIG. 27). A reference voltage $V_{ref}$ is applied to the positive input terminal of the operational amplifier 188.

Although the eleventh embodiment shown in FIG. 31 requires an operational amplifier, it has a higher S/N ratio than the eighth to tenth embodiment since the current-voltage conversion is not repeated at all.

Further, without an element equivalent to the current-voltage converting resistor 94 incorporated in the eighth to tenth embodiments, a drop of the power-supply voltage $V_{CC}$ is prevented. The voltage $V_{CC}$ can therefore set, not greatly affected by the intensity of the light reflected by an object and applied to the photodiodes 156a and 156b. In other words, the distance measurement apparatus can operate at a lower power-supply voltage than the eighth, the ninth, and the tenth embodiment.

Figure 32:
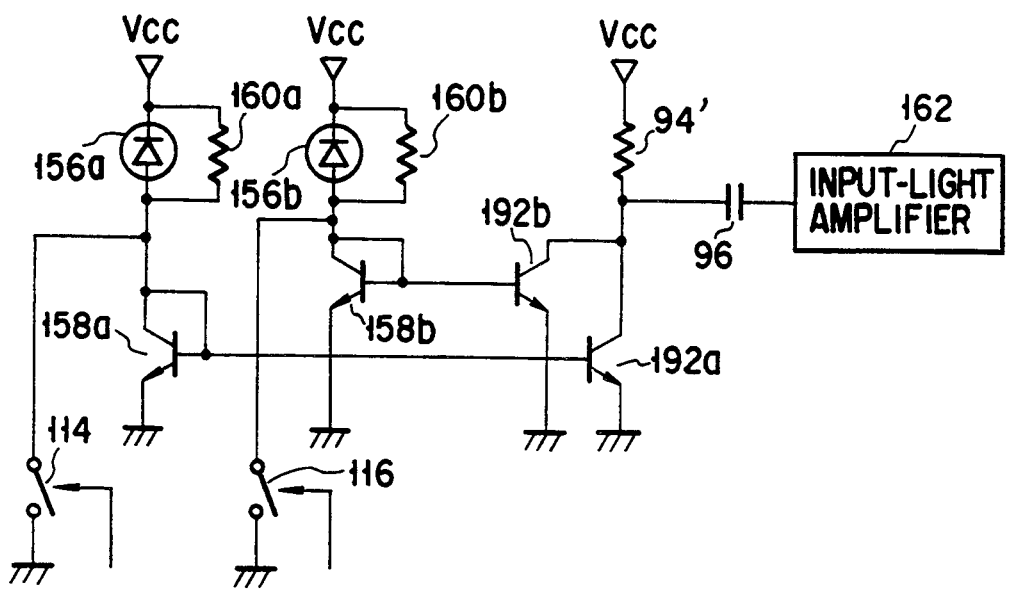
FIG. 32 a circuit diagram showing a distance measurement apparatus according to a twelfth embodiment of the present invention.

FIG. 32 illustrates a main section of a distance measurement apparatus according to a twelfth embodiment of this invention. The twelfth embodiment is identical to the eighth, ninth and tenth embodiments, except for the section illustrated in FIG. 32, which is connected to the input of an input-light amplifier 162.

The twelfth embodiment (FIG. 32) is characterized in three respects. First, NPN transistors 158a' and 158b', each having its collector and base connected together, are used in place of the diodes 158a and 158b. Second, transistors 192a and 192b, which are identical in characteristics, are connected, forming a current-mirror circuit. Third, a collector resistor 94' is connected between a terminal of the power-supply voltage $V_{CC}$ and the node of the collectors of the transistors 192a and 192b.

In the twelfth embodiment, the photocurrent signals produced by the photodiodes 156a and 156b flow to the collector resistor 94' in the form of the collector currents of the transistors 192a and 192b. Thus, the apparatus can measure the distance at which an object is located even if the voltage applied by the resistor 94' is low.

The currents generated by the photodiodes 156a and 156b are alternately selected by turning on and off switches 114 and 116, in the same way as is effected in the eighth embodiment (FIG. 24), the tenth embodiment (FIG. 30), and the eleventh embodiment (FIG. 31). When the switch 114 is turned on, the transistor 192a is turned off, preventing the photocurrent signal generated by the photodiode 156a from flowing to the collector resistor 94'. Similarly, when the switch 116 is turned on, the transistor 192b is turned off, preventing the photocurrent signal generated by the photodiode 156b from flowing to the collector resistor 94'.

Figure 33:
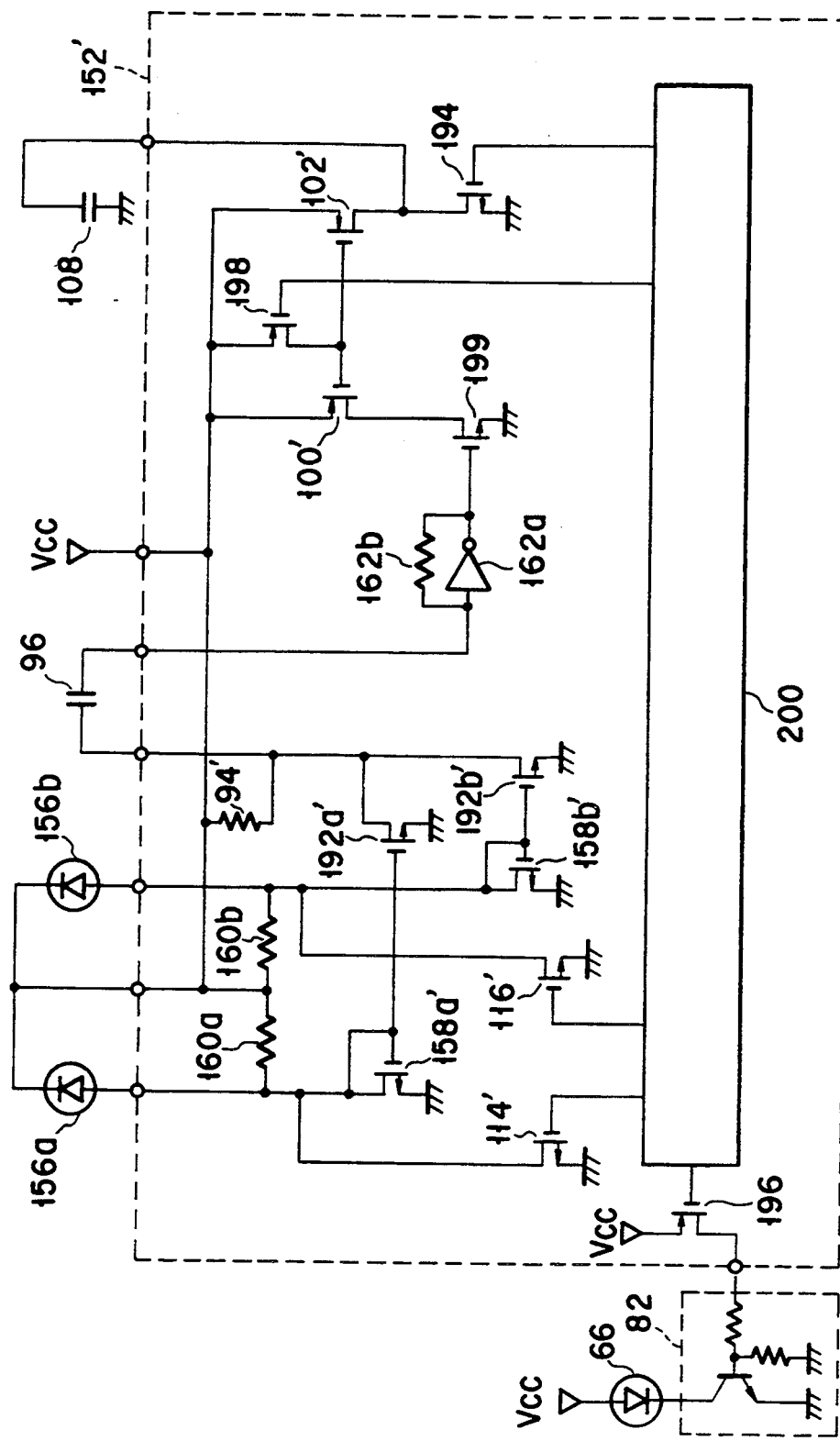
FIG. 33 is a circuit diagram showing a distance measurement apparatus according to a thirteenth embodiment of this invention.

FIG. 33 shows a main section of a distance measurement apparatus according to a thirteenth embodiment of the present invention. This embodiment is characterized by the use of a CPU 152' which is a sequence-controlling one-chip microcomputer like the CPU 152 shown in FIG. 24 and which incorporates the circuit illustrated in FIG. 31.

Since the circuit of FIG. 31 is formed on the same chip identical to CPU 152, MOS transistors are used in place of all bipolar transistors incorporated in the eighth to eleventh embodiments shown in FIGS. 24, 30, and 31, respectively.

Components required other than the CPU 152' are only an IRED 66, a driver 82, a capacitor 96, an integrating capacitor 108, and photodiodes 156 and 156b. This is because the other components of the twelfth embodiment (FIG. 32) are all incorporated in the CPU 152'.

In the thirteenth embodiment, bias resistors 160a and 160b, a resistor 94', and a feedback resistor 162b, and the like are pinch resistors or ion-injected resistors, which are formed in CMOS process. Switches 114' and 116', and a switch 194 for resetting the integrating capacitor 108, and the like are comprised of NMOS transistors. Switches 196 and 198 for connecting and disconnecting a source of power-supply voltage $V_{CC}$ are comprised of PMOS transistors.

As FIG. 33 shows, a CMOS inverter 162a and the resistor 162b constitute a linear amplifier, the output of which is converted into a current signal by the switch 194. PMOS transistors 100' and 102' constitute a current-mirror circuit. When the switch 198 is turned on, the drain current of the PMOS transistor 102' ceases to flow. Hence, synchronous integration can be achieved.

The CPU 152' has a core 200 which is designed to turn on and off the switches 114', 116', 196, and 198.

The additional circuit formed on the CPU chip is only a fractional part of the CPU chip, and a cost increase attributed to this circuit is minimal. Hence, the thirteenth embodiment, as a whole, can be manufactured at low cost. Since the embodiment comprises a relatively small number of components, it can be made in a proportionally small number of steps and, ultimately, serves to provide a high-reliability camera.

The embodiments described above have two photodiodes each, which form an element for receiving the infrared reflected from an object. In the present invention, however, three or more photodiodes can be used to detect the infrared beam. Needless to say, the more photodiodes employed, the more accurately the distance at which the object is located can be measured.

In the fifth embodiment (FIG. 16) comprising an integrating circuit, the integrated current I will have the following value if the circuit is connected to the preamplifier 98 which outputs an AC voltage $V_{OUT}$:

$$I = \{V_{CC} - (V_{OUT} + V_{Bi}) - 0.6\}/R$$

where $V_{Bi}$ is the voltage which the preamplifier 98 outputs when the light-receiving element 50 receives no infrared beam reflected. Namely, the resistor R converts the AC voltage $V_{OUT}$ into a current. Assuming that $V_{OUT} = 18$ mV and R i = 1 Ω, the signal current will be 18 μA.

In the integration circuit shown in FIG. 16, a considerably large bias current of 400 μA will inevitably flow even if the AC voltage $V_{OUT}$ is zero, in the case where $V_{Bi} = V$, $V_{CC} = 2$ V. That is: 0.4 V/1 k Ω = 400 μA. If the bias current is 20 times or more times greater than the signal current, it would be difficult to extract the signal current. To extract the signal current reliably, the fifth embodiment (FIG. 16) needs to have an emitter-grounded amplifier which should be connected between the integration circuit and the preamplifier 98.

Other embodiments of the invention will be described, which need no have such an amplifier as is required in the fifth embodiment of FIG. 16.

Figure 34:
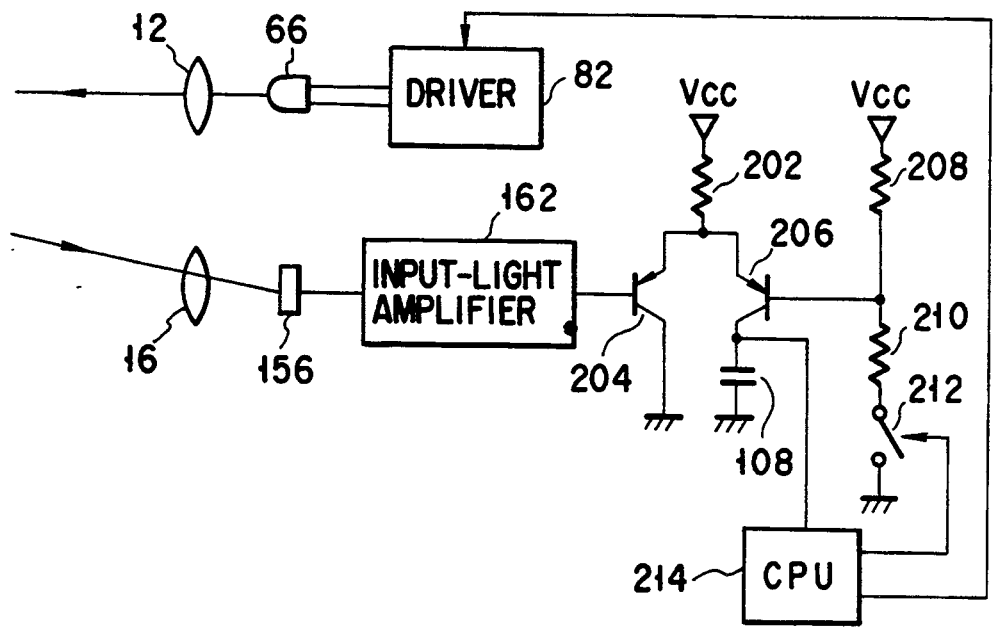
FIG. 34 is a circuit-block diagram showing a distance measurement apparatus according to a fourteenth embodiment of the invention.

FIG. 34 is a circuit-block diagram showing a distance measurement apparatus according to a fourteenth embodiment of the present invention. As is evident from FIG. 34, this apparatus comprises a light-projecting lens 12, a light-receiving lens 16, an IRED 66, a driver 82, an integration capacitor 108, an array 156 of photodiodes, an input-light amplifier 162, a resistor 202, differential transistors 204 and 206, resistors 208 and 210, a switch 212, and a CPU 214.

The IRED 66 emits an infrared beams to object (not shown) when driven by the driver 82. The transistors 204 and 206 constitute a differential amplifier for performing differential amplification on the signal output by the input-light amplifier 162. The integration capacitor 108 is connected to the collector of the transistor 206. The resistor 208 is connected between the base of the transistor 206 and a source of power-supply voltage $V_{CC}$. The resistor 210 and the switch 212 form a series circuit, which is connected between the ground and the base of the transistor 206. The CPU 214 controls the switch 212 and the integrating circuit 108.

The fourteenth embodiment is characterized by the use of a differential amplifier connected to the output of the input-light amplifier 162. Another feature resides in that synchronous integration can be effected by simple control. To be more specific, the integration can be achieved merely by connecting the capacitor 108 to, and disconnecting it from, the ground, whereas an analog switch must be used to control the integrating capacitor in the conventional distance measurement apparatus. In other words, it suffices to use an open-drain type output port of the CPU 214 as switch 212.

The differential transistors 204 and 206, which form the differential amplifier, are PNP transistors having so similar characteristics that they can be connected to make a pair. They are connected by the resistor 202 to the source of power-supply voltage $V_{CC}$. The the transistor 204 has its base coupled to the output of the input-light amplifier 162, and its collector connected to the ground. The transistor 206 has its base coupled to the node of the resistors 208 and 210, and its collector connected to the integrating capacitor 108.

When the switch 212 is turned on under the control of the CPU 214, the resistors 208 and 210 divide the power-supply voltage $V_{CC}$, setting the base of the transistor 206 at an appropriate potential. When the switch 212 is turned off under the control of the CPU 214, the resistor 208 is pulled up, setting the base of the transistor 206 at the H level. The power supply to the integrating capacitor 108 is thereby stopped.

With reference to the timing chart of FIG. 35, it will be explained how the integrating capacitor 108 integrates the output signal of the amplifier 162 as the IRED 66 intermittently emits an infrared beam to the object (not shown).

Figure 35:
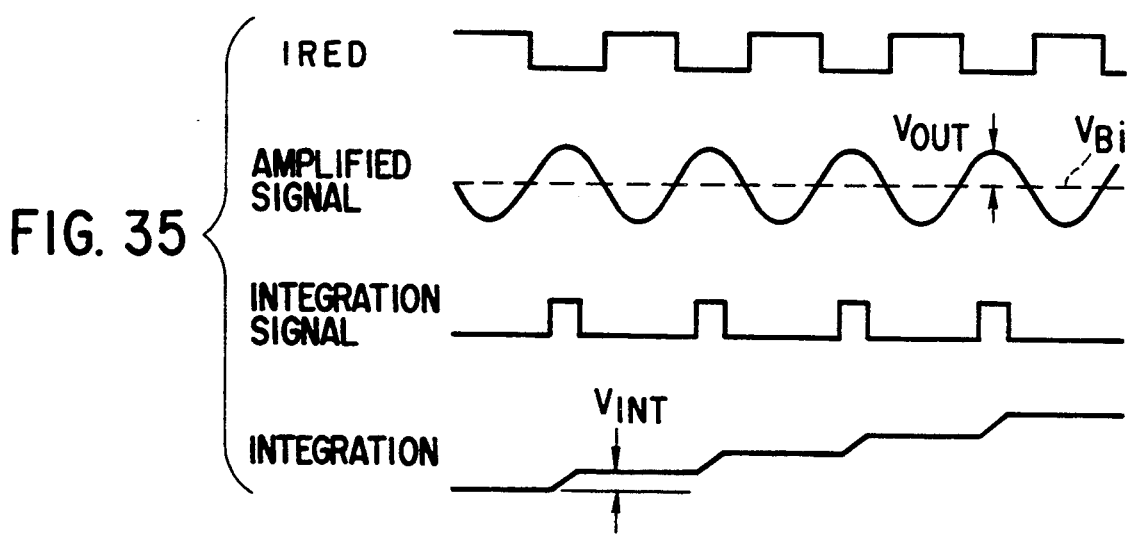
FIG. 35 is a timing chart explaining how an integrating capacitor integrates an input current as an IRED intermittently emits infrared beams, in the distance measurement apparatus shown in FIG. 34.

As the IRED 66 is repeatedly turned on and off as is indicated in FIG. 35, the input-light amplifier 162 outputs an alternating photocurrent having an amplitude $V_{OUT}$, the zero-cross point of which is bias point $V_{Bi}$. Hence, when the capacitor 108 integrates the entire output signal of the input-light amplifier 162, the components of the signal which are positive to the bias point $V_{Bi}$ cancel out the components which are negative with respect to the bias point $V_{Bi}$. After all, the capacitor 108 integrates the bias point $V_{Bi}$. It is, therefore, necessary for the capacitor 108 to integrate the output of the amplifier 162 at such regular intervals as is illustrated in FIG. 35.

The voltage $V_{INT}$ which the capacitor 108 integrates each time is:

$$V_{INT} = \{V_{CC}(V_{OUT}+V_{Bi}) - 0.6\} \cdot t_{INT}/R \cdot C$$

where C is the capacitance of the capacitor 108 and $t_{INT}$ is the integrating time thereof.

Due to the use of the differential amplifier, the integrated voltage $V_{INT}$ is given as follows $$V_{INT} = \{t_{INT} \cdot IO \cdot (\exp(V_{OUT}/V_T))\} / \{(\exp(V_{OUT}/V_T+1) \cdot C_{INT}\} \quad (9)$$

where IO is the current flowing through the resistor 202, and the base current of the transistor 206 is adjusted to $V_{Bi}$ by the resistors 208 and 210.

As can be understood from the equation (9), the voltage $V_{OUT}$ of the amplified signal is not related to with the voltage $V_{Bi}$. Assuming that $V_{OUT}$ is 18 mA, the integrated voltage $V_{INT}$ will then be:

$$V_{INT} = (\tfrac{1}{2}) \cdot (t_{INT} \cdot IO/C_{INT}) \quad (10)$$

When there is no signal current, the voltage $V_{INT}$ will have the following value:

$$V_{INT} = (\tfrac{1}{2}) \cdot (t_{INT} \cdot IO/C_{INT}) \quad (11)$$

The value the voltage $V_{INT}$ takes when a signal current is input greatly differs from the value the voltage $V_{INT}$ assumes when no signal current is input.

In the fourth embodiment (FIG. 16), the ratio of these values is about 20:21, making it difficult to extract or detect the signal current. By contrast, in the fourteenth embodiment (FIG. 34), the signal current can be accurately integrated by a relatively simple circuit, not influenced by the bias level of the input-light amplifier 162. The distance measurement apparatus according to the fourteenth embodiment can, therefore, be manufactured at lower cost than that of the fifth embodiment.

FIG. 36 is a circuit-block diagram showing a distance measurement apparatus according to a fifteenth embodiment of the present invention. This embodiment has an integration circuit similar to that incorporated in the fourteenth embodiment (FIG. 34).

The fifteenth embodiment has a photodiode 156 for a light-receiving element. A photocurrent signal the photodiode 156 produces is converted into a voltage signal by means of a resistor 94. Since the photocurrent signal contains a component corresponding to the light illuminating an object, it is necessary to extract and amplify the alternating signal current. To this end, the output of the photodiode 156 is connected by a capacitor 96 to the input of a first linear amplifier of the known type which comprises an inverter 162a and a feedback resistor 162b.

The output of the first linear amplifier is stable, at potential of $V_{CC}/2$ ($V_{CC}$ is the power-supply voltage) as long as there is no input signal current. When a signal current, which is an alternating current, is input, the input voltage can be increased to about 40 dB with respect to the output-terminal potential of the first linear amplifier.

As is shown in FIG. 36, a resistor 202, differential transistors 204 and 206, and an integrating capacitor 108 constitute an integration circuit which is similar to the first differential amplifier used in the fourteenth embodiment (FIG. 34). The base of the transistor 204 is connected to the output of the first linear amplifier. The base of the transistor 206 is connected to a second linear amplifier which comprises an inverter 216a and a feedback resistor 216b. The use of the second linear amplifier distinguishes the fifteenth embodiment from the fourteenth embodiment.

No signal corresponding to the signal current is input to the second linear amplifier. The second linear amplifier performs the same function as the resistors 208 and 210 incorporated in the fourteenth embodiment; it generates a potential equal to the voltage generated when no signal current is input.

In the fourteenth embodiment, the base potential of the differential transistor 206 is pulled up by turning off the switch 212, thereby stopping the supply of a current to the integrating capacitor 198. By contrast, in the fifteenth embodiment, the transistor 218 incorporated in the CPU 214 is turned on, and the input to the inverter 216a is set at the L level and, hence, the output thereof is set at the H level, there by turning off the differential transistor 206.

When the output port 220 of the CPU 214 is opened, a voltage is generated which is equal to the voltage generated when an input is supplied to the first linear amplifier. As a result of this, the current to supply to the integrating capacitor 108 can be changed in accordance with the difference between the base currents of the differential transistors 204 and 206.

As is shown in FIG. 36, the integrating capacitor 108 is connected to the output port 226 of the CPU 214. This port 226 is coupled to an open-drain transistor 222 and a Schmitt-trigger inverter 224, both incorporated in the CPU 214. When the transistor 222 is turned on, the capacitor 108 is initialized. The inverter 224 inverts its output when the integrated voltage reaches $V_{CC}/2$. The operation controller 228 built in the CPU 214 can, therefore, determine that the voltage integrated by the capacitor 108 reaches the value of $V_{CC}/2$.

The CPU 214 controls a driver 82, which drives an IRED 66. Also, the CPU 214 controls the integration circuit constituted by the components 108, 202, 204, and 206, and also the second linear amplifier comprised of components 216a and 216b. The CPU 214 determines the distance l at which the object is located, from the number of times the integration circuit has repeated integration until the output voltage of the capacitor 108 reaches the value of $V_{CC}/2$.

FIG. 37 is a timing chart explaining how the capacitor 108 performs integration in the fifteenth embodiment, wherein the distance l is determined from the difference between the number of times the capacitor 108 repeats integration until its output voltage reaches $V_{CC}/2$ while the IRED 66 is emitting no infrared beam and the number of times the capacitor 108 repeats integration until its output reaches $V_{CC}/2$ while the IRED is emitting an infrared beam. If the transistor 222 is turned on before the integration process, the integrating capacitor 108 will be initialized. The capacitor 108 integrates the input voltage in synchronism with the emission of IRED 66, in the same way as in the fourteenth embodiment (FIGS. 34 and 35).

More specifically, as is shown in FIG. 37, the CPU 214 counts the number n of times the capacitor 108 integrates the input voltage while the IRED 66 emits no infrared beam until its output voltage reaches $V_{CC}/2$, and also count the number $n_0$ of times the capacitor 108 integrates the input voltage while the IRED 66 emits an infrared beam until its output voltage reaches $V_{CC}/2$. The number $n_0$ varies in accordance with the base potential $V_{Bi}$ of the differential transistor 204. Hence, when the synchronous integration is effected with the timing shown in FIG. 35, the current flowing into the capacitor 108 varies with $V_{Bi}$ and $V_{OUT}$. In the fourteenth embodiment, since the base potential of the transistor 204 is higher than that of the transistor 206, the current flowing into the capacitor 108 is greater than in the case where no signal current is input. It follows that the number n is less than the number $n_0$.

With reference to the flow chart of FIG. 38, it will now be explained how the fifteenth embodiment (FIG. 36) measures the distance l. The fifteenth embodiment determines that the object is located at a relatively short distance when the photodiode 156 receives an infrared beam emitted by the IRED 66 and reflected by the object, and at a relatively long distance when the photodiode 156 does not detect the infrared beam.

Figure 38:
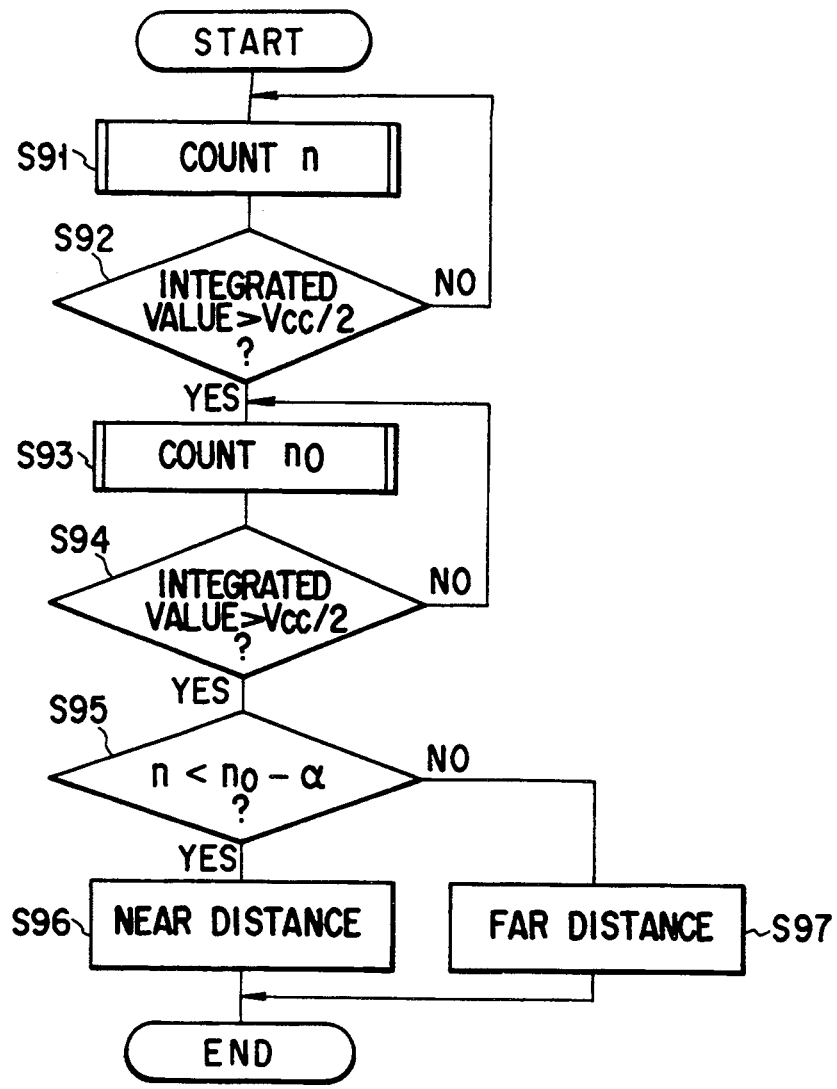
FIG. 38 is a flow chart explaining how the apparatus of FIG. 36 determines the distance at which an object is located.

Referring to FIG. 38, the IRED 66 is driven, emitting an infrared beam. The number n is counted in step S91, n being the number of times the capacitor 108 repeats integrate the output of the photodiode 156. In step S92, it is determined whether or not the output voltage of the integrating capacitor 108 has increased over the threshold value of $V_{CC}/2$. If No, step S91 is repeated. If Yes, the operation goes to step S93, in which the IRED 66 is not driven, and the number $n_0$ is counted, $n_0$ being the number of times the capacitor 108 repeats integration of the output of the photodiode 156. In step S94, it is determined whether or not the output voltage of the integrating capacitor 108 has increased over the threshold value of $V_{CC}/2$. If No in step S94, step S93 is repeated. If Yes in step S94, the operation goes to step S95, in which it is determined whether or not $n < n_0 - \alpha$. If Yes, the operation goes to step S96; if No, the operation advances to step S97. It should be noted that $\alpha$ is a tolerance value corresponding to noise which may be contained in the voltage input to the integrating capacitor 108. Hence, if $n < n_0 - \alpha$, it is determined in step S96 that the object is at a relatively short distance; if $n \geq n_0 - \alpha$, it is determined in step S97 that the object is at a relatively long distance.

In accordance with the results obtained in step S96 or S97, the CPU 214 controls an automatic focusing device or the like.

Since the number n is compared with the value of $n_0 - \alpha$, the apparatus can measure the distance l with sufficient accuracy, despite the temperature dependency of the transistors used and the integrating capacitor 108. For the same reason, the apparatus can determine the distance l accurately even if the power-supply voltage $V_{CC}$ deviates from the rated value, or even if the differential transistors 204 and 206 and the inverters 162a and 216a have characteristics deviating from the design specifications.

Figure 39:
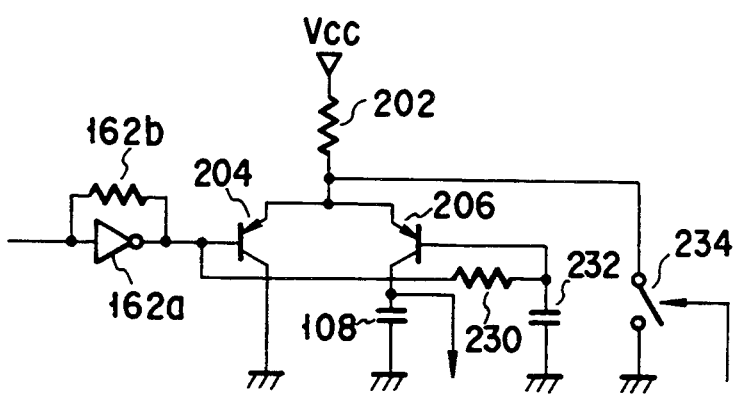
FIG. 39 is a circuit diagram showing the primary section of a distance measurement apparatus according to a sixteenth embodiment of this invention.

FIG. 39 shows the main section of a distance measurement apparatus according to a sixteenth embodiment of the invention. The other sections of this apparatus are identical to those of the fourteenth embodiment (FIG. 34) and fifteenth embodiment (FIG. 36).

The sixteenth embodiment is designed to prevent changes in the characteristics of the linear amplifier comprised of an inverter 162a and a resistor 162b. More precisely, the output of the linear amplifier (equivalent to the first linear amplifier incorporated in the fifteenth embodiment) is smoothed by means of a resistor 230 and a capacitor 232, thereby fixing the base potential of a differential transistor 206. Hence, the potential applied to the base of the transistor 206 is similar to the voltage $V_{Bi}$ which is illustrated in FIG. 35. As can be understood from FIG. 39, a switch 234 is closed, setting the common emitter potential of the differential transistors 204 and 206 at the L level, so that integration is inhibited.

The sixteenth embodiment need not have a component equivalent to the second linear amplifier incorporated in the fifteenth embodiment (FIG. 36). Therefore, no offset voltage need to be applied to the inverter 162a of the linear amplifier.

Figure 40:
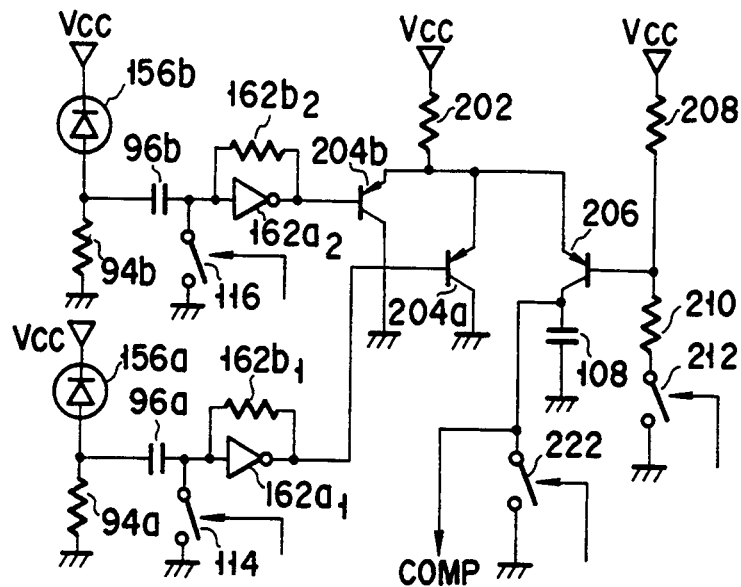
FIG. 40 is a circuit diagram showing a distance measurement apparatus according to a seventeenth embodiment of this invention.

FIG. 40 shows another distance measurement apparatus according to a seventeenth embodiment of this invention. This embodiment is characterized in that the photocurrents produced by photodiodes 156a and 156b are integrated by a differential amplifier. The apparatus further comprises an IRED 66, a light-projecting lens 12, and a light-receiving lens 16, which are not shown in FIG. 40. The components 12, 16, 66, 156a, 156b are so arranged as to accomplish the known trigonometric distance-measuring.

The seventeenth embodiment is designed such that, if the object is located at a predetermined distance $l_3$, an infrared beam reflected from an object forms a beam spot located at the boundary between the photodiodes 156a and 156b and, hence, the photodiodes 156a and 156b generate photocurrents of the same value. Hence, when the photodiode 156b produces a greater photocurrent than the photodiode 156a, it can be determined that the object is at a distance $l_4$ which is longer than the distance $l_3$.

Figures 41A, 41B, 41C:
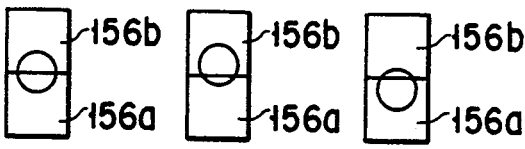
FIGS. 41A, 41B, and 41C are front views of the light-receiving element of the seventeenth embodiment, illustrating various positions which a beam spot take on the surface of the element.

FIGS. 41A, 41B, and 41C show various positions the beam spot may take with respect to the photodiodes 156a and 156b. More precisely, FIG. 41A illustrates the position the beam spot assumes if the object is located at the distance $l_3$, FIG. 41B the position the spot takes if the object is at the distance $l_4$, and FIG. 41C the position the spot takes if the object is at a distance shorter than the distance $l_3$. As can be understood from FIGS. 41A, 41B, and 41C, it is possible to determine the distance at which the object is located is equal to, shorter than, or longer than, the distance $l_3$, by comparing the currents output by the photodiodes 156a and 156b. This distance measurement is not affected by the intensity of the object.

Referring back to FIG. 40, the seventeenth embodiment will now be described in detail.

Resistors 94a and 94b are connected to the photodiodes 156a and 156b, respectively, for converting the output currents of the photodiodes 156a and 156b into voltages. The voltages, thus generated, are AC-coupled by means of capacitors 96a and 96b and applied to two linear amplifiers, respectively, as in the fourteenth embodiment (FIG. 34). The first linear amplifier is comprised of an inverter 162$a_1$ and a resistor 162$b_1$, and the second linear amplifier is comprised of an inverter 162$a_2$ and a resistor 162$b_2$.

As can be understood from FIG. 40, the differential amplifier incorporated in the seventeenth embodiment is identical to that of the fifteenth embodiment, except in that two differential transistors 204a and 204b are used in place of the single differential transistor 204. The seventeenth embodiment has two switches 114 and 116 for selecting the photodiodes 156a and 156b alternately.

Figure 42:
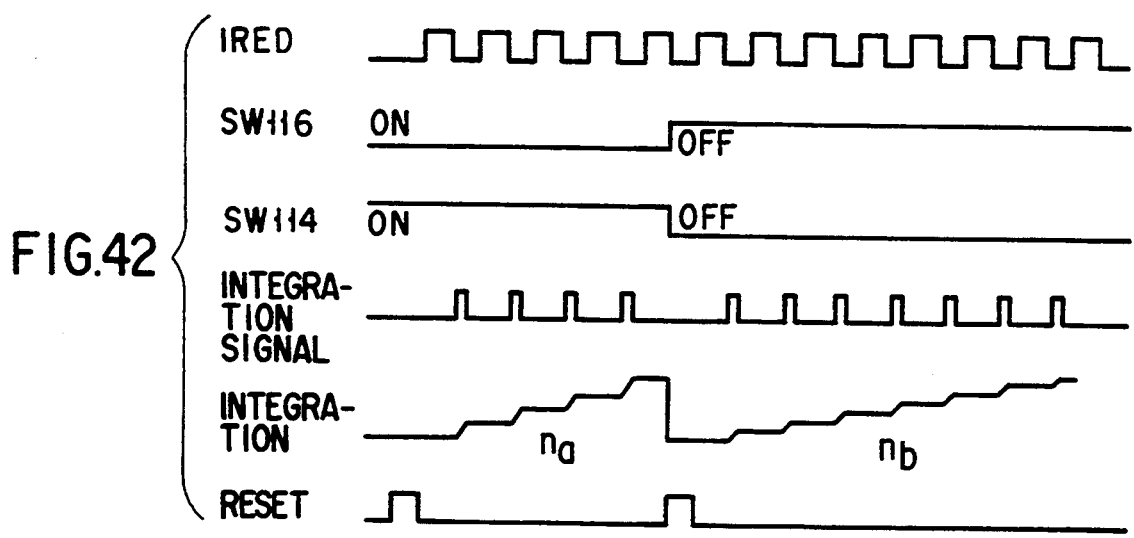
FIG. 42 is a timing chart explaining the integration performed in the apparatus of FIG. 40.

With reference to the timing chart of FIG. 42, it will be explained how the seventeenth embodiment perform integration.

When the switches 114 and 116 are turned off and on, respectively, the output of the first linear amplifier is set at the H level. Then, the differential transistor 204b is turned off, whereby the differential transistor 204a and a differential transistor 206 cooperate, comparing voltages and achieving integration in the same way as in the fourteenth embodiment (FIG. 34).

Conversely, when the switches 114 and 116 are turned on and off, respectively, the output of the second linear amplifier is set at the H level. Then, the differential transistor 204a is turned off, whereby the differential transistor 204b and the differential transistor 206 cooperate, comparing voltages and achieving integration in the same way as in the fourteenth embodiment (FIG. 34).

The switch 114 remains on until the output voltage of an integrating capacitor 108 increases to a predetermined value. The number $n_a$ times the capacitor integrates the input voltage to have its output increased to the predetermined value is counted. Then, the switch 116 remains on until the output voltage of an integrating capacitor 108 increases to the predetermined value. The number $n_b$ times the capacitor integrates the input voltage to have its output increased to the predetermined value is counted. The numbers $n_a$ and $n_b$ are compared, finding the difference between them. The distance, at which the object is located, is determined from the difference between $n_a$ and $n_b$ with accuracy, regardless of the intensity of the object.

Figure 43:
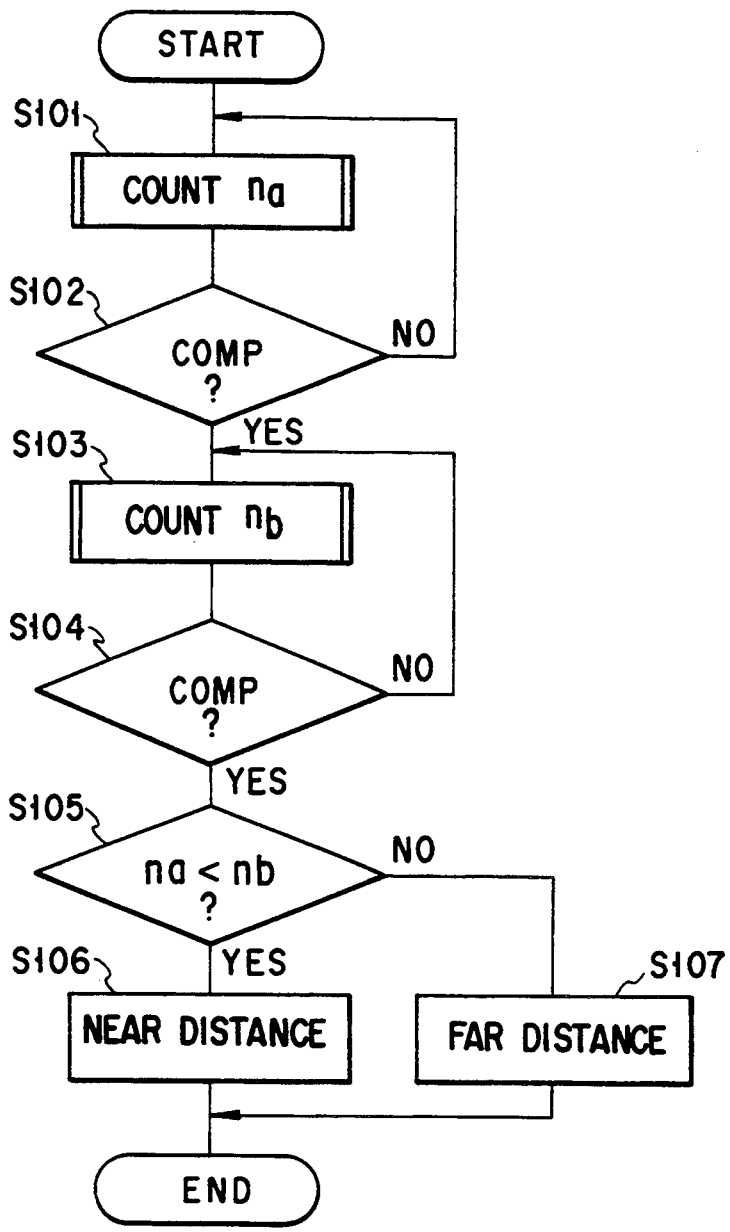
FIG. 43 is a flow chart explaining how the apparatus of FIG. 40 determines the distance at which an object is located.

With reference to the flow chart of FIG. 43, it will be described how the sixteenth embodiment (FIG. 40) measures the distance at which an object is located.

First, the IRED 66 (not shown) is driven, emitting an infrared beam. The beam is reflected from the object and applied to the photodiodes 156a and 156b. The number $n_a$ of times the capacitor 108 integrates the photocurrent signal output by the photodiode 156a is counted in step S101. Then, in step S102, it is determined whether or not the output voltage of the capacitor 108 has reached the predetermined value. If No, step S101 is repeated. If Yes, the operation goes to step S103, in which the number $n_b$ of times the capacitor 108 integrates the the photocurrent signal output by the photodiode 156b. In step S104, it is determined whether or not the output voltage of the capacitor 108 has reached the predetermined value. If No, step S103 is repeated. If Yes, the operation goes to step S105.

In step S105, it is determined whether $n_a$ is less than $n_b$. If Yes, the operation goes to step S106, in which it is determined that the object is at a relatively short distance. If No, the the operation goes to step S107, in which it is determined that the object is at a relatively long distance.

Figure 44:
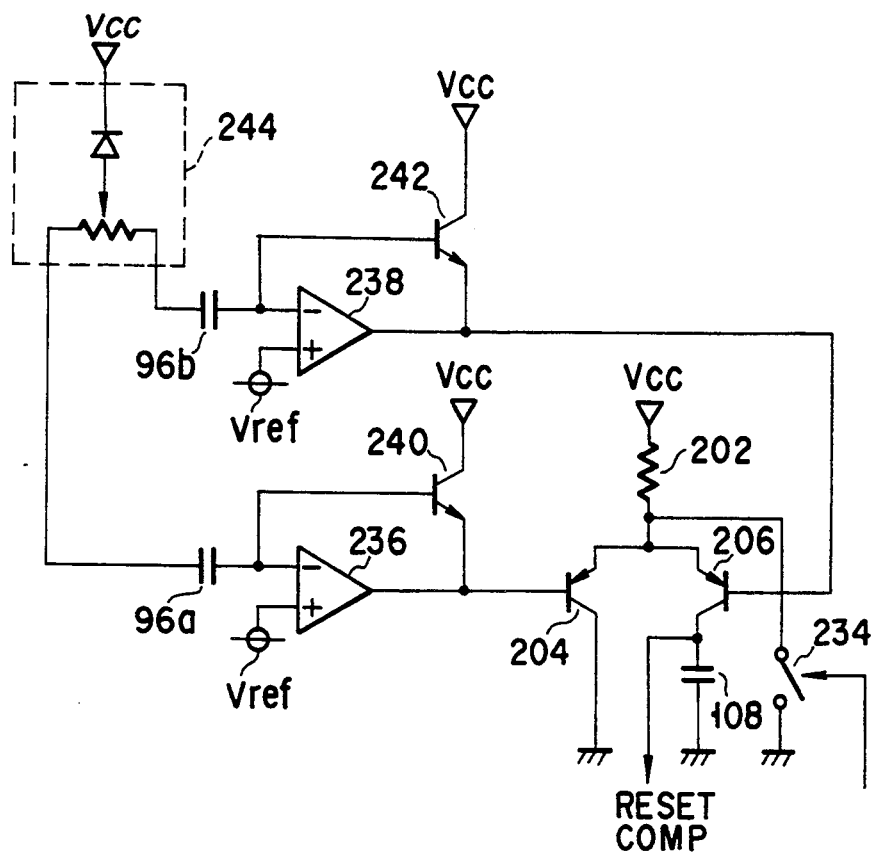
FIG. 44 is a circuit diagram showing a distance measurement apparatus according to an eighteenth embodiment of this invention.

FIG. 44 illustrates a distance measurement apparatus according to an eighteenth embodiment of the present invention. This apparatus is characterized in that operational amplifiers 236 and 238 are used in place of linear amplifiers including a CMOS inverter each, for accomplishing automatic focusing.

The operational amplifiers 236 and 238 operate, greatly reducing the input impedances of transistors 240 and 242. This is why an optical position sensing device (PSD) of the know type commonly used in automatic focusing devices is used in this embodiment, in place of photodiodes. The integration circuit incorporated in the eighteenth embodiment is identical to that used in the sixteenth embodiment (FIG. 39) and will not be described.

The emitter of the transistors 242, whose emitter potential changes, are connected to the bases of transistors 204 and 206 which form a differential amplifier. Therefore, the position of the spot formed of the signal beam reflected from an object to the PSD can be determined to measure the distance between the object and the apparatus more accurately than the seventeenth embodiment (FIG. 40) which uses photodiodes 156a and 156b.

Figure 45:
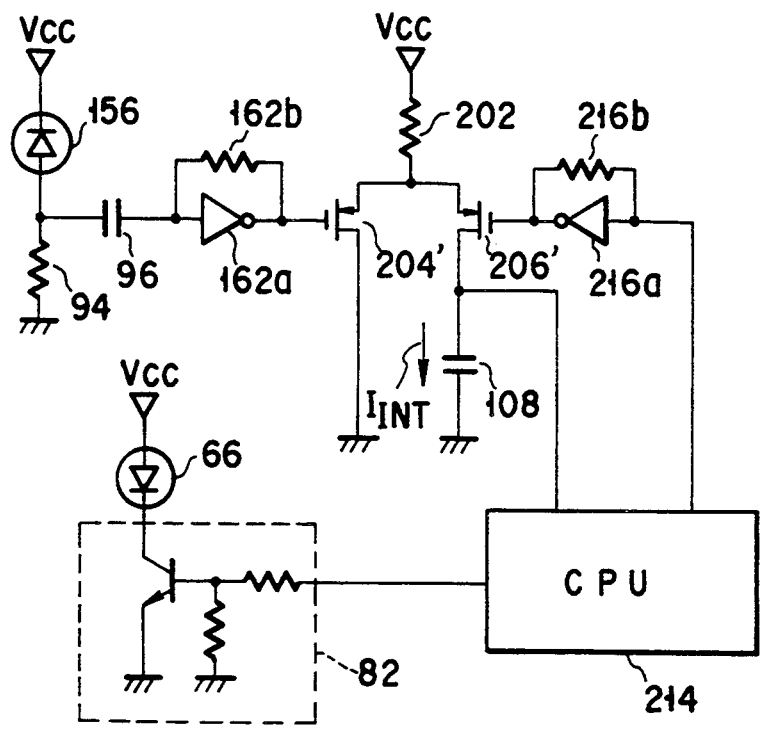
FIG. 45 is a circuit diagram showing a distance measurement apparatus according to an nineteenth embodiment of the present invention.

FIGS. 45 and 46 show two distance measurement apparatuses changes which are nineteenth and twentieth embodiments of the invention, respectively. These embodiments are identical to the fifteenth embodiment (FIG. 36), except that PMOS transistors 204' and 206' are used in place of the bipolar transistors 204 and 206.

Most CPUS are manufactured in processes of forming MOS elements. In addition, linear amplifiers of the type used in the fifteenth embodiment comprise CMOS inverters. Hence, in the nineteenth embodiment (FIG. 45), linear amplifiers are formed on the same chip, together with a CPU 214.

In view of the current amplification in a MOS transistor, the drain current $I_{INT}$ of the MOS transistor is given:

$$I_{INT} = K \cdot (V_{OUT} - V_T) \times (V_{OUT} - V_T) \quad (12)$$

where $V_T$ is the threshold voltage, K is a constant determined by the capacitance of the gate-insulating film, the channel width, the effective channel length, and the like.

In the nineteenth embodiment, resistors 202, 162a, and 162b may be ion-injected resistors or polysilicon resistors, all other elements, but photodiode 156 and capacitors 96 and 108, can be formed on the same chip, along with CPU 214.

In the twentieth embodiment shown in FIG. 46, all components except IRED 66, driver 82, photodiode 156, integrating capacitor 108, capacitor 96, and resistor 94, are formed on the same chip, together with CPU 214, constituting a one-chip microcomputer 246.

The inverters 162a and 162b, the PMOS transistors 204' and 206', and some other components—all incorporated in the microcomputer 246—occupy not more than a few percent of the chip area of the microcomputer 246. The increase in the manufacturing cost of this embodiment, due to the mounting of these components, is small. The decrease in the manufacturing cost, due to the reduction in the number of components, is so great that the twentieth embodiment can be manufactured at a far lower cost. Also due to the reduction in the number of components, the embodiment can be manufactured in less steps, which enhances the reliability of the distance measurement apparatus.

In the fourteenth to twentieth embodiments, PNP transistors and PMOS transistors are used. Nonetheless, according to the present invention, use can be made of PNP transistors or PMOS transistors.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A distance measurement apparatus for use in a camera, comprising:
   light-projecting means for projecting light toward an object;
   first light-receiving means for receiving light reflected from the object and converting the light into a first electric signal;
   second light-receiving means located adjacent to said first light-receiving means, for receiving light reflected from the object and converting the light into a second electric signal;
   first integration means connected to said first light-receiving means;
   second integration means connected to said second light-receiving means;
   a first integration reset terminal and first inverter terminal of a microcomputer, both connected to said first integration means;
   a second integration reset terminal and second inverter terminal of the microcomputer, both connected to said second integration means;
   a time-measuring means incorporated in the microcomputer, for measuring a period of time lapsing from time when said first or second integration means is reset by a signal supplied from said first or second integration reset terminal to time when a first inverter incorporated in the microcomputer and connected to said first inverter terminal or a second inverter incorporated in the microcomputer and connected to said second inverter inverts an input signal;
   memory means for storing a first measured period of time lapsing until said first inverter inverts an input signal while said light-projecting means is projecting no light, a second measured period of time lapsing until said second inverter inverts an input signal while said light-projecting means is projecting no light, a third measured period of time lapsing until said first inverter inverts an input signal while said light-projecting means is projecting light, and a fourth measured period of time lapsing until said second inverter inverts an input signal while said light-projecting means is projecting light; and
   means for eliminating influence of background light in accordance with a difference between said first and third measured periods of time and a difference between said second and fourth measured periods of time.

2. A distance measurement apparatus according to claim 1, wherein a distance at which the object is located is measured in accordance with whether the difference between said first and third measured periods of time is greater than the difference between said second and fourth measured periods of time.

3. A distance measurement apparatus for use in a camera, comprising:
   light-projecting means for projecting light toward an object;
   light-receiving means for receiving light reflected from the object and converting the light into an electric signal;
   integration means connected to said light-receiving means;
   an integration reset terminal and an inverter terminal of a microcomputer, both connected to said integration means;
   time-measuring means incorporated in said microcomputer, for measuring a period of a time lapsing from time when said integration means is reset by a signal supplied from said integration reset terminal to a time when an inverter incorporated in the microcomputer and connected to said inverter inverts an input signal;
   memory means for storing a first period of time lapsing until said inverter inverts an input signal while said light-projecting means is projecting no light, and a second period of time lapsing until said inverter inverts an input signal while said light-projecting means is projecting light; and
   distance-determining means incorporated in said microcomputer, for determining a distance at which the object is located, from the first and second periods of time, both stored in said memory means.

4. A time measurement apparatus according to claim 3, wherein said reset terminal and said inverter terminal are formed of a common terminal.

5. A distance measurement apparatus for use in a camera, comprising:
   light-projecting means for projecting light toward an object;
   light-receiving means for receiving light reflected from the object and converting the light into an electric signal;
   integration means for integrating a signal produced from the electric signal; and
   a one-chip microcomputer having an integration reset terminal and an inverter terminal, both connected to said integration means, and an inverter connected to the inverter terminal, for measuring a period of time lapsing from a time when said integration reset terminal is turned on, thereby resetting said integration means, to a time when said inverter inverts an input signal.

6. A distance measurement apparatus according to claim 5, wherein said integration reset terminal and said inverter terminal are formed of a common terminal.

7. A distance measurement apparatus according to claim 5, wherein said microcomputer measures a first period of time lapsing from a time when said reset terminal is turned on to a time when said inverter connected to said inverter terminal inverts said input signal, while said light-projecting means is projecting no light and also measures a second period of time lapsing from a time when said reset terminal is turned on to a time when said inverter inverts an input signal, while said light-projecting means is projecting light, and eliminates influence of background light in accordance with a difference between the first period of time and the second period of time, thereby to determine a distance at which the object is located.

8. A distance measurement apparatus according to claim 5, wherein said light-receiving means comprises at least two photodiodes located adjacent to each other, and said integration means comprises at least two integrating capacitors connected to said photodiodes, respectively.

9. A distance measurement apparatus according to claim 8, wherein said microcomputer obtains a first difference between the first period of time and the second period of time, both measured for a first electric signal, and a first difference between the first period of time and the second period of time, both measured for a second electric signal, and determines said distance in accordance with whether the first difference is greater than the second difference.

10. The distance measurement apparatus according to claim 5, further comprising:
detection means for detecting that the object has a high intensity; and
control means for decreasing an opening of a diaphragm of a camera and moving an objective lens of the camera to a normal focusing position.

11. A distance measurement apparatus according to claim 5, wherein said light-receiving means has one light-receiving element, and the distance is determined from a difference between a first period of time and a second period of time, said first period of time being one lapsing at a time when a signal at said inverter terminal is inverted while said light-projecting means is projecting no light, and said second period of time being one lapsing at a time when a signal at said inverter terminal is inverted while said light-projecting means is projecting light.

12. A distance measurement apparatus for use in a camera, comprising:
light-projecting means for projecting light toward an object;
light-receiving means for receiving light reflected from the object and inverting the light into an electric signal;
integration means for integrating a signal produced from the electric signal; and
a one-chip microcomputer connected to said integration means and comprising:
light projecting control means for controlling said light-projecting means,
integration reset means for resetting said integration means,
detection means for detecting that an output of said integration means has reached a value predetermined in said microcomputer,
time-measuring means for measuring a period of time lapsing from a time when said reset means resets said integration means to a time when the output of said integration means reaches the predetermined value, and
operation means for calculating a distance at which the object is located, from the period of time measured by said time-measuring means.

13. A distance measurement apparatus according to claim 12, wherein said microcomputer eliminates influence of background light in accordance with a difference between a first period of time and a second period of time, thereby to determine the distance, said first period of time being one measured by said time-measuring means while said light-projecting means is projecting no light, and said second period of time being one measured by said time-measuring means while said light-projecting means is projecting light.

14. A distance measurement apparatus comprising:
light-projecting means for projecting light toward an object;
light-receiving means for receiving light reflected from the object and converting the light into an electric signal;
integration means for integrating a signal produced from the electric signal;
data-acquiring means for acquiring data free of influence of a DC component, from a difference between a first period of time and a second period of time, said first period of time being one lapsing until an output of said integration means reaches a predetermined value while said light-projecting means is projecting no light, and said second period of time being on lapsing until an output of said integration means reaches a predetermined value while said light-projecting means is projecting light; and
distance-determining means for determining a distance at which the object is located, from the data acquired by said data-acquiring means.

15. A distance measurement apparatus according to claim 14, wherein said data-acquiring means and said distance-determining means are incorporated in a microcomputer, and said integration means is reset by a signal supplied from a port of the microcomputer.

16. A distance measurement apparatus according to claim 14, wherein said data-acquiring means and said distance-determining means are incorporated in a microcomputer, and a period of time lapsing until the output of said integration means reaches the predetermined value is a period of time lapsing until an inverter section incorporated in said microcomputer inverts an input signal.

17. A distance measurement apparatus according to claim 14, wherein said light-receiving means comprises at least two light-receiving elements located adjacent to each other, and said distance-determining means determines the distance in accordance with whether data made from an output of one of said at least two light-receiving elements is greater than data made from an output of the other of said at least two light-receiving elements.

18. A distance measurement apparatus according to claim 14, wherein said light-receiving means comprises one light-receiving element, and said distance-determining means determines the distance from data acquired from an output of said light-receiving element.

19. A distance measurement apparatus for use in a camera, comprising:
light-projecting means for repeatedly projecting a light beam toward an object;

first light-receiving means for receiving a light beam reflected from the object and converting the light beam into a first electric signal;

second light-receiving means located adjacent to said first light-receiving means, for receiving a light beam reflected from the object and converting the light beam into a second electric signal;

first switch means connected to said first light-receiving means, for outputting the first electric signal when turned on;

amplification means connected to said first and second light-receiving means, for AC-amplifying the first electric signal and the second electric signal;

integration means connected to said amplification means, for integrating a signal generated from the first electric signal or the second electric signal, said integration means having reset means for initializing an integration output and second switch means for initiating integration in synchronism with light beam projection performed by said light-projecting means;

detection means for detecting that an output of said integration means has reached a predetermined value; and distance-determining means for determining the distance from a difference between a first integration period and a second integration period, said first period being one lapsing until said detection means detects that the output of said integration means has reached the predetermined value, while said light-projecting means is projecting no light beam, and said second period being one lapsing until said detection means detects that the output of said integration means has reached the predetermined value, while said light-projecting means is projecting a light beam, whereby the distance is calculated from data free of an DC component, by using the difference between the first integration period and the second integration period.

20. A distance measurement apparatus according to claim 19, wherein said amplification means has filter means for filtering out a stationary-light component.

21. A distance measurement apparatus according to claim 20, wherein said filter means comprises a capacitor.

22. A distance measurement apparatus according to claim 19, wherein said distance-determining means determines whether the distance is shorter or longer than a predetermined distance, from a first integration period and a second integration period, said first integration period being one lapsing until an output, which said integration means produces from the second electric signal while said first switch means remains off, reaches a predetermined value while said light-projecting means is repeatedly projecting a light beam, and said second integration period being one lapsing until an output, which said integration means produces from the first and second electric signals while said first switch means remains on, reaches a predetermined value while said light-projecting means is repeatedly projecting a light beam.

23. A distance measurement apparatus according to claim 19, wherein said first switch means and said second switch means are open-drain type output terminals of a microcomputer.

24. A distance measurement apparatus according to claim 19, wherein said detection means is a Schmitt trigger circuit which is incorporated in a microcomputer and whose output is inverted upon reaching half a power-supply voltage.

25. A distance measurement apparatus according to claim 19, wherein said distance-determining means determines that the distance is long when the difference between a first integration output and a second integration output is less than a predetermined value, said first integration output having been produced from the first and second electric signals while said light-projecting means is repeatedly projecting a light beam and said second integration output having been produced from the first and second electric signals while said light-projecting means is projecting no light beam.

26. A distance measurement apparatus for use in a camera, comprising:

light-projecting means for repeatedly projecting a light beam toward an object;

first light-receiving means for receiving a light beam reflected from the object and converting the light beam into a first electric signal;

second light-receiving means located adjacent to said first light-receiving means, for receiving a light beam reflected from the object and converting the light beam into a second electric signal;

first switch means connected to said first light-receiving means, for outputting the first electric signal when turned on;

amplification means connected to said first and second light-receiving means, for amplifying the first electric signal or the second electric signal;

integration means for integrating both the first electric signal and the second electric signal when said first switch means outputs the first electric signal, and integrating only the second electric signal when said first switch means does not output the first electric signal;

detection means for detecting that an output of said integration means has reached a predetermined value; and distance-determining means for determining a distance at which the object is located, from a first integration period and a second integration period, said first period being one elapsing until an output of said integration means reaches a predetermined value while said integration means is integrating both the first electric signal and the second electric signal, and said second period being one elapsing until an output of said integration means reaches a predetermined value while said integration means is integrating only the second electric signal.

27. A distance measurement apparatus according to claim 26, wherein said amplification means is a CMOS inverter having an input terminal and an output terminal connected to the input terminal.

28. A distance measurement apparatus according to claim 26, wherein said distance-determining means calculates the distance from a difference between a first integration period and a second integration period and from data free of influence of background light, said first integration period being one lapsing until said detection means detects that the output of said integration means reaches a predetermined value while said light-projecting means is projecting no light beam, and said second integration period being one lapsing until said detection means detects that the output of said integration means reaches a predetermined value while said light-projecting means is projecting a light beam.

29. A distance measurement apparatus according to claim 26, wherein said amplification means has filter means for filtering out a stationary-light component.

30. A distance measurement apparatus according to claim 26, wherein said integration means has reset means for initializing an integration output and second switch means for initiating integration in synchronism with light beam projection performed by said light-projecting means, and said distance-determining means determines whether the distance is shorter or longer than a predetermined distance, from a first integration period and a second integration period, said first integration period being one lapsing until an output, which said integration means produces from the second electric signal while said first switch means remains off, reaches a predetermined value while said light-projecting means is repeatedly projecting a light beam, and said second integration period being one lapsing until an output, which said integration means produces from the first and second electric signals while said first switch means remains on, reaches a predetermined value while said light-projecting means is repeatedly projecting a light beam.

31. A distance measurement apparatus according to claim 26, wherein said first switch means and said second switch means are open-drain type output terminals of a microcomputer.

32. A distance measurement apparatus according to claim 26, wherein said detection means is a Schmitt trigger circuit which is incorporated in a microcomputer and whose output is inverted upon reaching half a power-supply voltage.

33. A distance measurement apparatus for use in a camera, comprising:
light-projecting means for repeatedly projecting a light beam toward an object;
a plurality of light-receiving means for receiving light beams reflected from the object and converting the light beams into electric signals;
switch means connected to at least one of said light-receiving means and including an output port of a one-chip microcomputer, for switching electric signals output by said light-receiving means;
said switch means comprising an open-drain type output terminal of said one-chip microcomputer;
amplification means connected to said light-receiving means, for AC-amplifying signals produced from the electric signals;
integration means connected to said amplification means, for integrating signals amplified by said amplification means; and
distance-determining means for determining a distance at which the object is located, from an output which said integration means has generated by integrating outputs produced by said light-receiving means and selected by said switch means.

34. A distance measurement apparatus according to claim 33, wherein said amplification means comprises a CMOS inverter having an input terminal and an output terminal connected to the input terminal.

35. A distance measurement apparatus according to claim 33, wherein said integration means includes reset means comprising an open-drain type output port of the one-chip microcomputer for initializing an integration output and second switch means for initiating integration in synchronism with light beam projection performed by said light-projecting means.

36. A distance measurement apparatus according to claim 33, wherein said distance-determining means determines the distance from a difference between a first integration period and a second integration period, said first integration period being a period lapsing until an output of said integration means reaches a predetermined value while said light-projecting means is projecting no light beam, and said second integration period being a period lapsing until an output of said integration means reaches a predetermined value while said light-projecting means is projecting a light beam,
whereby the distance is calculated from data free of influence of background light, by using the difference between the first integration period and the second integration period.

37. A distance measurement apparatus according to claim 33, wherein said amplification means comprises a CMOS inverter manufactured in the same process as said microcomputer and having an input terminal and an output terminal connected to the input terminal.

38. A distance measurement apparatus according to claim 33, wherein:
said open-drain type output terminal of the microcomputer is connected to each of said plurality of light-receiving means; and
said distance-determining means includes means for performing analog-to-digital conversion on an output of said integration means, which corresponds to an output of each of said plurality of light-receiving means.

39. A distance measurement apparatus according to claim 33, wherein:
said switch means comprises an open-drain type output terminal of the microcomputer, which is connected to each of said plurality of light-receiving means; and
said distance-determining means includes means for performing analog-to-digital conversion on an output of said integration means, which corresponds to an output of each of said plurality of light-receiving means.

40. A distance measurement apparatus for use in a camera, comprising:
light-projecting means for repeatedly projecting a light beam toward an object;
first light-receiving means for receiving a light beam reflected from the object and converting the light beam into a first electric signal;
second light-receiving means located adjacent to said first light-receiving means, for receiving a light beam reflected from the object and converting the light beam into a second electric signal;
a one-chip microcomputer for controlling a distance-measuring sequence;
first switch means connected to said first light-receiving means and comprising an output port of said one-chip microcomputer, for outputting the first electric signal when turned on;
second switch means connected to said first light-receiving means and comprising an output port of said one-chip microcomputer, for outputting the second electric signal when turned on;
amplification means connected to said first and second light-receiving means, for amplifying the first electric signal or the second electric signal;
integration means having a capacitor connected to a second output port of said one-chip microcomputer and said amplification means, for integrating the first electric signal or the second electric signal which has been amplified by said amplification means; and distance-determining means for determining a distance at which the object is located, from integration outputs which said integration means has generated by integrating the first electric signal and the second electric signal, respectively; and wherein said integration means calculates the distance from a difference between a first integration period and a second integration period and from data free of influence of background light, said first integration period being a period lapsing until the output of said integration means reaches a predetermined value while said light-projecting means is projecting no light beam, and said second integration period being a period lapsing until the output of said integration means reaches a predetermined value while said light-projecting means is projecting a light beam.

41. A distance measurement apparatus according to claim 40, further comprising filter means for filtering out a stationary-light component, said filter means being connected between (i) said first and second light-receiving means and (ii) said amplification means.

42. A distance measurement apparatus according to claim 40, wherein said distance-determining means comprises means for performing analog-to-digital conversion on an output of said integration means, which corresponds to an output of each of said first and second light-receiving means.

43. A distance measurement apparatus according to claim 40, wherein said distance-determining means determines the distance from an amount of light which has been detected on the basis of an output of said integration means corresponding to the first electric signal or the second electric signal.

44. A distance measurement apparatus according to claim 43, wherein said distance-determining means determines the distance in accordance with the following equation:

$$l = \sqrt{\frac{r \cdot k}{i_p}}$$

where l is the distance, $i_p$ is the first electric signal or the second electric signal, and r and k are constants.

45. A distance measurement apparatus for use in a camera, comprising:

light-projecting means for projecting distance-measuring light toward an object;

photoelectric means for receiving input light comprised of distance-measuring light reflected from the object and background light and converting the input light into an electric signal;

integration means having a capacitor for integrating an electric signal output by said photoelectric means or a signal corresponding to the electric signal; and a one-chip central processing unit having an input port and an output port, both connected to said light-projecting means and said photoelectric means, for controlling said light-projection means, for initializing a potential of said capacitor, and monitoring integration being performed by said integration means, and for calculating a distance at which the object is located, from a difference between an electric signal which said photoelectric means outputs while receiving only the illuminating light and an output generated by said integration means from an electric signal which said photoelectric means outputs while receiving both the illuminating light and the distance-measuring light.

46. A distance measurement apparatus according to claim 45, wherein said central processing unit measures a period of a time lapsing from time when said integration means is reset to a time when an output of said integration means reaches a predetermined value, thereby monitoring integration which said integration means is performing, and calculates the distance from a difference between a period of time measured while said light-projecting means is projecting no distance-measuring light and a period of time measured while said light-projecting means is projecting distance-measuring light.

47. A distance measurement apparatus for use in a camera, comprising:

light-projecting means for projecting distance-measuring light toward an object;

photoelectric means for receiving distance-measuring light reflected from the object and illuminating light reflected therefrom and converting the input light into an electric signal;

integration means having a capacitor for integrating an electric signal output by said photoelectric means or a signal corresponding to the electric signal; and a one-chip microcomputer having an input port and an output port which are connected to said light-projecting means and said integration means, for resetting said integration means and monitoring integration which said integration means is performing.

48. A distance measurement apparatus according to claim 47, wherein said microcomputer measures a period of time lapsing from time when said integration means is reset to time when an output thereof reaches a predetermined value, thereby to monitor the integration, and calculates a distance at which the object is located, from a difference between a period of time measured when said light-projecting means is projecting no distance-measuring light and a period of time measured while said light-projecting means is projecting distance-measuring light.

49. A distance measurement apparatus, which projects a light beam toward an object and receives a light beam reflected from the object, thereby to determine a distance at which the object is located, said apparatus comprising:

light-projecting means for projecting a light beam toward the object;

photoelectric means for receiving input light comprised of a light beam reflected from the object and stationary light therefrom and converting the input light into an electric signal;

integration means having a capacitor for integrating an electric signal output by said photoelectric means or a signal corresponding to the electric signal; and a one-chip central processing unit having an input port and an output port, for controlling said light-projecting means by using said output port, for connecting said input and output ports to said capacitor, thereby to control and reset said integrating means and to monitor integration being performed by said integration means, and for calculating a difference between a first output and a second output both generated by said integration means, thereby to remove a bias component from the output of said integration means, said first output generated while said light-projecting means is not projecting light, and said second output generated while said light-projecting means is projecting light.

50. A distance measurement apparatus which projects a light beam toward an object and receives a light beam reflected from the object, thereby to determine a distance at which the object is located, said apparatus comprising:

light-projecting means for projecting a light beam toward the object;

light-receiving means comprising at least two photoelectric elements for receiving a light beam reflected from the object;

light reception control means for controlling at least one of said photoelectric elements;

amplification means for amplifying only an AC component of a signal output from said light-receiving means;

integration means comprising first and second transistors, each having a collector or drain terminal, an emitter or source terminal, and a base or gate potential, the collector or drain terminal of said first transistor connected to a capacitor, the base or gate potential of said second transistor connected to said amplification means, and the emitter or source terminal of said first transistor connected to that of said second transistor;

integration control means for controlling said integration means;

monitor means for monitoring a signal being output by said integration means; and a sequence controller for controlling said light-projecting means, said light reception control means, and said integration control means in accordance with a signal output by said monitor means.

51. A distance measurement apparatus according to claim 50, wherein said light reception control means, said integration control means, said monitor means, and said sequence controller are comprised of a one-chip microcomputer.

52. A distance measurement apparatus according to claim 50, wherein said sequence controller drives said integration means at predetermined intervals while said light-projecting means is projecting no light beam, drives said light-projecting means and said integration means at the predetermined intervals, and determines the distance from a timing when said monitor means outputs a signal while said light-projecting means is projecting no light beam, a timing when said monitor means outputs a signal while said light-projecting means and said integration means are being driven, and a timing when said monitor means outputs a signal while said light reception means is not being driven.

53. A distance measurement apparatus according to claim 50, wherein said monitor means outputs a signal corresponding to an output produced by said integration means, and said sequence controller determines the distance from a signal which said monitor outputs while said light-projecting means is projecting no light beam, a signal which said monitor means outputs while said light-projecting means and said integration means are being driven and said light reception control means is being driven, and a signal which said monitor means outputs while said light reception means is not being driven.

54. A distance measurement apparatus according to claim 50, wherein said integration means comprises a conversion means for converting a voltage output by said amplification means into a current signal, said conversion means having a predetermined bias current source such that said integration means perform integration at a substantially constant speed.

55. A distance measurement apparatus which projects a light beam toward an object and receives a light beam reflected from the object, thereby to determine a distance at which the object is located, said apparatus comprising:

light-projecting means for projecting a light beam toward the object;

light-receiving means comprising at least two photoelectric elements for receiving a light beam reflected from the object;

light reception control means for controlling at least one of said photoelectric elements;

amplification means for amplifying a signal output from said light-receiving means;

integration means for integrating a signal output from said photoelectric means or a signal corresponding to the electric signal; and a one-chip microcomputer having a Schmitt trigger type input port, for controlling said light-projecting means, said light reception control means, and said integration means, thereby to monitor integration being performed by said integration means, by means of said Schmitt trigger type input port; and wherein said microcomputer determines the distance from at least two signals, a first of said at least two signals being output by said integration means while said light-projecting means is projecting no light beam, and a second said at least two signals being output by said integration means while said light-projecting means is projecting a light beam.

56. A distance measurement apparatus comprising:
light-projecting means for projecting distance-measuring light toward an object;
light-receiving means for receiving distance-measuring light reflected from the object and converting the light into an electric signal;
amplification means for amplifying the electric signal output by said light-receiving means;
integration means for integrating a signal output by said amplification means; and
operation control means for calculating a distance at which the object is located, from a signal output by said integration means, said operation control means having an open-drain port which functions as a switch for initializing said integration means.

57. A distance measurement apparatus according to claim 56, wherein said operation control means has an input port which is used as detection means for detecting a signal output by said integration means.

58. A distance measurement apparatus according to claim 56 wherein said operation control means has an open-drain port which is used as a switch for controlling timing of integration to be performed by said integration means.

59. A distance measurement apparatus according to claim 58, wherein said integration means comprises an integrating capacitor, a transistor whose gate-source path or base-emitter path is controlled by a voltage output by said amplification means, and a circuit including a current-mirror circuit for supplying the drain current or collector current of the transistor to said integrating capacitor, and said open-drain port of said operation control means is connected to said transistor for controlling the gate or base potential thereof.

60. A distance measurement apparatus according to claim 56, wherein said light-receiving means has a plurality of photoelectric surfaces for converting input light into electric signals, and said electric signals are switched and sequentially input to said amplification means by means of the open-drain port of said operation control means.

61. A distance measurement apparatus according to claim 60, wherein the electric signals output by said photoelectric elements are switched, without interrupting currents output by said photoelectric elements.

62. A distance measurement apparatus according to claim 56, wherein said amplification means is a CMOS inverter having an input terminal and an output terminal connected to the input terminal.

63. A distance measurement apparatus according to claim 56, wherein said amplification means, said integration means, and said operation control means are formed on a chip and manufactured in the same process.

64. A distance measurement apparatus according to claim 56, wherein said integration means comprises a plurality of transistors whose emitter or collector potentials are set at the same value, and an integrating capacitor connected to the collector or drain of one of said transistors, and said amplification means is connected to the base of said one of said transistors.

65. A distance measurement apparatus according to claim 64, wherein said integration means has a switch for controlling integration timing and controlling the identical potentials of the common emitters or common collectors of said transistors.

66. A distance measurement apparatus according to claim 56, wherein said integration means has a switch for controlling integration timing and controlling the base potential of one of said transistors other than the transistor whose base is connected to said amplification means.

67. A distance measurement apparatus according to claim 64, wherein a resistor is connected in series to the emitters of said transistors, said integration means has a switch for controlling integration timing and controlling the emitter potential of the transistors other than the transistor which is connected to said integrating capacitor.

68. A distance measurement apparatus according to claim 64, wherein each of said current signals is converted into a voltage by means of a diode and a resistor, and a bias current is supplied to the diode.

69. A distance measurement apparatus for use in a camera, comprising:
light-projecting means for repeatedly projecting a light beam toward an object;
a plurality of light-receiving means for receiving light beams reflected from the object and converting the light beams into electric signals;
switch means connected to at least one of said light-receiving means and including an output port of a one-chip microcomputer, for switching electric signals output by said light-receiving means;
amplification means connected to said light-receiving means, for AC-amplifying signals produced from the electric signals;
said amplification means comprising a CMOS inverter manufactured in the same process as said microcomputer and having an input terminal and an output terminal connected to the input terminal;
integration means connected to said amplification means, for integrating signal amplified by said amplification means; and
distance-determining means for determining a distance at which the object is located, from an output which said integration means has generated by integrating outputs produced by said light-receiving means and selected by said switch means.

70. A distance measurement apparatus according to claim 69, wherein said integration means includes reset means comprising an open-drain type output port of the one-chip microcomputer for initializing an integration output and second switch means for initiating integration in synchronism with light beam projection performed by said light-projecting means.

71. A distance measurement apparatus according to claim 69,. wherein said distance-determining means determines the distance from a difference between a first integration period being a period lapsing until an output of said integration means reaches a predetermined value while said light-projecting means is projecting no light beam, and said second integration period being a period lapsing until an output of said integration means reaches a predetermined value while said light-projecting means is projecting a light beam,
whereby the distance is calculated from data free of influence of background light, by using the difference between the first integration period and the second integration period.

* * * * *